(12) United States Patent
Iwase et al.

(10) Patent No.: US 9,890,726 B2
(45) Date of Patent: Feb. 13, 2018

(54) INDIVIDUAL CYLINDER AIR-FUEL RATIO CONTROL DEVICE OF INTERNAL COMBUSTION ENGINE

(71) Applicant: DENSO CORPORATION, Kariya, Aichi-pref. (JP)

(72) Inventors: Noriaki Iwase, Kariya (JP); Yasuo Mukai, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 14/825,455

(22) Filed: Aug. 13, 2015

(65) Prior Publication Data

US 2016/0053701 A1 Feb. 25, 2016

(30) Foreign Application Priority Data

Aug. 19, 2014 (JP) ................................ 2014-166312
Aug. 20, 2014 (JP) ................................ 2014-167999
Aug. 20, 2014 (JP) ................................ 2014-168000

(51) Int. Cl.
  *F02D 41/00* (2006.01)
  *G01M 15/11* (2006.01)
  *F02D 41/14* (2006.01)

(52) U.S. Cl.
  CPC ....... *F02D 41/1454* (2013.01); *F02D 41/008* (2013.01); *F02D 41/0085* (2013.01); *F02D 41/1439* (2013.01); *F02D 41/1445* (2013.01); *F02D 41/1498* (2013.01);
  (Continued)

(58) Field of Classification Search
  CPC ............ G01M 15/11; F02D 2200/1015; F02D 41/008; F02D 41/0085

USPC ....... 701/107, 109; 123/406.14, 406.27, 673, 123/674; 73/114.02
See application file for complete search history.

(56) References Cited

U.S. PATENT DOCUMENTS 4,030,349 A * 6/1977 Blanke ................ F02D 41/1474
  73/114.71
5,168,859 A * 12/1992 Ohsaki ................ F02D 41/1488
  123/679

(Continued)

FOREIGN PATENT DOCUMENTS

WO   WO 90/02874   * 3/1990

*Primary Examiner* — Erick Solis
(74) *Attorney, Agent, or Firm* — Nixon & Vanderhye P.C.

(57) ABSTRACT

An individual cylinder air-fuel ratio estimation of estimating an air-fuel ratio of an individual cylinder is performed on a sensed value of an air-fuel ratio sensor set in an exhaust gas collection part of an engine, and an individual cylinder air-fuel ratio control of controlling the air-fuel ratio of the individual cylinder is performed in such a way that a variation in the air-fuel ratio between the cylinders becomes small on the basis of an estimated air-fuel ratio of the individual cylinder. Further, it is determined whether or not a misfire of the engine is caused and when it is determined that the misfire of the engine is caused, the individual cylinder air-fuel ratio estimation and the individual cylinder air-fuel ratio control are stopped and an individual cylinder correction value by the individual cylinder air-fuel ratio control is reset. In this way, it is possible to avoid the individual cylinder air-fuel ratio control from being performed continuously as usual in a state where the air-fuel ratio of the individual cylinder cannot be controlled correctly due to the effect of the misfire.

2 Claims, 33 Drawing Sheets

(52) U.S. Cl.
CPC ......... *G01M 15/11* (2013.01); *F02D 41/1488* (2013.01); *F02D 2200/1015* (2013.01)

(56) References Cited

U.S. PATENT DOCUMENTS

| | | | | |
|---|---|---|---|---|
| 5,214,958 A * | 6/1993 | Inada | .................. | G01M 15/042 |
| | | | | 73/114.04 |
| 5,567,873 A * | 10/1996 | Toyoda | .................. | F02D 41/22 |
| | | | | 123/339.15 |
| 5,700,954 A * | 12/1997 | Sinha | .................. | F02D 41/1497 |
| | | | | 73/114.02 |
| 6,314,952 B1 * | 11/2001 | Turin | .................. | F02D 41/0085 |
| | | | | 123/673 |
| 6,499,474 B2 * | 12/2002 | Wachi | .................. | F02D 41/1474 |
| | | | | 123/443 |
| 7,031,828 B1 * | 4/2006 | Thompson | .......... | F02D 41/1443 |
| | | | | 123/673 |
| 7,280,906 B2 * | 10/2007 | Schneider | ........... | F02D 41/1454 |
| | | | | 123/690 |
| 9,267,458 B2 * | 2/2016 | Sakaguchi | .............. | F02D 41/22 |
| 2007/0078587 A1 * | 4/2007 | Beer | .................. | F02D 41/1443 |
| | | | | 701/109 |
| 2007/0119436 A1 * | 5/2007 | Aliakbarzadeh | ...... | F02D 41/008 |
| | | | | 123/674 |
| 2011/0202260 A1 * | 8/2011 | Cunningham | .......... | F02D 35/02 |
| | | | | 701/104 |
| 2013/0158841 A1 * | 6/2013 | Ito | ....................... | F02D 41/0085 |
| | | | | 701/104 |
| 2013/0304356 A1 | 11/2013 | Kawakatsu et al. | | |

* cited by examiner

FIG. 13

(*COMBUSTION ORDER: #1 → #3 → #4 → #2)

| ESTIMATED AIR-FUEL RATIO | (a) PRESENT TIMING +0 CA | (b) PRESENT TIMING +180 CA | (c) PRESENT TIMING +360 CA | (d) PRESENT TIMING +540 CA |
|---|---|---|---|---|
| $\hat{\phi}$ #1 | #1 | #2 | #4 | #3 |
| $\hat{\phi}$ #3 | #3 | #1 | #2 | #4 |
| $\hat{\phi}$ #4 | #4 | #3 | #1 | #2 |
| $\hat{\phi}$ #2 | #2 | #4 | #3 | #1 |

INDIVIDUAL CYLINDER AIR-FUEL RATIO CONTROL DEVICE OF INTERNAL COMBUSTION ENGINE

CROSS REFERENCE TO RELATED APPLICATION

This application is based on Japanese Patent Applications No. 2014-166312 filed on Aug. 19, 2014, No. 2014-167999 filed on Aug. 20, 2014 and No. 2014-168000 filed on Aug. 20, 2014, the disclosures of which are incorporated herein by reference.

TECHNICAL FIELD

The present disclosure relates to an individual cylinder air-fuel ratio control device of an internal combustion engine for estimating an air-fuel ratio of an individual cylinder of the internal combustion engine and for controlling the air-fuel ratio of the individual cylinder on the basis of an estimated air-fuel ratio.

BACKGROUND

As a technique for reducing a variation in an air-fuel ratio between cylinders of an internal combustion engine, for example, as described in JP-A 2013-253593, has been proposed a technique for estimating an air-fuel ratio of an individual cylinder on the basis of a sensed value of an air-fuel ratio sensor set in an exhaust gas collection part of the internal combustion engine and for performing an individual cylinder air-fuel ratio control of controlling the air-fuel ratio of the individual cylinder on the basis of an estimated air-fuel ratio of the individual cylinder. Further, the technique determines whether or not an air-fuel ratio sensing timing is shifted from a proper air-fuel ratio sensing timing on the basis of the estimated air-fuel ratio while performing the individual cylinder air-fuel ratio control. When the technique determines that the air-fuel ratio sensing timing is shifted from the proper air-fuel ratio sensing timing, the technique makes an air-fuel ratio sensing timing correction of correcting the air-fuel ratio sensing timing.

Further, considering that a time lag from the time when an exhaust gas exhausted from the individual cylinder reaches near the air-fuel ratio sensor to the time when the air-fuel ratio is sensed by the air-fuel sensor (that is, a response delay in an exhaust system) is changed due to the load and the rotation speed of the internal combustion engine, the technique sets an air-fuel ratio sensing timing (sampling timing of the output of the air-fuel ratio sensor) of the individual cylinder according to the load and the rotation speed of the internal combustion engine.

Still further, for the purpose of enhancing an exhaust gas cleaning rate of a catalyst for cleaning an exhaust gas of the internal combustion engine, the technique performs a main feedback control of calculating a main feedback correction value in such a way that an air-fuel ratio of the exhaust gas matches a target air-fuel ratio on the basis of the output of the air-fuel ratio sensor set in an exhaust pipe and of evenly correcting the air-fuel ratio of the individual cylinder (for example, fuel injection amount).

When a misfire in the internal combustion engine (for example, a consecutive misfire in a specific cylinder) is caused while the individual cylinder air-fuel ratio control is performed, the estimation accuracy of the air-fuel ratio of the individual cylinder can be impaired due to the effect of the misfire in some cases. In this case, an estimated air-fuel ratio of the individual cylinder can diverge and hence can make it difficult to correctly control the air-fuel ratio of the individual cylinder (to control the air-fuel ratio of the individual cylinder in such a way that a variation in the air-fuel ratio between the cylinders becomes small), which hence can cause an exhaust emission to deteriorate.

Further, when the internal combustion engine is rapidly accelerated and then rapidly decelerated, an exhaust flow rate can be greatly decreased and hence the flow of the exhaust gas can stagnate in some cases. When the flow of the exhaust gas near the air-fuel ratio sensor stagnates while the individual cylinder air-fuel ratio control is performed, in some case, the amplitude of the output of the air-fuel ratio sensor can be reduced due to the stagnation of the exhaust gas, which can make it difficult to correctly read the output of the air-fuel ratio sensor at each air-fuel ratio sensing timing of the individual cylinder. In this case, an estimated cylinder mistake (a mistake of correspondence relationship between an individual cylinder and an estimated air-fuel ratio) can be caused to thereby make it difficult to correctly control the air-fuel ratio of the individual cylinder, which hence can cause the exhaust emission to deteriorate. When the air-fuel ratio sensing timing is corrected in this state, there is also a possibility that the estimation accuracy of the air-fuel ratio of the individual cylinder will further deteriorate.

An exhaust flow rate can be changed by an operation condition (for example, an ignition timing) other than the load and the rotation speed of the internal combustion engine, and when the exhaust flow rate is changed, the response delay of the exhaust system is changed along with the change in the exhaust flow rate and hence the phase of an output waveform of the air-fuel ratio sensor is changed. Hence, a proper air-fuel ratio sensing timing of the individual cylinder is also changed.

For this reason, even if the air-fuel ratio sensing timing of the individual cylinder is set according to the load and the rotation speed of the internal combustion engine at the time of performing the individual cylinder air-fuel ratio control, if the exhaust flow rate is changed by the operation condition other than the load and the rotation speed of the internal combustion engine, the air-fuel ratio sensing timing of the individual cylinder can be shifted from the appropriate air-fuel ratio sensing timing of the individual cylinder. When the air-fuel ratio sensing timing of the individual cylinder is shifted from the appropriate air-fuel ratio sensing timing of the individual cylinder, the estimation accuracy of the air-fuel ratio of the individual cylinder is reduced, which hence makes it difficult to correctly control the air-fuel ratio of the individual cylinder (to control the air-fuel ratio of the individual cylinder in such a way that the variation in the air-fuel ratio between the cylinders becomes small).

When the variation in the air-fuel ratio between the cylinders of the internal combustion engine is comparatively large and the load of the internal combustion engine is large (that is, the exhaust flow rate is large), the amplitude of the output of the air-fuel ratio sensor becomes large and hence the output of the air-fuel ratio sensor is greatly changed. In this case, a main feedback correction value by the main feedback control is greatly changed, which hence can cause the variation in the air-fuel ratio between the cylinders to increase. For this reason, it is difficult to reduce the variation in the air-fuel ratio between the cylinders (to make an estimated air-fuel ratio of the individual cylinder converge)

by the individual cylinder air-fuel ratio control, which hence can cause the exhaust emission to deteriorate.

SUMMARY

An object of the present disclosure is to provide an individual cylinder air-fuel ratio control device of an internal combustion engine that can avoid an individual cylinder air-fuel ratio control from being performed continuously in a state where an air-fuel ratio of an individual cylinder cannot be correctly controlled and that can inhibit an exhaust emission from deteriorating.

Another object of the present disclosure is to provide an individual cylinder air-fuel ratio control device of an internal combustion engine that can inhibit an air-fuel ratio sensing timing from being shifted from a proper air-fuel ratio sensing timing by a change in an exhaust flow rate of the internal combustion engine.

Still another object of the present disclosure is to provide an individual cylinder air-fuel ratio control device of an internal combustion engine that can inhibit a variation in an air-fuel ratio between cylinders from being increased by a change in a main feedback correction value.

According to a first aspect of the present disclosure, an individual cylinder air-fuel ratio control device of an internal combustion engine includes: an air-fuel ratio sensor that is provided in an exhaust gas collection part, through which an exhaust gas of an individual cylinder of the internal combustion engine flows together, and that senses an air-fuel ratio of the exhaust gas; an individual cylinder air-fuel ratio estimation part performing an individual cylinder air-fuel ratio estimation of estimating an air-fuel ratio of the individual cylinder on the basis of a sensed value of the air-fuel ratio sensor, which is sensed at each air-fuel ratio sensing timing of the individual cylinder; and an individual cylinder air-fuel ratio control part performing an individual cylinder air-fuel ratio control of controlling the air-fuel ratio of the individual cylinder on the basis of an estimated air-fuel ratio of the individual cylinder. Further, the individual cylinder air-fuel ratio control device of the internal combustion engine includes: a misfire determination part determining whether or not a misfire is caused in the internal combustion engine; and a stop part stopping at least one of the individual cylinder air-fuel ratio estimation and the individual cylinder air-fuel ratio control when it is determined by the misfire determination part that the misfire is caused in the internal combustion engine.

By stopping the individual cylinder air-fuel ratio estimation (stopping the calculation of the estimated air-fuel ratio of the individual cylinder), it is possible to stop updating an individual cylinder correction value of the individual cylinder by the individual cylinder air-fuel ratio control. Hence, even if only the individual cylinder air-fuel ratio estimation is stopped, there can be brought about almost the same state as a state where the individual cylinder air-fuel ratio control is stopped (the calculation of the individual cylinder correction value of the individual cylinder is stopped).

Hence, when it is determined that the misfire is caused in the internal combustion engine, if the individual cylinder air-fuel ratio estimation or the individual cylinder air-fuel ratio control is stopped, it is possible to avoid the individual cylinder air-fuel ratio control from being performed continuously as usual in a state where the air-fuel ratio of the individual cylinder cannot be correctly controlled due to the misfire and to inhibit an exhaust emission from deteriorating.

According to a second aspect of the present disclosure, an individual cylinder air-fuel ratio control device of an internal combustion engine includes: an air-fuel ratio sensor that is provided in an exhaust gas collection part, through which an exhaust gas of an individual cylinder of the internal combustion engine flows together, and that senses an air-fuel ratio of the exhaust gas; an individual cylinder air-fuel ratio estimation part performing an individual cylinder air-fuel ratio estimation of estimating an air-fuel ratio of the individual cylinder on the basis of a sensed value of the air-fuel ratio sensor, which is sensed at each air-fuel ratio sensing timing of the individual cylinder; an individual cylinder air-fuel ratio control part performing an individual cylinder air-fuel ratio control of controlling the air-fuel ratio of the individual cylinder on the basis of an estimated air-fuel ratio of the individual cylinder; and a sensing timing correction part making an air-fuel ratio sensing timing correction of correcting an air-fuel ratio sensing timing on the basis of the estimated air-fuel ratio of the individual cylinder while the individual cylinder air-fuel ratio control is performed. Further, the individual cylinder air-fuel ratio control device of the internal combustion engine includes: an exhaust flow determination part determining whether or not a state where a flow of the exhaust gas of the internal combustion engine stagnates (hereinafter referred to as "an exhaust flow stagnation state) is caused; and a stop part stopping at least one of the individual cylinder air-fuel ratio estimation, the individual cylinder air-fuel ratio control, and the air-fuel ratio sensing timing correction when it is determined by the exhaust flow determination part that the exhaust flow stagnation state is caused.

When it is determined that the exhaust flow stagnation state is caused, if the individual cylinder air-fuel ratio estimation or the individual cylinder air-fuel ratio control is stopped, it is possible to avoid the individual cylinder air-fuel ratio control from being performed continuously as usual in a state where the air-fuel ratio of the individual cylinder cannot be correctly controlled due to the stagnation of the flow of the exhaust gas and hence to inhibit an exhaust emission from deteriorating. Further, even if the air-fuel ratio sensing timing correction is stopped, it is possible to inhibit an estimation accuracy of the air-fuel ratio of the individual cylinder from deteriorating and to inhibit a control accuracy of the individual cylinder air-fuel ratio control from deteriorating.

According to a third aspect of the present disclosure, an individual cylinder air-fuel ratio control device of an internal combustion engine includes: an air-fuel ratio sensor that is provided in an exhaust gas collection part, through which an exhaust gas of an individual cylinder of the internal combustion engine flows together, and that senses an air-fuel ratio of the exhaust gas; an air-fuel ratio sensing timing setting part setting an air-fuel ratio sensing timing of the individual cylinder according to at least one of a load and a rotation speed of the internal combustion engine; an individual cylinder air-fuel ratio estimation part estimating an air-fuel ratio of the individual cylinder on the basis of a sensed value of the air-fuel ratio sensor, which is sensed at each air-fuel sensing timing of the individual cylinder; and an individual cylinder air-fuel ratio control part controlling the air-fuel ratio of the individual cylinder on the basis of an estimated air-fuel ratio of the individual cylinder. The air-fuel ratio sensing timing setting part corrects the air-fuel ratio sensing timing according to an operation condition of a factor by which an exhaust flow rate of the internal combustion engine is changed (hereinafter referred to as "an exhaust flow rate change factor").

In this configuration, in response to a fact that according to the exhaust flow rate change factor, the exhaust flow rate is changed to thereby change a phase of a output waveform of the air-fuel ratio sensor (that is, to thereby change a proper air-fuel ratio sensing timing of the individual cylinder), it is possible to correct the air-fuel ratio sensing timing and hence to inhibit the air-fuel ratio sensing timing of the individual cylinder from being shifted from the proper air-fuel ratio sensing timing. In this way, even if the exhaust flow rate is changed by an operation condition other than the load and the rotation speed of the internal combustion engine, it is possible to inhibit the air-fuel ratio sensing timing from being shifted from the proper air-fuel ratio sensing timing by a change in the exhaust flow rate. Hence, it is possible to inhibit an estimation accuracy of the air-fuel ratio of the individual cylinder from being reduced and to correctly control the air-fuel ratio of the individual cylinder (to control the air-fuel ratio of the individual cylinder in such a way that a variation in the air the air-fuel ratio between the cylinders becomes small).

According to a fourth aspect of the present disclosure, an individual cylinder air-fuel ratio control device of an internal combustion engine includes: an air-fuel ratio sensor that is provided in an exhaust gas collection part, through which an exhaust gas of an individual cylinder of the internal combustion engine flows together, and that senses an air-fuel ratio of the exhaust gas; a main feedback control part calculating a main feedback correction value on the basis of an output of the air-fuel ratio sensor in such a way that an air-fuel ratio of the exhaust gas matches a target air-fuel ratio and for evenly correcting an air-fuel ratio of the individual cylinder; an individual cylinder air-fuel ratio estimation part performing an individual cylinder air-fuel ratio estimation of estimating an air-fuel ratio of the individual cylinder for each cylinder on the basis of a sensed value of the air-fuel ratio sensor, which is sensed at each air-fuel sensing timing of the individual cylinder; and an individual cylinder air-fuel ratio control part performing an individual cylinder air-fuel ratio control of controlling the air-fuel ratio of the individual cylinder for each cylinder on the basis of an estimated air-fuel ratio of the individual cylinder. Further, the individual cylinder air-fuel ratio control device of the internal combustion engine includes: a determination part determining whether or not an inter-cylinder imbalance failure can be caused in the internal combustion engine; and a limitation part limiting a change amount of the main feedback correction value by a specified guard value when it is determined that the inter-cylinder imbalance failure is caused and the load of the internal combustion engine is not less than a specified value.

When it is determined that the inter-cylinder imbalance failure can be caused (that is, a variation in the air-fuel ratio between the cylinders is comparatively large) and the load of the internal combustion engine is not less than the specified value (that is, the exhaust flow rate is comparatively high), the amplitude of the output of the air-fuel ratio sensor can become large and hence the main feedback correction value can be greatly changed.

Hence, when it is determined that the inter-cylinder imbalance failure can be caused and the load of the internal combustion engine is not less than the specified value, by limiting the change amount of the main feedback correction value by a specified guard value, it is possible to moderately inhibit a change in the main feedback correction value and to inhibit the variation in the air-fuel ratio between the cylinders from being increased by the change in the main feedback correction value. In this way, even in a case where it is determined that the inter-cylinder imbalance failure can be caused (the variation in the air-fuel ratio between the cylinders is comparatively large), it is possible to quickly reduce the variation in the air-fuel ratio between the cylinders by the individual cylinder air-fuel ratio control (to make the estimated air-fuel ratio of the individual cylinder converge) and hence to inhibit an exhaust emission from deteriorating.

BRIEF DESCRIPTION OF THE DRAWINGS

The above and other objects, features and advantages of the present disclosure will become more apparent from the following detailed description made with reference to the accompanying drawings. In the drawings:

FIG. 13 is a table to show a cylinder assumed in a case where an air-fuel ratio sensing timing is assumed to be changed;

DETAILED DESCRIPTION

First Embodiment

A first embodiment of the present disclosure will be described on the basis of FIG. 1 to FIG. 13.

Figure 1:
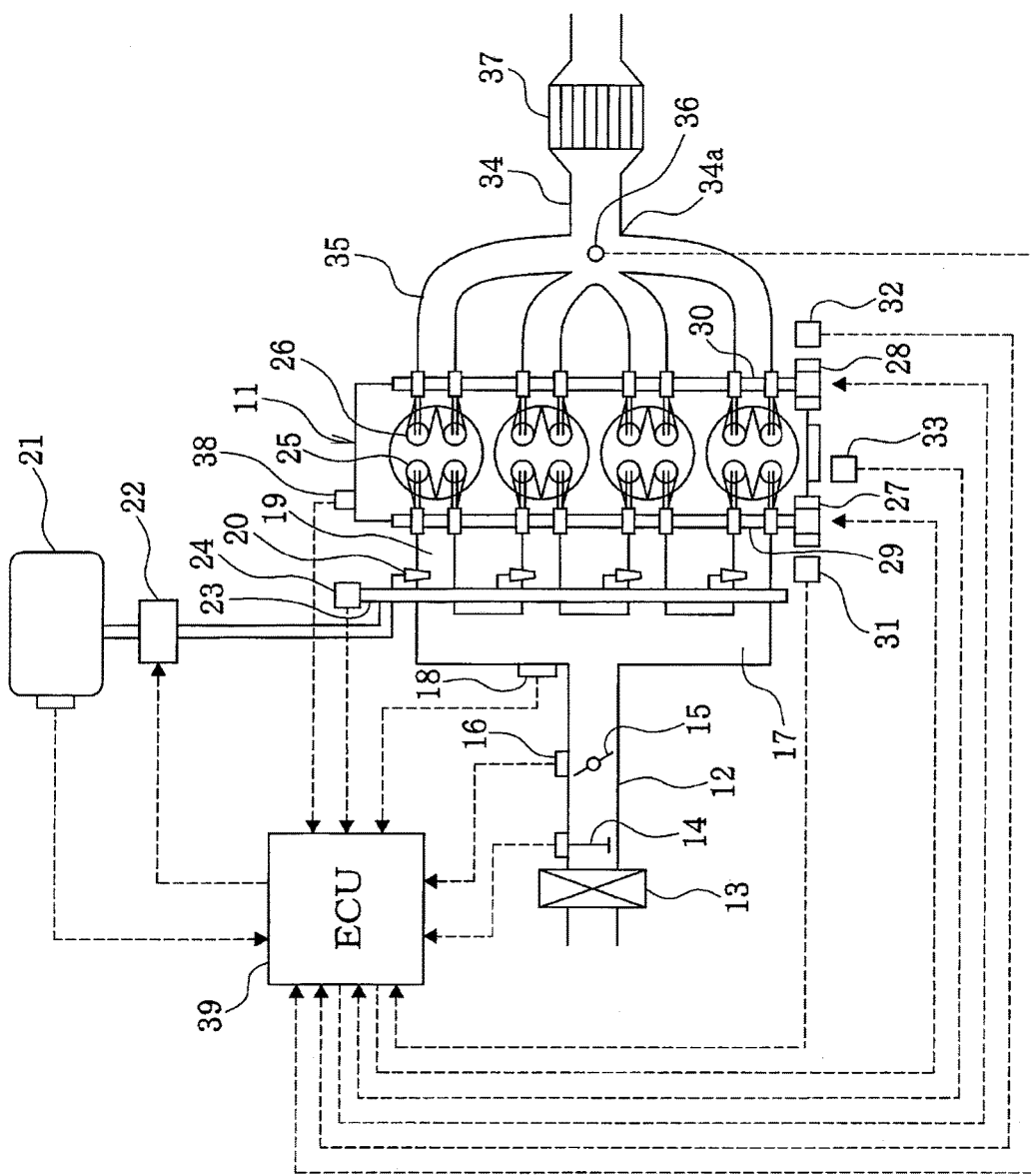
FIG. 1 is a diagram to show a general configuration of an engine control system in a first embodiment of the present invention.

First, a general configuration of an entire engine control system on the basis of FIG. 1.

For example, an in-line 4-cylinder engine 11 of an internal combustion engine has four cylinders of a first cylinder #1 to a fourth cylinder #4. The engine 11 has an air cleaner 13 provided on the most upstream portion of an intake pipe 12 thereof and has an air flow meter 14 provided on a downstream side of the air cleaner 13, the air flow meter 14 detecting an intake air amount. On the downstream side of the air flow meter 14 are provided a throttle valve 15, whose opening is regulated by a motor or the like, and a throttle opening sensor 16 for sensing an opening (throttle opening) of the throttle valve 15.

Further, on the downstream side of the throttle valve 15 is provided a surge tank 17, and the surge tank 17 is provided with an intake pipe pressure sensor 18 for sensing an intake pipe pressure. Still further, the surge tank 17 is provided with intake manifolds 19 each of which introduces air into the individual cylinder of the engine 11 and the intake manifold 19 of the individual cylinder has a fuel injection valve 20 fixed at an intake port thereof, the fuel injection valve 20 injecting fuel to the intake port. While the engine 11 is operated, the fuel in a fuel tank 21 is sent to a delivery pipe 23 by a fuel pump 22 and is injected from the fuel injection valve 20 of the individual cylinder at an injection timing of the individual cylinder. The delivery pipe 23 is provided with a fuel pressure sensor 24 for sensing a fuel pressure.

Further, the engine 11 is provided with variable valve timing mechanisms 27, 28 which vary a valve timing (opening/closing timing) of an intake valve 25 and a valve timing (opening/closing timing) of an exhaust valve 26, respectively. Still further, the engine 11 is provided with an intake cam angle sensor 31 for outputting a cam angle signal in synchronization with the rotation of an intake cam shaft 29 and an exhaust cam angle sensor 32 for outputting a cam angle signal in synchronization with the rotation of an exhaust cam shaft 30. Still further, the engine 11 is provided with a crank angle sensor 33 for outputting a pulse of a crank angle signal at intervals of a specified crank angle (for example, 30 CA) in synchronization with the rotation of a crankshaft of the engine 11.

On the other hand, in an exhaust gas collection part 34a, through which exhaust gases of the individual cylinders flow together, of an exhaust pipe 34 of the engine 11 (a part at which the exhaust manifolds 35 of the individual cylinders meet or on the downstream side of the part) is provided an air-fuel ratio sensor 36 for sensing an air-fuel ratio of the exhaust gas. On the downstream side of the air-fuel ratio sensor 36 is provided a catalyst 37, for example, a three-way catalyst for cleaning CO, HC, and NOx in the exhaust gas. Further, a cylinder block of the engine 11 is provided with a cooling water temperature sensor 38 for sensing a cooling water temperature.

The outputs of these various kinds of sensors are inputted to an electronic control unit (ECU) 39. The ECU 39 is mainly constructed of a microcomputer and executes various kinds of programs, which are stored in a built-in ROM (storage medium) and control the engine 11, thereby controlling a fuel injection amount, an ignition timing, and a throttle opening (an intake air amount) according to an engine operation state.

At that time, when a specified air-fuel ratio F/B control performance condition holds, the ECU 39 performs an air-fuel ratio F/B control for feeding back an air-fuel ratio of an air-fuel mixture (for example, a fuel injection amount) on the basis of an output of the air-fuel ratio sensor 36 in such a way that an air-fuel ratio of the exhaust gas matches a target air-fuel ratio.

Figure 2:
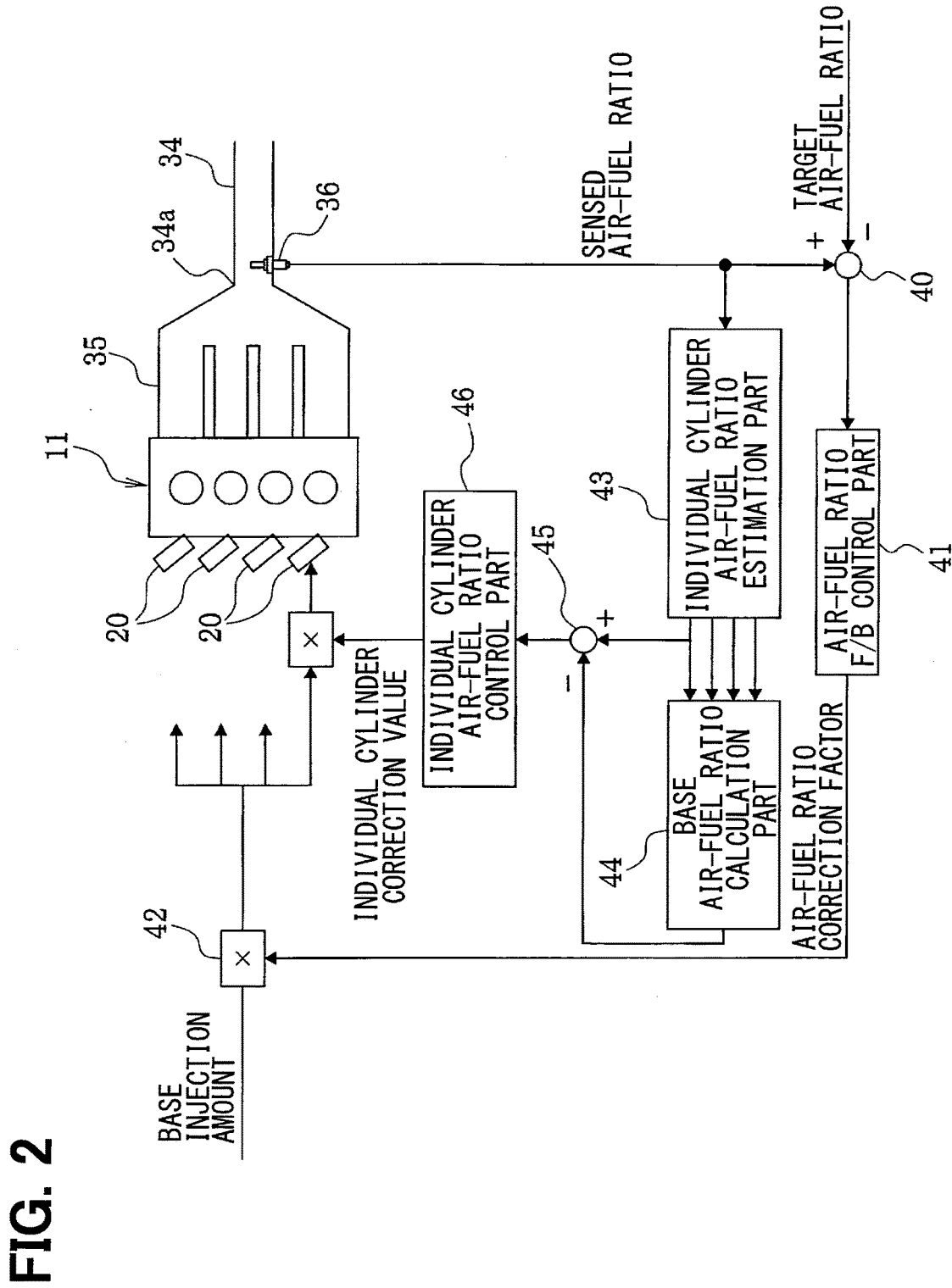
FIG. 2 is a block diagram to illustrate an air-fuel ratio control function.

Specifically, as shown in FIG. 2, first, an air-fuel ratio deviation calculation part 40 calculates a deviation between a sensed air-fuel ratio (an air-fuel ratio of the exhaust gas sensed by the air-fuel ratio sensor 36) and a target air-fuel ratio, and an air-fuel ratio F/B control part 41 calculates an air-fuel ratio correction factor in such a way that the deviation between the sensed air-fuel ratio and the target air-fuel ratio becomes small. Then, an injection amount calculation part 42 calculates a fuel injection amount on the basis of a base injection amount, which is calculated on the basis of an engine rotation speed and an engine load (intake pipe negative pressure and intake air amount), and the calculated air-fuel ratio correction factor and controls the fuel injection valve 20 of the individual cylinder on the basis of the calculated fuel injection amount.

Further, the ECU 39 performs an individual cylinder air-fuel ratio control routine shown in FIG. 6, which will be described later. In this way, the ECU 39 performs an individual cylinder air-fuel ratio estimation for estimating an air-fuel ratio of an individual cylinder for each cylinder on the basis of a sensed value of the air-fuel ratio sensor 36, which is sensed at each air-fuel ratio sensing timing of the individual cylinder, thereby estimating an estimated air-fuel ratio of the individual cylinder. Then, the ECU 39 performs an individual cylinder air-fuel ratio control for controlling an air-fuel ratio of the individual cylinder for each cylinder on the basis of the estimated air-fuel ratio of the individual cylinder.

Specifically, as shown in FIG. 2, first, an individual cylinder air-fuel ratio estimation part 43 estimates an air-fuel ratio of an individual cylinder for each cylinder on the basis of the sensed value of the air-fuel ratio sensor 36 (actual air-fuel ratio of the exhaust gas flowing through the exhaust gas collection part 34a) by the use of an individual cylinder air-fuel ratio estimation model, which will be described later, and a base air-fuel ratio calculation part 44 calculates a mean value of the estimated air-fuel ratios of all cylinders and sets the mean value for a base air-fuel ratio. Then, an individual cylinder air-fuel ratio deviation calculation part 45 calculates a deviation between the estimated air-fuel ratio of the individual cylinder and the base air-fuel ratio for each cylinder, and an individual cylinder air-fuel ratio control part 46 calculates, for example, a fuel correction amount (a correction amount of the fuel injection amount) as an individual cylinder correction value for each cylinder in such a way that a deviation between the estimated air-fuel ratio of the individual cylinder and the base air-fuel ratio becomes small. By correcting the fuel injection amount of the individual cylinder for each cylinder on the basis of the result of the calculation, the air-fuel ratio of the air-fuel mixture, which is supplied to the individual cylinder, is corrected for each cylinder, whereby a variation in the air-fuel ratio between the cylinders is reduced.

Here will be described a specific example of a model for estimating an air-fuel ratio of an individual cylinder (hereinafter referred to as "an individual cylinder air-fuel ratio estimation model") on the basis of the sensed value (an actual air-fuel ratio of the exhaust gas flowing through the exhaust gas collection part 34a) of the air-fuel ratio sensor 36.

By focusing attention on a gas exchange in the exhaust gas collection part 34a, the sensed value of the air-fuel ratio sensor 36 is expressed by a model that is the sum of a value, which is obtained by multiplying a history of the estimated air-fuel ratio of the individual cylinder in the exhaust gas collection part 34a by a specified weight, and a value, which is obtained by multiplying a history of the sensed value of the air-fuel ratio sensor 36 by another specified weight, and the air-fuel ratio of the individual cylinder is estimated by the use of the model. At this time, a Kalman filter is used as an observer.

More specifically, a model of the gas exchange in the exhaust gas collection part 34a is approximated by the following equation (1).

$$ys(t)=k1 \times u(t-1)+k2 \times u(t-2)-k3 \times ys(t-1)-k4 \times ys(t-2) \quad (1)$$

where "ys" is a sensed value of the air-fuel ratio sensor 36, "u" is an air-fuel ratio of gas flowing into the exhaust gas collection part 34a, and "k1" to "k4" are constants.

An exhaust gas system has a first order delay element of a gas inflow and a gas mixture in the exhaust gas collection part 34a and a first order delay element by a response delay of the air-fuel ratio sensor 36. Then, in the equation (1) described above, the histories of last two times are referred to in consideration of these first order delay elements.

When the equation (1) is transformed into a state space model, the following equations (2a) and (2b) can be derived.

$$X(t+1)=A \times X(t)+B \times u(t)+W(t) \quad (2a)$$

$$Y(t)=C \times X(t)+D \times u(t) \quad (2b)$$

where "A", "B", "C", and "D" are parameters of the model, "Y" is a sensed value of the air-fuel ratio sensor 36, "X" is an estimated air-fuel ratio of an individual cylinder as a state variable, and "W" is noise.

Further, when a Kalman filter is designed by the use of the equations (2a) and (2b), the following equation (3) can be obtained.

$$X\hat{}(k+1|k)=A \times X\hat{}(k|k-1)+K\{Y(k)-C \times A \times X\hat{}(k|k-1)\} \quad (3)$$

where X^ is an estimated air-fuel ratio of an individual cylinder and K is a Kalman gain. The X^ (k+1|k) means that an estimated value at the next time (k+1) is found from an estimated value at a time (k).

When the individual cylinder air-fuel ratio estimation model is constructed of a Kalman filter type observer in the manner described above, the air-fuel ratio of the individual cylinder can be estimated in sequence along with the progression of a combustion cycle.

Next, a method for setting an air-fuel ratio sensing timing (sampling timing of the output of the air-fuel ratio sensor 36) of an individual cylinder will be described. A time lag from the time when the exhaust gas exhausted from the individual cylinder reaches near the air-fuel ratio sensor 36 to the time when the air-fuel ratio of the exhaust gas is sensed by the air-fuel ratio (hereinafter referred to as "a response delay of an exhaust system") will be varied according to an engine operation state. In consideration of this, in the present embodiment, the air-fuel ratio sensing timing of the individual cylinder is set by a map according to the engine operation state (for example, an engine load, an engine rotation speed, and the like) and the output of the air-fuel ratio sensor 36 is taken in the ECU 39. In general, as the engine load is smaller, the response delay of the exhaust system becomes larger, so the air-fuel ratio sensing timing of the individual cylinder is set in such a way that as the engine load is smaller, the air-fuel ratio sensing timing of the individual cylinder is shifted to a delay side.

However, the length of the exhaust manifold 35 from an exhaust port of an individual cylinder to the air-fuel ratio sensor 36 is different for each cylinder and the flow of the exhaust gas of the individual cylinder is complicatedly varied according to the engine operation state (the engine rotation speed, an air amount filled in the cylinder, and the like). In addition, the response delay of the exhaust system is varied also by a variation in the manufacture of the engine 11 and by a secular change, so it is difficult to map a relationship between the response delay of the exhaust system of the individual cylinder (the air-fuel ratio sensing timing of the individual cylinder) and the engine load with high accuracy in the process of designing and manufacturing the engine 11. For this reason, there is a possibility that the air-fuel ratio sensing timing of the individual cylinder will be shifted from a proper air-fuel ratio sensing timing.

If the air-fuel ratio of the individual cylinder is shifted from the proper air-fuel ratio sensing timing, an estimation accuracy of the air-fuel ratio of the individual cylinder is worsened, which will bring about a state where even if the individual cylinder air-fuel ratio control is continuously performed, a variation in the estimated air-fuel ratio between the cylinders is not reduced forever.

Then, the ECU 39 performs the respective routines shown in FIG. 7 to FIG. 12, which will be described later. That is, while the ECU 39 performs the individual cylinder air-fuel ratio control, the ECU 39 makes an air-fuel ratio sensing timing determination for determining whether or not the air-fuel ratio sensing timing is shifted from the proper air-fuel ratio sensing timing on the basis of the estimated air-fuel ratio. When the ECU 39 determines that the air-fuel ratio sensing timing is shifted from the proper air-fuel ratio sensing timing, the ECU 39 makes an air-fuel ratio sensing timing correction for correcting an air-fuel ratio sensing timing.

For example, the ECU 39 performs a Local learning for correcting the air-fuel ratio sensing timing in such a way that a variation in the sensed value of the air-fuel ratio sensor 36 becomes maximum within one cycle (720 CA) of the engine 11. After the ECU 39 performs the Local learning, while the ECU 39 performs the individual cylinder air-fuel ratio control, the ECU 39 performs a Global learning for correcting the air-fuel ratio sensing timing on the basis of a relationship between a change in the estimated air-fuel ratio of at least one cylinder and a change in an individual cylinder correction value (for example, a fuel correction amount) of the cylinder. In the Global learning, in respective cases where an individual cylinder number assumed by the estimated air-fuel ratio of the individual cylinder is changed hypothetically in a plurality of ways, the ECU 39 calculates a correlation value between a change in the estimated air-fuel ratio of at least one cylinder and a change in the individual cylinder correction value of a cylinder number after the estimated air-fuel ratio being changed and corrects the air-fuel ratio sensing timing in such a way that the correlation value becomes maximum.

Figure 3:
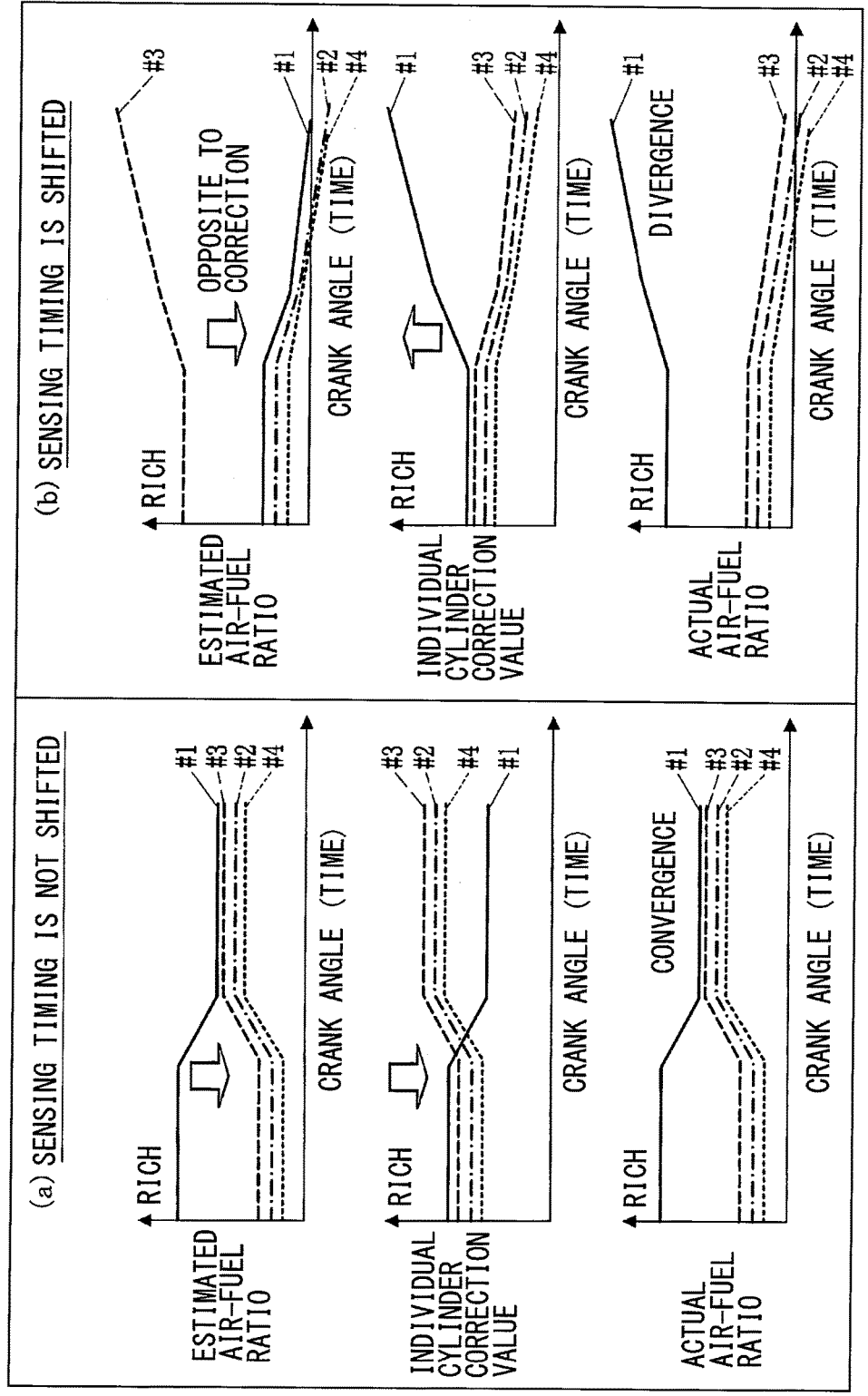
FIG. 3 is charts to show the behaviors of an estimated air-fuel ratio, an individual cylinder correction value, and an actual air-fuel ratio of an individual cylinder.

In a case where an air-fuel ratio sensing timing of an individual cylinder is shifted from a proper air-fuel ratio sensing timing of the individual cylinder, a correct air-fuel ratio sensing timing of a certain cylinder is not necessarily near a present air-fuel ratio sensing timing of the cylinder, but it can be also considered that, for example, the correct air-fuel ratio sensing timing of the certain cylinder is delayed to the present air-fuel ratio sensing timing of the next combustion cylinder or to a delay side thereof or that the correct air-fuel ratio sensing timing of the certain cylinder is advanced to the present air-fuel ratio sensing timing of the last combustion cylinder or to an advance side thereof. For example, as shown in FIG. 3(*b*), in a case where a correct air-fuel ratio sensing timing of a certain cylinder (assumed to be a first cylinder #1) is shifted to a present air-fuel ratio sensing timing of the other cylinder (assumed to be a third cylinder #3), a timing when an actual air-fuel ratio of the first cylinder #1 is sensed most accurately is not the present air-fuel ratio sensing timing of the first cylinder #1 but is the present air-fuel ratio sensing timing of the third cylinder #3. In this case, when an individual cylinder air-fuel ratio control is performed by the use of an individual cylinder correction value (for example, a fuel correction amount) of the first cylinder #1, which is calculated on the basis of an estimated air-fuel ratio of the first cylinder #1, which is estimated on the basis of the present air-fuel ratio sensing timing of the first cylinder #1, an actual air-fuel ratio of the first cylinder #1 is changed in response to a change in the individual cylinder correction value of the first cylinder #1. However, the estimated air-fuel ratio of the first cylinder #1 is not changed in response to the change in the individual cylinder correction value of the first cylinder #1, but an estimated air-fuel ratio of the third cylinder #3 results in being changed in response to the change in the individual cylinder correction value of the first cylinder #1.

By paying attention to this characteristics, in the present embodiment, by the Global learning, the ECU 39 corrects the air-fuel ratio sensing timing on the basis of the relationship between the change in the estimated air-fuel ratio of at least one cylinder and the change in the individual cylinder correction value (for example, the fuel correction amount) of the cylinder while performing the individual cylinder air-fuel control. Hence, the ECU 39 can correct a shift of the air-fuel ratio sensing timing from the proper air-fuel ratio sensing timing. In addition, in respective cases where an individual cylinder number assumed by the estimated air-fuel ratio of the individual cylinder is changed hypothetically in a plurality of ways, the ECU 39 calculates the correlation value between the change in the estimated air-fuel ratio of at least one cylinder and the change in the individual cylinder correction value of the cylinder number after the estimated air-fuel ratio being changed and corrects the air-fuel ratio sensing timing on the basis of the correlation value. In this way, it is not necessary to calculate a correlation value by actually shifting the present air-fuel ratio sensing timing in sequence, but it is possible to calculate respective correlation values in respective cases where an assumed cylinder is changed hypothetically at the same time only on the basis of the estimated air-fuel ratio of the individual cylinder at the present air-fuel ratio sensing timing and the individual cylinder correction value of the individual cylinder, which is based on the estimated air-fuel ratio of the individual cylinder, and to compare the respective correction values. In this way, even in a case where an optimal air-fuel ratio sensing timing greatly diverges from the present air-fuel ratio sensing timing, a shift of the present air-fuel ratio sensing timing from the optimal air-fuel ratio sensing timing can be corrected in a short time.

Further, for example, in a case where a correct air-fuel ratio sensing timing of a certain cylinder (assumed to be a first cylinder #1) is shifted to a middle of the present air-fuel ratio sensing timings of the other successive cylinders (assumed to be a second cylinder #2 and a fourth cylinder #4), a timing when an actual air-fuel ratio of the first cylinder #1 is sensed most accurately is not the present air-fuel ratio sensing timing of the first cylinder #1 but is the middle of the present air-fuel ratio sensing timings of the second cylinder #2 and the fourth cylinder #4. In this case, an estimated air-fuel ratio at a timing most correlated to a change in the individual cylinder correction value of the first cylinder #1, which has been described above, cannot be obtained by an estimation at the present air-fuel ratio sensing timing, so there is a possibility that the air-fuel ratio sensing timing of the first cylinder #1 cannot be corrected to an optimal air-fuel ratio sensing timing. Hence, it is desirable that any one of the sensed value of the air-fuel ratio sensor 36 at the air-fuel ratio sensing timing of the individual cylinder senses any one of an actual air-fuel ratio of the individual cylinder with high accuracy.

Then, in the present embodiment, the air-fuel ratio sensing timing is corrected by the Local learning in such a way that a variation in the sensed value of the air-fuel ratio sensor 36 becomes maximum within one cycle (720 CA) of the engine 11. In this way, in a case where the actual air-fuel ratio of the individual cylinder is varied, the air-fuel ratio is varied within one cycle but a maximum variation in the air-fuel ratio can be sensed and any one of the sensed value of the air-fuel ratio sensor 36 at the air-fuel ratio sensing timing of the individual cylinder can be a sensed value of high accuracy of any one of an actual air-fuel ratio of the individual cylinder. In this way, any one of an estimated air-fuel ratio of the individual cylinder can be a sensed value of any one of an actual air-fuel ratio of the individual cylinder. Hence, in the Global learning, it is possible to correct a shift of the air-fuel ratio sensing timing from the proper air-fuel ratio sensing timing with high accuracy.

In the meantime, when a misfire (for example, consecutive misfires in a specified cylinder) is caused in the engine 11 while the individual cylinder air-fuel ratio control is performed, there is a case where an estimation accuracy of an air-fuel ratio of the individual cylinder will be worsened by the effect of the misfire. In this case, the estimated air-fuel ratio of the individual cylinder can diverge and hence an air-fuel ratio of the individual cylinder cannot be controlled correctly (in such a way that a variation in the air-fuel ratio between the cylinders is reduced), which causes a possibility that the exhaust emission will be worsened.

As a measure against the possibility, in the present first embodiment, the ECU 39 performs the respective routines shown in FIG. 4 and FIG. 5, which will be described later. That is, the ECU 39 determines whether or not a misfire is caused in the engine 11. When the ECU 39 determines that the misfire is caused in the engine 11, the ECU 39 stops the individual cylinder air-fuel ratio estimation and the individual cylinder air-fuel ratio control and resets the individual cylinder correction value by the individual cylinder air-fuel ratio control.

In the following, processing contents of the respective routines shown in FIG. 4 to FIG. 12, which are performed by the ECU 39, will be described.

[Misfire Determination Routine]

Figure 4:
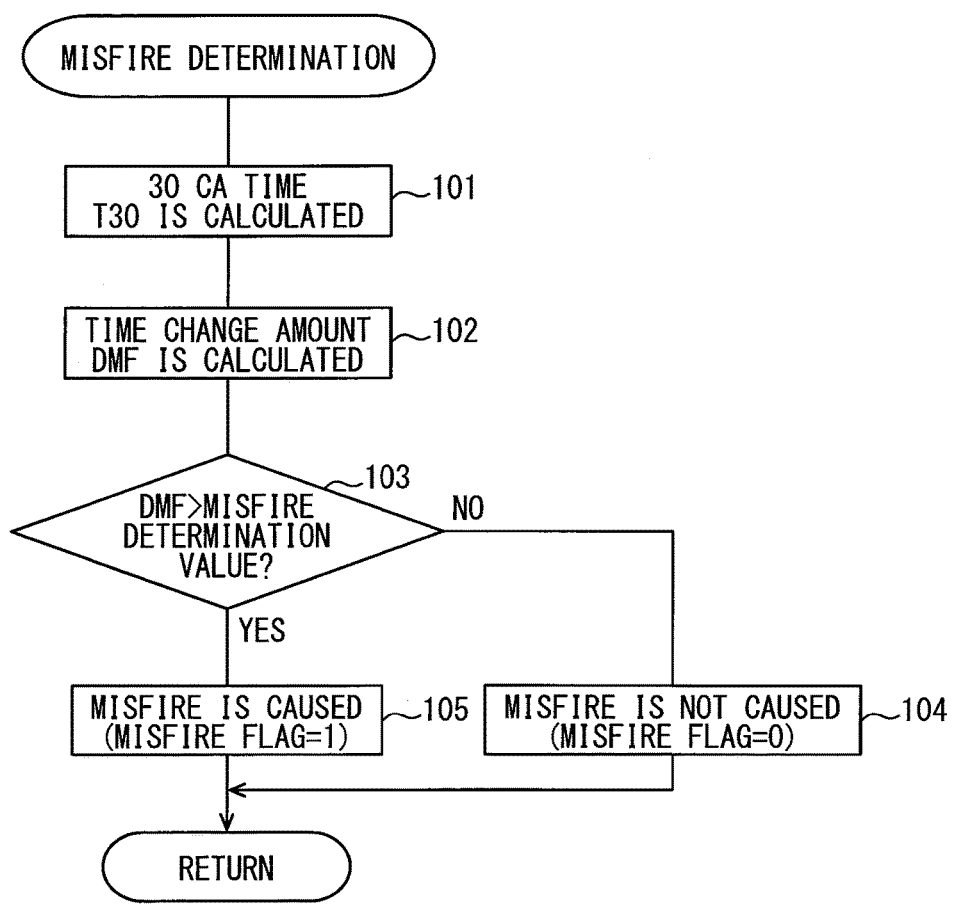
FIG. 4 is a flow chart to show a flow of a processing of a misfire determination routine.

A misfire determination routine shown in FIG. 4 is invoked at intervals of a specified crank angle (for example, 30 CA) in synchronization with an output pulse of a crank angle sensor 33 and functions as a misfire determination part.

When the present routine is invoked, first, in step 101, a 30 CA time T30 that is a time required for a crankshaft of the engine 11 to rotate 30 CA is calculated on the basis of an output signal of the crank angle sensor 33 at intervals of a specified timing (for example, at intervals of a specified misfire determination crank angle).

Then, the routine proceeds to step 102 where a time change amount DMF (information of a variation in the rotation of an engine) that is a difference between a 30 CA time T30 (i) of this time and a 30 CA time T30 (i−1) of the last time is calculated.

Then, the routine proceeds to step 103 where it is determined whether or not the time change amount DMF is more than a misfire determination value.

In a case where it is determined in this step 103 that the time change amount DMF is not more than the misfire determination value, the routine proceeds to step 104 where it is determined that a misfire is not caused in the engine 11 and where a misfire flag is reset to "0". Then, the present routine is finished.

On the other hand, in a case where it is determined in the step 103 that the time change amount DMF is more than the misfire determination value, the routine proceeds to step 105 where it is determined that a misfire is caused in the engine 11 and where the misfire flag is set to "1". Then, the present routine is finished. In this regard, it is also recommended to determine that a misfire is caused in the engine 11 when the number of times (the number of consecutive times) the time change amount DMF is consecutively determined to be more than the misfire determination value is more than a specified value, or to determine that a misfire is caused in the engine 11 when the number of times (the number of cumulative times) the time change amount DMF is determined to be more than the misfire determination value within a specified period is more than a specified value.

Further, in the routine shown in FIG. 4, it is determined whether or not a misfired is caused in the engine 11 by comparing the time change amount DMF with the misfire determination value. However, a method for determining whether or not a misfire is caused in the engine 11 is not limited to this but may be modified as appropriate. For example, it is also recommended to determine whether or not a misfire is caused in the engine 11 by comparing an amount of change in the rotation of the engine with a misfire determination value.

[Performance Condition Determination Routine]

Figure 5:
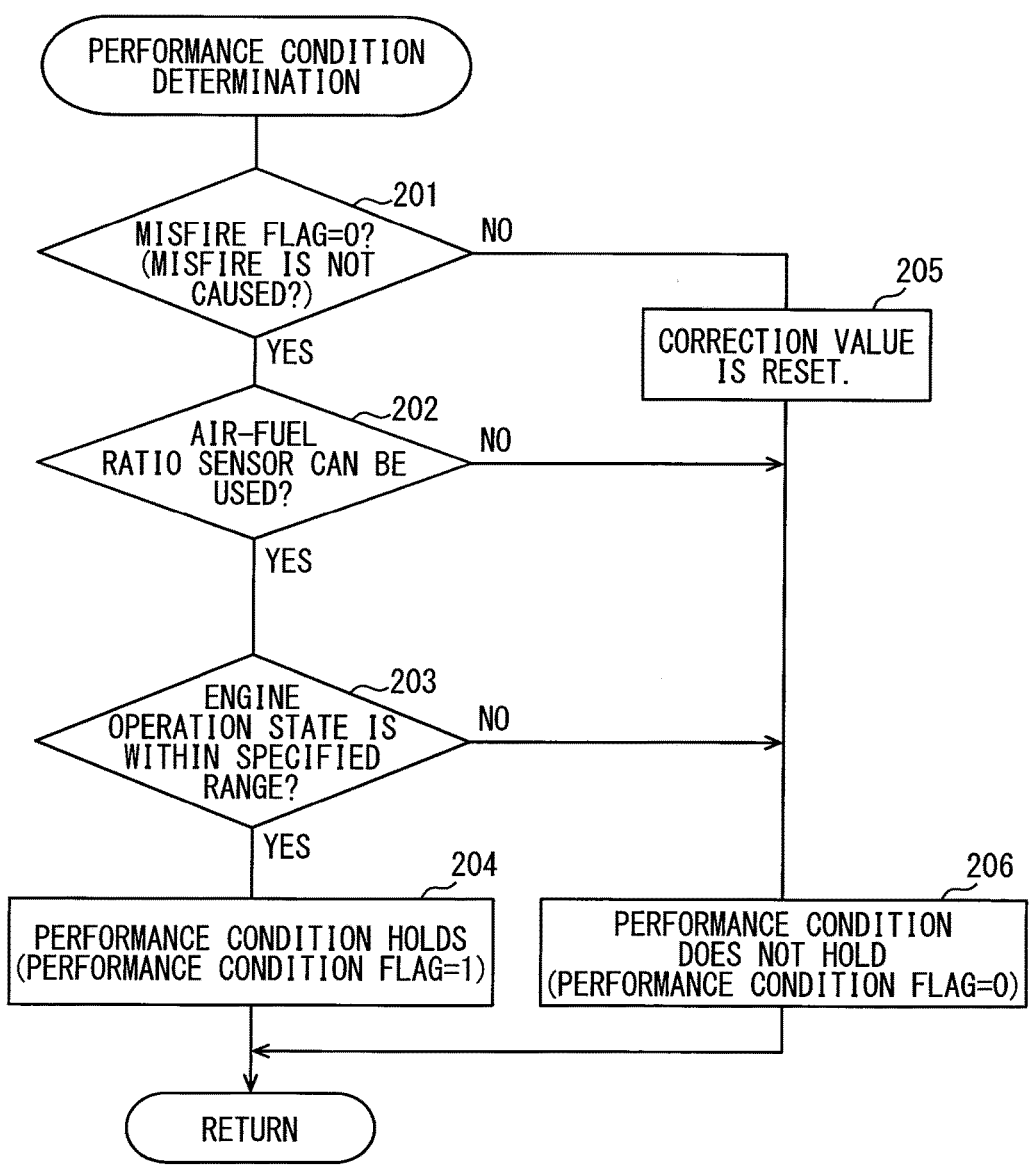
FIG. 5 is a flow chart to show a flow of a processing of a performance condition determination routine of the first embodiment.

A performance condition determination routine shown in FIG. 5 is invoked at intervals of a specified crank angle (for example, 30 CA) in synchronization with the output pulse of the crank angle sensor 33. When the present routine is invoked, first, in step 201, it is determined whether or not a misfire flag=0 (misfire is not caused).

In a case where it is determined in this step 201 that a misfire flag=0 (misfire is not caused), the routine proceeds to step 202 where it is determined whether or not the air-fuel ratio sensor 36 can be used (for example, the air-fuel ratio sensor 36 is normal and in an active state).

In a case where it is determined in this step 202 that the air-fuel ratio sensor 36 can be used, the routine proceeds to step 203 where it is determined whether or not an engine operation state (for example, an engine load and an engine rotation speed) is within a specified range (for example, a range in which an air-fuel ratio estimation accuracy can be secured).

In a case where it is determined that all of the steps 201 to 203 are "Yes" (that is, in a case where all conditions of the steps 201 to 203 are satisfied), the routine proceeds to step 204 where it is determined that a performance condition of the individual cylinder air-fuel ratio control holds and where a performance condition flag is set to "1", and then the present routine is finished.

On the other hand, in a case where it is determined that the misfire flag=1 (the misfire is caused), the routine proceeds to step 205 where an individual cylinder correction value (a fuel correction amount) of the individual cylinder is reset to a specified value (for example, an initial value or a value before a timing when it is determined that the misfire is caused). Then, the routine proceeds to step 206 where it is determined that the performance condition of the individual cylinder air-fuel ratio control does not hold and where the performance condition flag is reset to "0". Then, the present routine is finished. According to the pieces of processing, when it is determined that a misfire is caused in the engine 11 (misfire flag=1), the performance condition of the individual cylinder air-fuel ratio control is made not to hold (performance condition flag=0), whereby the individual cylinder air-fuel ratio estimation and the individual cylinder air-fuel ratio control are stopped and the individual cylinder correction value of the individual cylinder is reset. Hence, in the present first embodiment, the routine shown in FIG. 5 functions as a stop part.

In a case where it is determined that the processing in step 202 or 203 is "No", the routine proceeds to step 206 where it is determined that the performance condition of the individual cylinder air-fuel ratio control does not hold and the performance condition flag is reset to "0". Then, the present routine is finished.

[Individual Cylinder Air-Fuel Ratio Control Routine]

Figure 6:
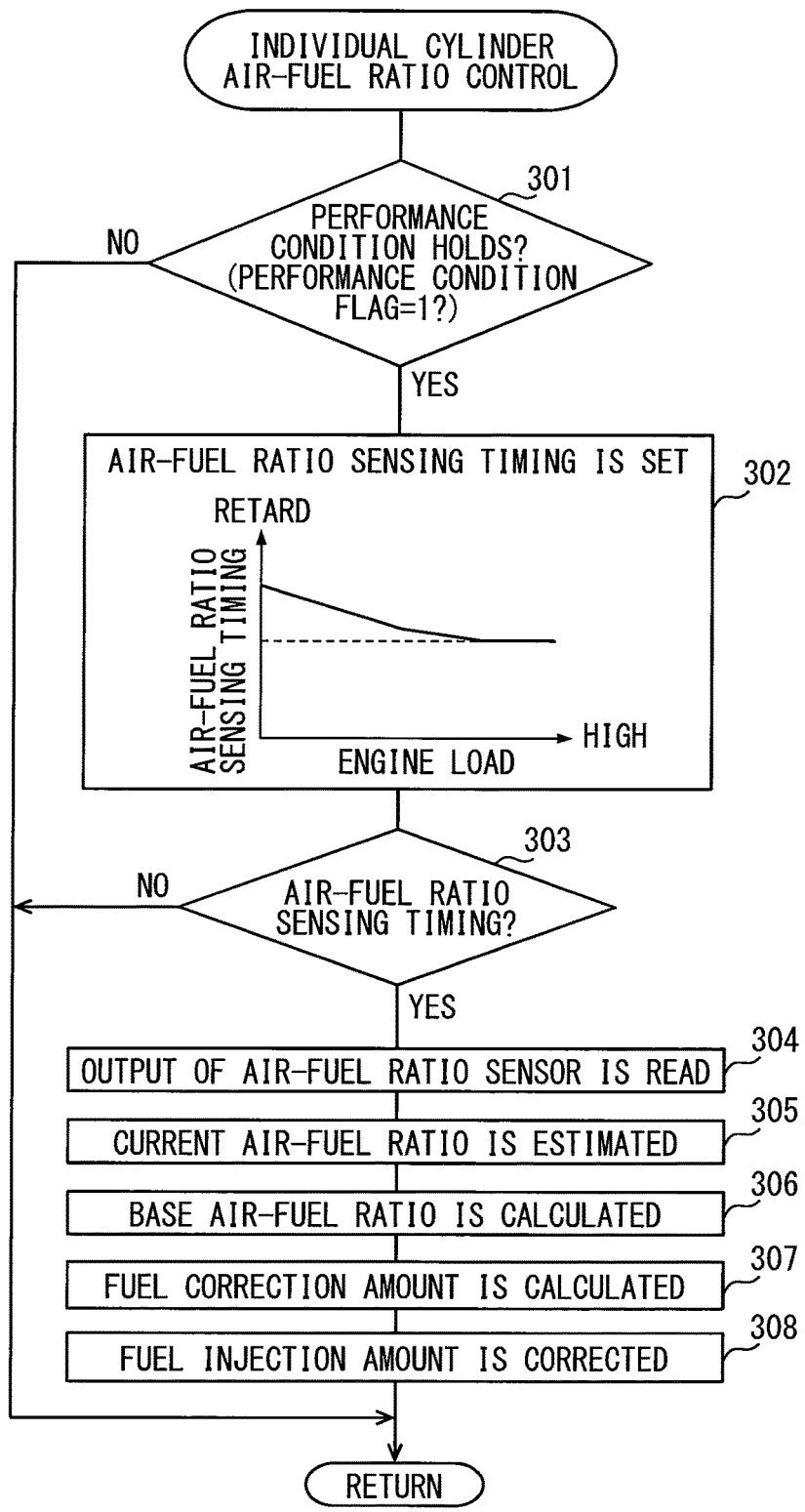
FIG. 6 is a flow chart to show a flow of a processing of an individual cylinder air-fuel ratio control routine.

An individual cylinder air-fuel ratio control routine shown in FIG. 6 is invoked at intervals of a specified crank angle (for example, 30 CA) in synchronization with the output pulse of the crank angle sensor 33 and functions as an individual cylinder air-fuel ratio control part.

When the present routine is invoked, first, in step 301, whether or not the performance condition of the individual cylinder air-fuel ratio control holds is determined by whether or not the performance condition flag is set to "1".

In a case where it is determined in this step 301 that the performance condition of the individual cylinder air-fuel ratio control does not hold (performance condition flag=0), the present routine is finished without performing pieces of processing relating to the individual cylinder air-fuel ratio control in step 302 and subsequent steps. In this way, in a case where it is determined that a misfire is caused in the engine 11 (misfire flag=1) and where it is determined that the performance condition of the individual cylinder air-fuel ratio control does not hold (performance condition flag=0), the individual cylinder air-fuel ratio estimation and the individual cylinder air-fuel ratio control are stopped.

On the other hand, in a case where it is determined in the step 301 that the performance condition of the individual cylinder air-fuel ratio control holds (performance condition flag=1), pieces of processing relating to the individual cylinder air-fuel ratio control in the step 302 and subsequent steps are performed in the following manner.

First, in step 302, an air-fuel ratio sensing timing of the individual cylinder (sampling timing of the output of the air-fuel ratio sensor 36) is set by a map according to an engine load at that time (for example, intake pipe pressure). In this regard, the air-fuel ratio sensing timing of the individual cylinder may be set by a map according to the engine load and the engine rotation speed. The map used for setting the air-fuel ratio sensing timing is learned and corrected by a Local learning performance routine shown in FIG. 9, which will be describe later, and by a Global learning performance routine shown in FIG. 11, which will be describe later.

Then, the routine proceeds to step 303 where it is determined whether or not a present crank angle is an air-fuel ratio sensing timing set in the step 302. If it is determined that the present crank angle is the air-fuel ratio sensing timing set in the step 302, the present routine is finished without performing pieces of processing in the following steps.

On the other hand, if it is determined that the present crank angle is the air-fuel ratio sensing timing set in the step 302, the routine proceeds to step 304 where the output of the air-fuel ratio sensor 36 (sensed value of the air-fuel ratio) is read.

Then, the routine proceeds to step 305 where an air-fuel ratio of a cylinder, whose air-fuel ratio is to be estimated this time, is estimated on the basis of the sensed value of the air-fuel ratio sensor 36 by the use of the individual cylinder air-fuel ratio estimation model described above. The processing of this step 305 functions as an individual cylinder air-fuel ratio estimation part.

Then, the routine proceeds to step 306 where a mean value of the estimated air-fuel ratios of all cylinders is calculated and where the mean value is set for a base air-fuel ratio (target air-fuel ratio of all cylinders).

Then, the routine proceeds to step S307 where a deviation between the estimated air-fuel ratio of the individual cylinder and the base air-fuel ratio is calculated and where a fuel correction amount is calculated as an individual cylinder correction value of the individual cylinder in such a way that the deviation is reduced.

Then, the routine proceeds to step 308 where the fuel injection amount of the individual cylinder is corrected on the basis of the fuel correction amount of the individual cylinder to thereby correct the air-fuel ratio of an air-fuel mixture to be supplied to the individual cylinder, thereby controlling the air-fuel ratio in such a way that a variation in the air-fuel ratio between the cylinders is reduced.

[Air-Fuel Ratio Sensing Timing Determination Routine]

Figure 7:
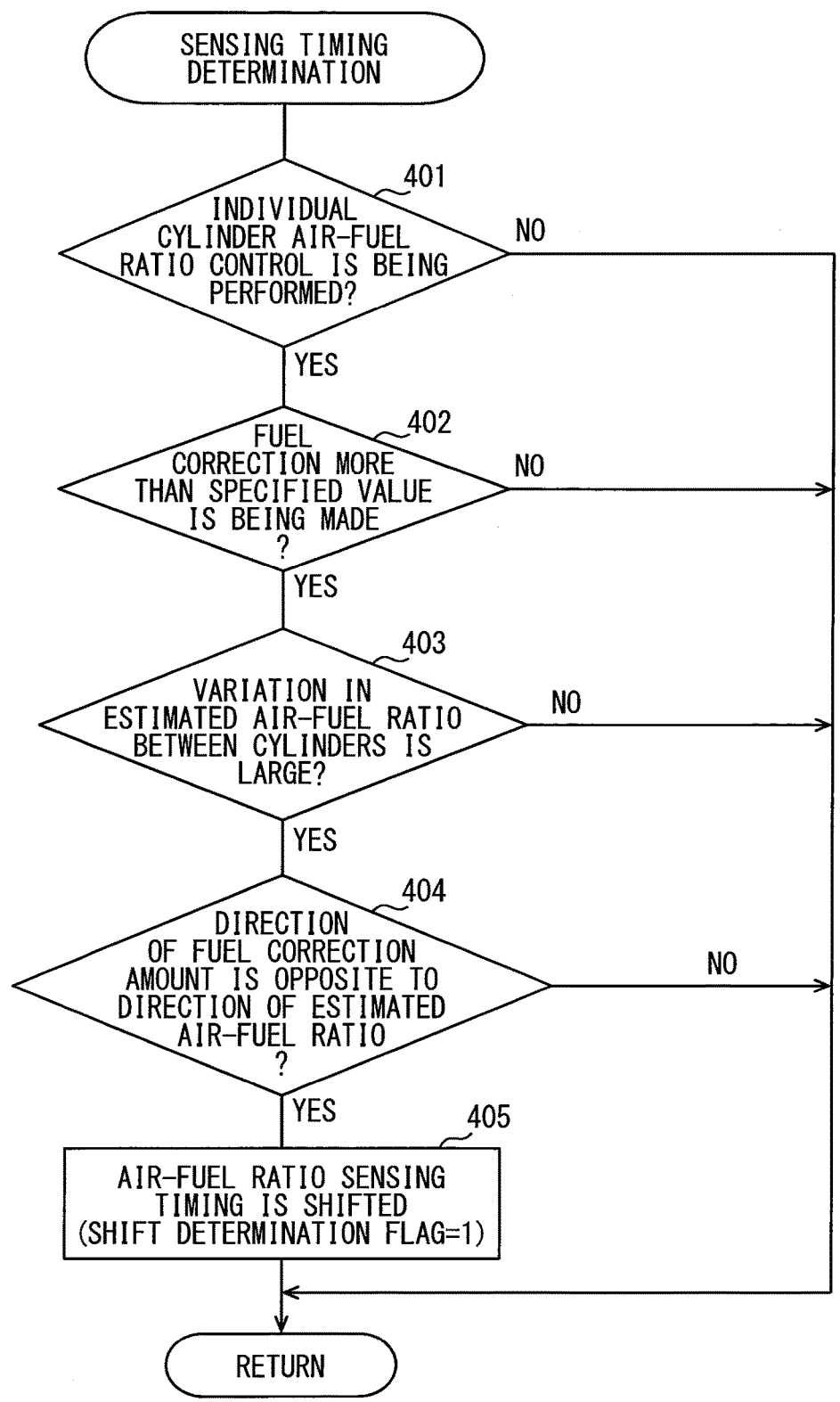
FIG. 7 is a flow chart to show a flow of a processing of an air-fuel ratio sensing timing determination routine.

An air-fuel ratio sensing timing determination routine shown in FIG. 7 is invoked at intervals of a specified crank angle (for example, 30 CA) in synchronization with the output pulse of the crank angle sensor 33. When the present routine is invoked, first, in step 401, it is determined whether or not an individual cylinder air-fuel ratio control is being performed. If it is determined that the individual cylinder air-fuel ratio control is not being performed, the present routine is finished without performing pieces of processing in the following steps.

On the other hand, if it is determined that the individual cylinder air-fuel ratio control is being performed, the routine proceeds to step 402 where it is determined, for example, by any one or two or more of the following conditions (A1) to (A3) whether or not a fuel correction not less than a specified value is being made.

(A1) Whether or not a fuel correction not less than a specified value is being made is determined by whether or not a deviation between a maximum fuel correction amount and a minimum fuel correction amount of the fuel correction amounts of the individual cylinders is not less than a specified value.

(A2) Whether or not a fuel correction not less than a specified value is being made is determined by whether or not a standard deviation of fuel correction amounts of all cylinders is not less than a specified value.

(A3) Whether or not a fuel correction not less than a specified value is being made is determined by whether or not the time that elapses after a fuel correction is started is not less than a specified time.

If it is determined in this step 402 that a fuel correction not less than a specified value is not being made, the present routine is finished without performing any more processing.

On the other hand, if it is determined in this step 402 that a fuel correction not less than a specified value is being made, the routine proceeds to step 403 where it is determined, for example, by any one or both of the following conditions (B1) and (B2) whether or not the degree of a variation in the estimated air-fuel ratio between the cylinders is large.

(B1) Whether or not the degree of a variation in the estimated air-fuel ratio between the cylinders is large is determined by whether or not a deviation between a maximum estimated air-fuel ratio and a minimum estimated air-fuel ratio of the estimated air-fuel ratios of the individual cylinders is not less than a specified value.

(B2) Whether or not the degree of a variation in the estimated air-fuel ratio between the cylinders is large is determined by whether or not a standard deviation of the estimated air-fuel ratios of all cylinders is not less than a specified value.

If it is determined in this step 403 that the degree of a variation in the estimated air fuel ratio between the cylinders is small, it is determined that an air-fuel ratio sensing timing is correct and the present routine is finished without performing any more processing.

On the other hand, if it is determined in the step 403 that the degree of a variation in the estimated air fuel ratio between the cylinders is large, it is determined that an air-fuel ratio sensing timing can be shifted from a proper air-fuel ratio sensing timing and the routine proceeds to step 404. Whether or not a direction in which a fuel correction amount of the individual cylinder is increased or decreased is opposite to a direction in which an estimated air-fuel ratio is increased or decreased is determined in step 404, for example, by whether or not a deviation between a rate of change in a fuel correction amount of the individual cylinder and a rate of change in an estimated air-fuel ratio of the individual cylinder is not less than a specified value.

If it is determined in this step 404 that a direction in which a fuel correction amount of the individual cylinder is increased or decreased is same as a direction in which an estimated air-fuel ratio is increased or decreased, it is determined that an air-fuel ratio sensing timing is correct and the present routine is finished without performing any other processing.

On the other hand, if it is determined in the step 404 that a direction in which a fuel correction amount of the individual cylinder is increased or decreased is opposite to a direction in which an estimated air-fuel ratio is increased or decreased, the routine proceeds to step 405 where it is determined that an air-fuel ratio sensing timing is shifted from a proper air-fuel ratio sensing timing and where a shift determination flag is set to "1" and then the present routine is finished.

[Air-Fuel Ratio Sensing Timing Shift Learning Correction Routine]

Figure 8:
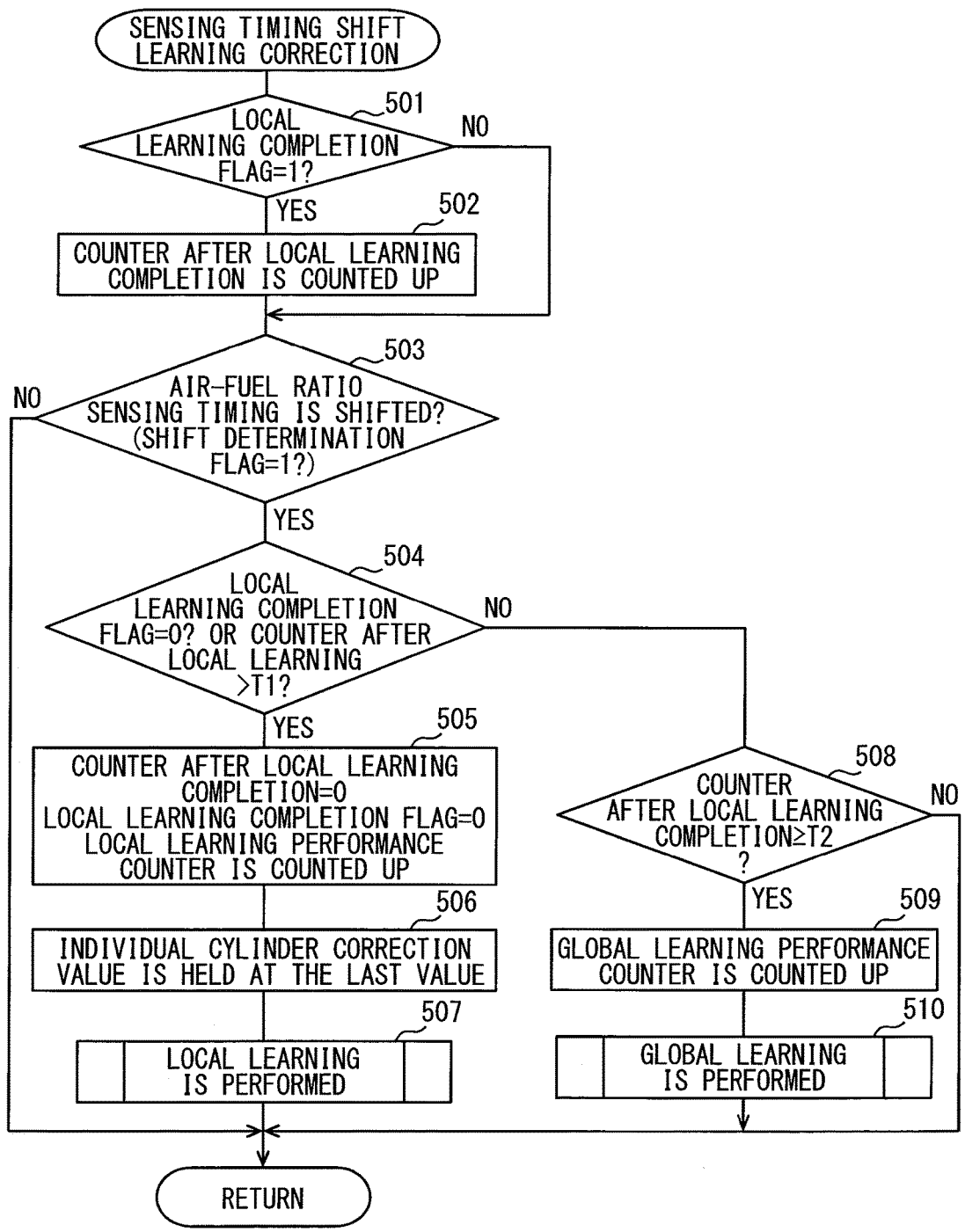
FIG. 8 is a flow chart to show a flow of a processing of an air-fuel ratio sensing timing shift learning correction routine.

An air-fuel ratio sensing timing shift learning correction routine shown in FIG. 8 is invoked at intervals of a specified crank angle (for example, 30 CA) in synchronization with the output pulse of the crank angle sensor 33. When the present routine is invoked, first, in step 501, it is determined whether or not a Local learning completion flag is set to "1". If it is determined that a Local learning completion flag is set to "1", the routine proceeds to step 502 where a counter after Local learning completion is counted up.

Then, the routine proceeds to step 503 where whether or not an air-fuel ratio sensing timing is shifted from a proper air-fuel ratio sensing timing is determined, by the use of the air-fuel ratio sensing timing determination routine shown in FIG. 7, by whether or not a shift determination flag is set to "1".

In a case where it is not determined in this step 503 that the air-fuel ratio sensing timing is shifted from a proper air-fuel ratio sensing timing (in a case where shift determination flag=0), the present routine is finished without performing pieces of processing after step 504.

On the other hand, in a case where it is determined in the step 503 that the air-fuel ratio sensing timing is shifted from a proper air-fuel ratio sensing timing (in a case where shift determination flag=1), the routine proceeds to step 504 where it is determined whether or not a Local learning completion flag is "0" or whether or not a counted value of a counter after Local learning completion is not less than a specified value T1.

In a case where it is determined in this step 504 that the Local learning completion flag is "0" or that the counted value of the counter after Local learning completion is not less than the specified value T1, the routine proceeds to step 505. In this step 505, the counted value of the counter after Local learning completion is reset to "0" and the Local learning completion flag is reset to "0" and a Local learning performance counter is counted up.

Then, the routine proceeds to step 506 where an individual cylinder correction value (fuel correction amount) of the individual cylinder is held at the last value. Then, the routine proceeds to step 507 where a Local learning performance routine shown in FIG. 9, which will be described later, is performed, whereby a Local learning for correcting an air-fuel ratio sensing timing is performed in such a way that a variation in the sensed value of the air-fuel ratio sensor 36 becomes maximum within one cycle.

On the other hand, in a case where it is determined in the step 504 that the Local learning completion flag is "1" and that the counted value of the counter after Local learning completion does not reach a specified value T1, the routine proceeds to step 508 where it is determined whether or not the counted value of the counter after Local learning completion is not less than a specified value T2. Here, the specified value T2 is a value smaller than the specified value T1 (T2<T1).

In a case where it is determined in this step 508 that the counted value of the counter after Local learning completion does not reach the specified value T2, it is determined that a sufficient time necessary for the individual cylinder air-fuel ratio control to be stable does not elapse after the Local learning is completed and hence the present routine is finished.

Then, in a case where it is determined in the step 508 that the counted value of the counter after Local learning completion is not less than the specified value T2, it is determined that a sufficient time necessary for the individual cylinder air-fuel ratio control to be stable elapses after the Local learning is completed. Then, the routine proceeds to step 509 where a Global learning performance counter is counted up.

Then, the routine proceeds to step 510 where a Global learning performance routine shown in FIG. 11, which will be described later, is performed, thereby performing a Global learning for correcting an air-fuel sensing timing on the basis of a relationship between a change in the estimated air-fuel ratio of the individual cylinder and a change in the individual cylinder correction value (fuel correction value) of the individual cylinder.

[Local Learning Performance Routine]

Figure 9:
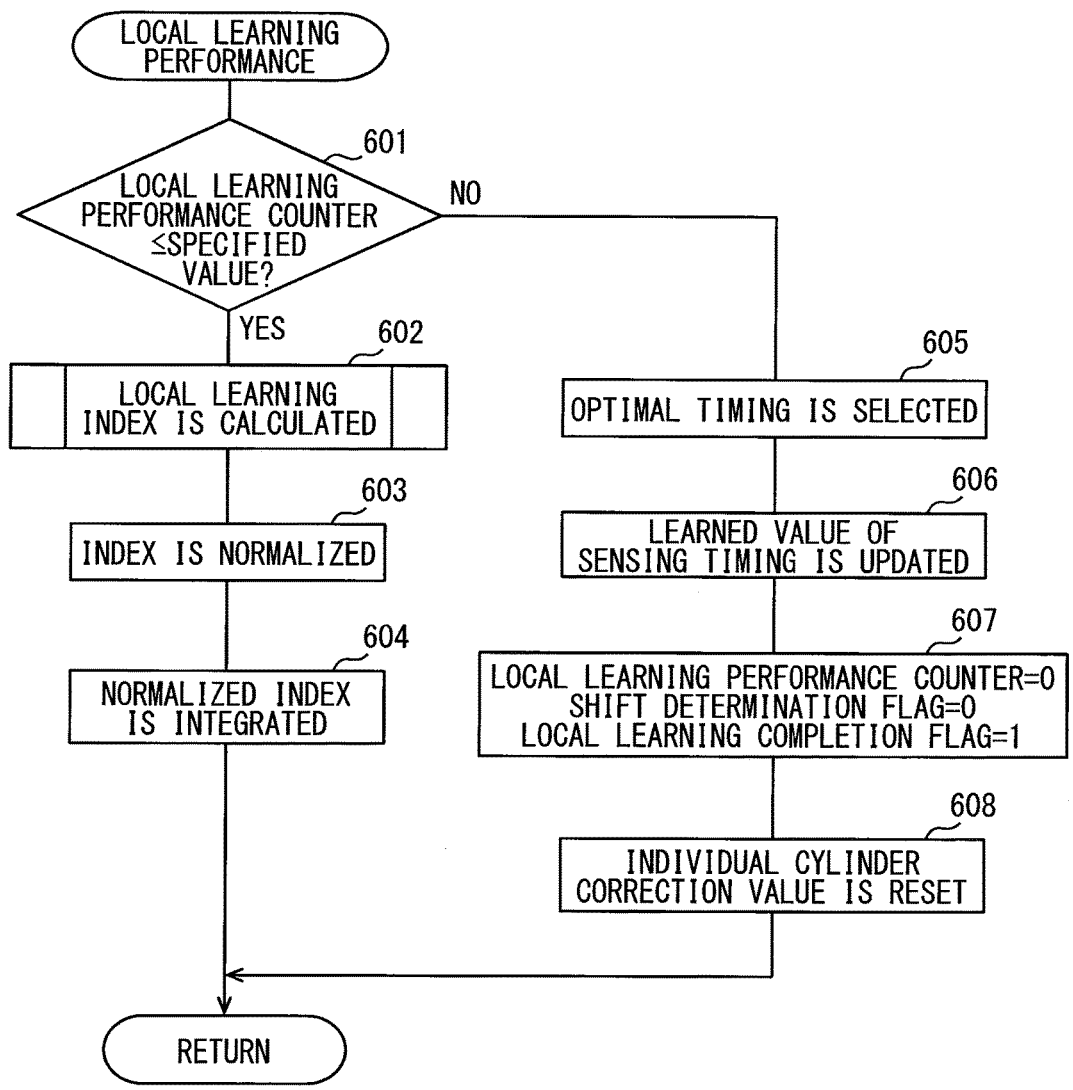
FIG. 9 is a flow chart to show a flow of a processing of a Local learning performance routine.

A Local learning performance routine shown in FIG. 9 is a subroutine performed in step 507 of the air-fuel ratio sensing timing shift learning correction routine shown in FIG. 8.

In the present routine is performed a Local learning for correcting an air-fuel ratio sensing timing in such a way that a variation in the sensed value of the air-fuel ratio sensor 36 becomes maximum within one cycle. In this Local learning, an air-fuel ratio sensing timing is corrected in such a way that a value corresponding to the variance of the sensed value of the air-fuel ratio sensor 36, which is sensed at intervals of an air-fuel ratio sensing timing of the individual cylinder, becomes maximum.

When the present routine is invoked, first, in step 601, it is determined whether or not the counted value of the Local learning performance counter is not more than a specified value (for example, a value corresponding to 30 cycles).

Figure 10:
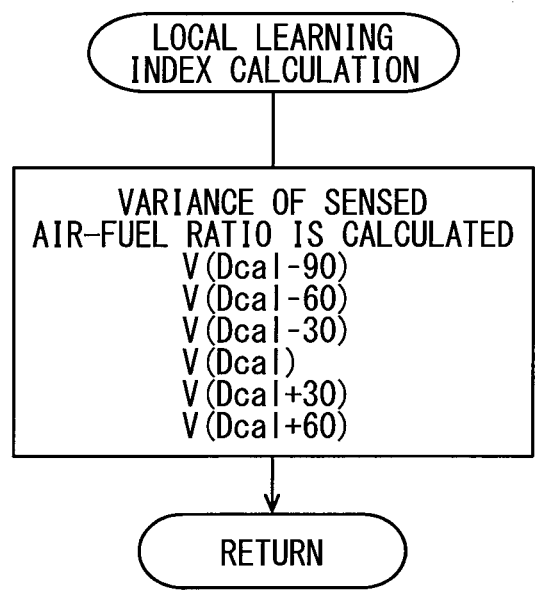
FIG. 10 is a flow chart to show a flow of a processing of a Local learning index calculation routine.

If it is determined in this step 601 that the counted value of the Local learning performance counter is not more than the specified value, the routine proceeds to step 602 where a Local learning index calculation routine shown in FIG. 10 is performed to thereby calculate a Local learning index in the following manner. In a case where an air-fuel ratio sensing timing of a first cylinder #1 is assumed to be respective timings L1 to L6 (CA), a value (hereinafter referred to as "the variance of the sensed air-fuel ratio") corresponding to the variance of the sensed value of the air-fuel ratio sensor 36, which is sensed at intervals of the air-fuel ratio sensing timing of the individual cylinder, is calculated and the variance of the sensed air-fuel ratio is assumed to be a Local learning index.

(1) Variance V (Dcal−90) of an sensed air-fuel ratio in a case where an air-fuel ratio sensing timing of the first cylinder #1 is assumed to be a first timing L1=Dcal−90 (timing advanced by 90 CA from a present air-fuel ratio sensing timing Dcal of the first cylinder #1) is calculated by the following equation.

$$V(Dcal - 90) = \quad (4)$$
$$1/N \times \sum_{i=1}^{N} \{\phi(Dcal - 90 + 720/N \times (i-1)) - \text{Mean } \phi(Dcal - 90)\}^2$$

where N is the number of cylinders per one air-fuel ratio sensor 36 (for example, 4), and φ(k) is a sensed value of the air-fuel ratio sensor 36 at k [CA]. Further, Mean φ(k) is a mean value of {φ(k), φ(k+720/N*1), φ(k+720/N*2), φ(k+720/N*3)}. Here, φ(k) is calculated as an equivalent ratio (a reciprocal of an excess air-fuel ratio).

(2) Variance V (Dcal−60) of a sensed air-fuel ratio in a case where an air-fuel ratio sensing timing of the first cylinder #1 is assumed to be a second timing L2=Dcal−60 (timing advanced by 60 CA from the present air-fuel ratio sensing timing Dcal of the first cylinder #1) is calculated by the following equation.

$$V(Dcal - 60) = \quad (5)$$
$$1/N \times \sum_{i=1}^{N} \{\phi(Dcal - 60 + 720/N \times (i-1)) - \text{Mean } \phi(Dcal - 60)\}^2$$

(3) Variance V (Dcal−30) of a sensed air-fuel ratio in a case where an air-fuel ratio sensing timing of the first cylinder #1 is assumed to be a third timing L3=Dcal−30 (timing advanced by 30 CA from the present air-fuel ratio sensing timing Dcal of the first cylinder #1) is calculated by the following equation.

$$V(Dcal - 30) = \quad (6)$$
$$1/N \times \sum_{i=1}^{N} \{\phi(Dcal - 30 + 720/N \times (i-1)) - \text{Mean } \phi(Dcal - 30)\}^2$$

(4) Variance V (Dcal) of a sensed air-fuel ratio in a case where an air-fuel ratio sensing timing of the first cylinder #1 is assumed to be a fourth timing L4=Dcal (same timing as the present air-fuel ratio sensing timing Dcal of the first cylinder #1) is calculated by the following equation.

$$V(Dcal) = 1/N \times \sum_{i=1}^{N} \{\phi(Dcal + 720/N \times (i-1)) - \text{Mean } \phi(Dcal)\}^2 \quad (7)$$

(5) Variance V (Dcal+30) of a sensed air-fuel ratio in a case where an air-fuel ratio sensing timing of the first cylinder #1 is assumed to be a fifth timing L5=Dcal+30 (timing delayed by 30 CA from the present air-fuel ratio sensing timing Dcal of the first cylinder #1) is calculated by the following equation.

$$V(Dcal + 30) = \quad (8)$$
$$1/N \times \sum_{i=1}^{N} \{\phi(Dcal + 30 + 720/N \times (i-1)) - \text{Mean } \phi(Dcal + 30)\}^2$$

(6) Variance V (Dcal+60) of a sensed air-fuel ratio in a case where an air-fuel ratio sensing timing of the first cylinder #1 is assumed to be a sixth timing L6=Dcal+60 (timing delayed by 60 CA from the present air-fuel ratio sensing timing Dcal of the first cylinder #1) is calculated by the following equation.

$$V(Dcal + 60) = \quad (9)$$
$$1/N \times \sum_{i=1}^{N} \{\phi(Dcal + 60 + 720/N \times (i-1)) - \text{Mean } \phi(Dcal + 60)\}^2$$

In this way, in a case where the air-fuel ratio sensing timing of the first cylinder #1 is assumed to be the respective timings L1 to L6, the variance V of the respective sensed air-fuel ratios (Local learning index) is calculated, and then the routine proceeds to step 603 shown in FIG. 9. In this step 603, in a case where the air-fuel ratio sensing timing of the first cylinder #1 is assumed to be the respective timings L1 to L6, the variance V of the respective sensed air-fuel ratios (Local learning index) is normalized.

Specifically, higher points (for example, 5 to 0 point) are appended, in order of decreasing value of the variance, to the variances of V(Dcal−90), V(Dcal−60), V(Dcal−30), V(Dcal), V(Dcal+30), V(Dcal+60) of the sensed air-fuel ratios in a case where the air-fuel ratio sensing timing of the first cylinder #1 is assumed to be the respective timings L1 to L6. These points Point (Dcal−90), Point (Dcal−60), Point (Dcal−30), Point (Dcal), Point (Dcal+30), Point (Dcal+60) are made normalized indexes (data obtained by normalizing the variance V of the sensed air-fuel ratio).

(Dcal−90)→Point (Dcal−90)
(Dcal−60)→Point (Dcal−60)
V (Dcal−30)→Point (Dcal−30)
(Dcal)→Point (Dcal)
(Dcal+30)→Point (Dcal+30)
(Dcal+60)→Point (Dcal+60)

Then, the routine proceeds to step 604. In step 604, in a case where the air-fuel ratio sensing timing of the first cylinder #1 is assumed to be the respective timings L1 to L6, a normalized index of this time is integrated to a normalized index of the last time (data obtained by normalizing the variance V of the sensed air-fuel ratio) to thereby update an integrated value of the normalized index.

Then, at a timing when it is determined in the step 601 that a counted value of the Local learning performance counter becomes more than a specified value, it is determined that an integrated value in a specified period of the normalized index is calculated. Then, the routine proceeds to step 605 where, of the respective timings L1 to L6, a timing when the integrated value in a specified period of the normalized index becomes maximum is selected as an optimal timing.

Then, the routine proceeds to step 606 where the selected optimal timing (the timing when the integrated value in a specified period of the normalized index becomes maximum) is learned as an air-fuel ratio sensing timing of the first cylinder #1 and air-fuel ratio sensing timings of the other cylinders (the second cylinder #2 to the fourth cylinder #4)

are learned with the air-fuel ratio sensing timing of the first cylinder #1 as a standard. These learned values are updated and stored in a learned value storage region of a rewritable nonvolatile memory such as a backup RAM or the like of the ECU 39.

Then, the routine proceeds to step 607 where the counted value of the Local learning performance counter is reset to "0" and where the shift determination flag is reset to "0" and where the Local learning completion flag is set to "1". Then, the routine proceeds to step 608 where individual cylinder correction value (fuel correction amount) of the individual cylinder is reset to a specified value (for example, an initial value or a value before a shift determination). Then, the present routine is finished.

[Global Learning Performance Routine]

Figure 11:
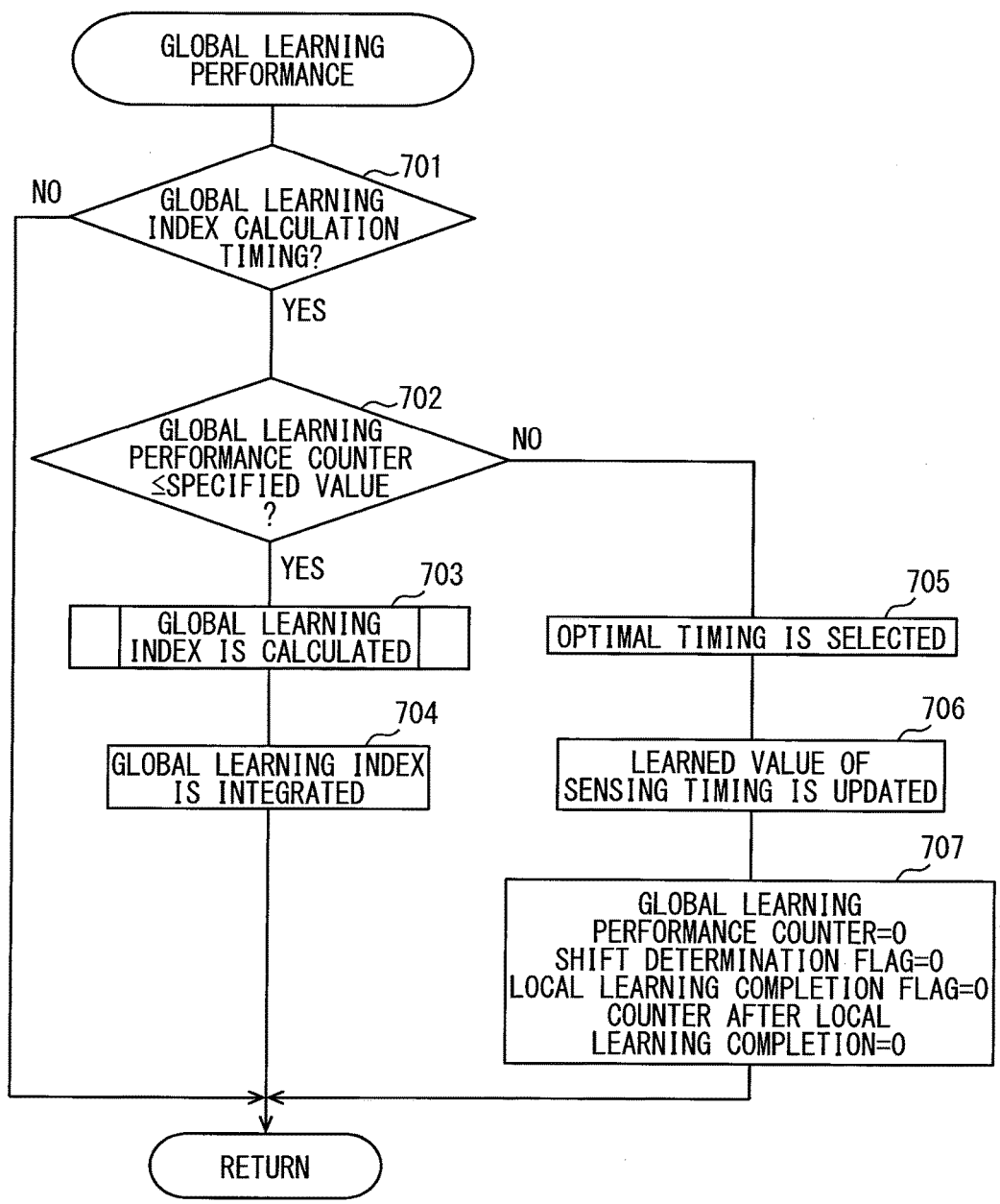
FIG. 11 is a flow chart to show a flow of a processing of a Global learning performance routine.

A Global learning performance routine shown in FIG. 11 is a subroutine performed in step 510 of the air-fuel ratio sensing timing shift learning correction routine shown in FIG. 8.

In the present routine is performed the Global learning for correcting an air-fuel ratio sensing timing on the basis of a relationship between a change in the estimated air-fuel ratio of the individual cylinder and a change in the individual cylinder correction value (fuel correction value) of the individual cylinder. In the Global learning, in respective cases where an individual cylinder number assumed by the estimated air-fuel ratio of the individual cylinder is changed hypothetically in a plurality of ways, a correlation value between a change in the estimated air-fuel ratio of the individual cylinder and a change in an individual cylinder correction value (fuel correction value) of a cylinder number after the estimated air-fuel ratio being changed is calculated and an air-fuel ratio sensing timing is corrected in such a way that the correlation value becomes maximum.

When the present routine is invoked, first, in step 701, it is determined whether or not this timing is a Global learning index calculation timing (for example, at intervals of 720 CA). If it is determined that this timing is not the Global learning index calculation timing, the present routine is finished without performing the pieces of processing in step 702 and subsequent steps.

On the other hand, if it is determined in the step 701 that this timing is the Global learning index calculation timing, the routine proceeds to step 702 where the counted value of the Global learning performance counter is not more than a specified value (for example, a value corresponding to 30 cycles).

Figure 12:
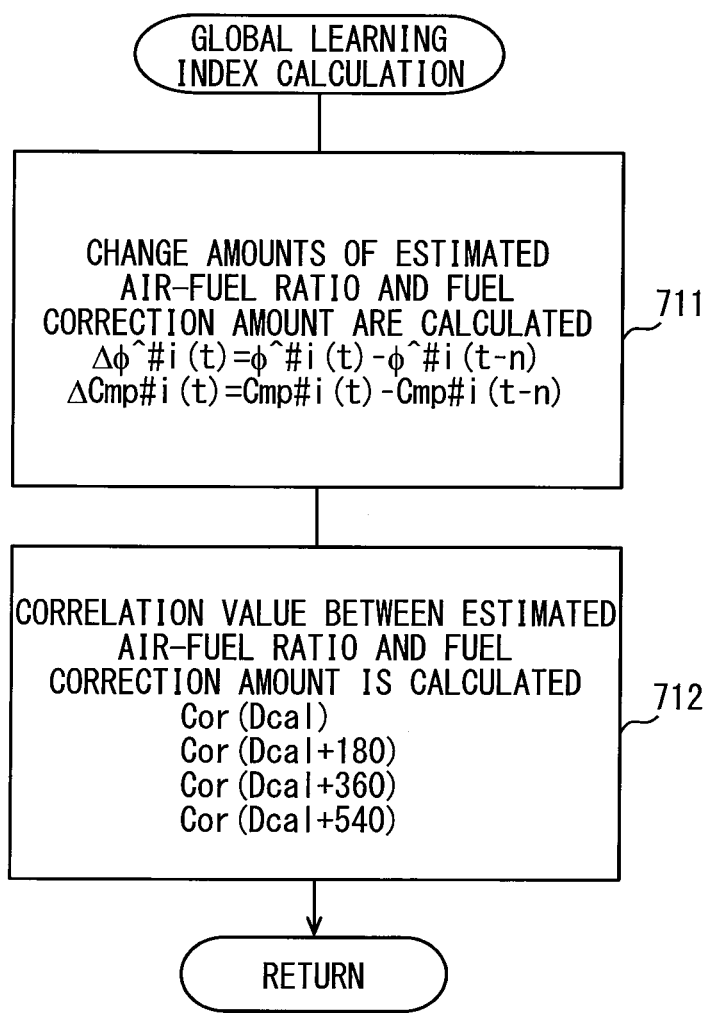
FIG. 12 is a flow chart to show a flow of a processing of a Global learning index calculation routine.

If it is determined in this step 702 that the counted value of the Global learning performance counter is not more than the specified value, the routine proceeds to step 703 where a Global learning index calculation routine shown in FIG. 12 is performed to thereby calculate a Global learning index in the following manner. In a case where an air-fuel ratio sensing timing of the first cylinder #1 is assumed to be respective timings G1 to G4 [CA], a correlation value between a change in the estimated air-fuel ratio of the individual cylinder and a change in the fuel correction amount of the individual cylinder is calculated and the correlation value is made a Global learning index.

Specifically, in step 711, a change amount $\Delta\varphi$ of the estimated air-fuel ratio of the individual cylinder and a change amount $\Delta Cmp$ of the fuel correction amount of the individual cylinder at the present air-fuel ratio sensing timing are calculated by the following equations.

$$\Delta\hat{\varphi}\#i(t)=\hat{\varphi}\#i(t)-\hat{\varphi}\#i(t-n) \qquad (10)$$

$$\Delta Cmp\#i(t)=Cmp\#i(t)-Cmp\#i(t-n) \qquad (11)$$

where $\hat{\varphi}\#i(t)$ is a calculated value of this time of the estimated air-fuel ratio of an i-th cylinder #i and $\hat{\varphi}\#i(t-n)$ is a calculated value of n times ago of the estimated air-fuel ratio of the i-th cylinder #i. Further, $Cmp\#i(t)$ is a calculated value of this time of the fuel correction amount of the i-th cylinder #i and $Cmp\#i(t-n)$ is a calculated value of n times ago of the fuel correction amount of the i-th cylinder #i. Here, n is a specified integer not less than 1.

Then, the routine proceeds to step 712 where in cases where the air-fuel ratio sensing timing of the first cylinder #1 is assumed to be the following respective timings G1 to G4 (CA), a correlation value between a change in the estimated air-fuel ratio of the individual cylinder and a change in the fuel correction amount of the individual cylinder (the sum of the product of a change amount $\Delta\varphi$ of the estimated air-fuel ratio and a change amount $\Delta Cmp$ of the fuel correction amount) is calculated respectively.

(1) In a case where an air-fuel ratio sensing timing of the first cylinder #1 is assumed to be a first timing G1=Dcal (same timing as the present air-fuel ratio sensing timing Dcal of the first cylinder #1), as shown in FIG. 13, an estimated air-fuel ratio $\hat{\varphi}\#1$ of the first cylinder #1 at the present air-fuel ratio sensing timing is calculated as an estimated air-fuel ratio of the first cylinder #1. Further, an estimated air-fuel ratio $\hat{\varphi}\#3$ of the third cylinder #3 at the present air-fuel ratio sensing timing is calculated as an estimated air-fuel ratio of the third cylinder #3, and an estimated air-fuel ratio $\hat{\varphi}\#4$ of the fourth cylinder #4 at the present air-fuel ratio sensing timing is calculated as an estimated air-fuel ratio of the fourth cylinder #4, and an estimated air-fuel ratio $\hat{\varphi}\#2$ of the second cylinder #2 at the present air-fuel ratio sensing timing is calculated as an estimated air-fuel ratio of the second cylinder #2.

Hence, a correlation value Cor (Dcal) in a case where the air-fuel ratio sensing timing of the first cylinder #1 is assumed to be the first timing G1=Dcal can be calculated by the following equation.

$$Cor(Dcal)=\Delta\hat{\varphi}\#1(t)\times\Delta Cmp\#1(t)+\Delta\hat{\varphi}\#3(t)\times\Delta Cmp\#3(t)+\Delta\hat{\varphi}\#4(t)\times\Delta Cmp\#4(t)+\Delta\hat{\varphi}\#2(t)\times\Delta Cmp\#2(t) \qquad (12)$$

(2) In a case where an air-fuel ratio sensing timing of the first cylinder #1 is assumed to be a second timing G2=Dcal+180 (timing delayed by 180 CA from the present air-fuel ratio sensing timing Dcal of the first cylinder #1), as shown in FIG. 13(b), an estimated air-fuel ratio $\hat{\varphi}\#1$ of the first cylinder #1 at the present air-fuel ratio sensing timing is calculated as an estimated air-fuel ratio of the second cylinder #2. Further, an estimated air-fuel ratio $\hat{\varphi}\#3$ of the third cylinder #3 at the present air-fuel ratio sensing timing is calculated as an estimated air-fuel ratio of the first cylinder #1, and an estimated air-fuel ratio $\hat{\varphi}\#4$ of the fourth cylinder #4 at the present air-fuel ratio sensing timing is calculated as an estimated air-fuel ratio of the third cylinder #3, and an estimated air-fuel ratio $\varphi\#2$ of the second cylinder #2 at the present air-fuel ratio sensing timing is calculated as an estimated air-fuel ratio of the fourth cylinder #4.

Hence, a correlation value Cor (Dcal+180) in a case where the air-fuel ratio sensing timing of the first cylinder #1 is assumed to be the second timing G2=Dcal+180 can be calculated by the following equation.

$$Cor(Dcal+180)=\Delta\hat{\varphi}\#3(t)\times\Delta Cmp\#1(t)+\Delta\hat{\varphi}\#4(t)\times\Delta Cmp\#3(t)+\hat{\varphi}\#2(t)\times\Delta Cmp\#4(t)+\Delta\hat{\varphi}\#1(t)\times\Delta Cmp\#2(t) \qquad (13)$$

(3) In a case where an air-fuel ratio sensing timing of the first cylinder #1 is assumed to be a third timing G3=Dcal+360 (timing delayed by 360 CA from the present air-fuel ratio sensing timing Dcal of the first cylinder #1), as shown in FIG. 13(c), an estimated air-fuel ratio φ^#1 of the first cylinder #1 at the present air-fuel ratio sensing timing is calculated as an estimated air-fuel ratio of the fourth cylinder #4. Further, an estimated air-fuel ratio φ^#3 of the third cylinder #3 at the present air-fuel ratio sensing timing is calculated as an estimated air-fuel ratio of the second cylinder #2, and an estimated air-fuel ratio φ^#4 of the fourth cylinder #4 at the present air-fuel ratio sensing timing is calculated as an estimated air-fuel ratio of the first cylinder #1, and an estimated air-fuel ratio φ^#2 of the second cylinder #2 at the present air-fuel ratio sensing timing is calculated as an estimated air-fuel ratio of the third cylinder #3.

Hence, a correlation value Cor (Dcal+360) in a case where the air-fuel ratio sensing timing of the first cylinder #1 is assumed to be the third timing G3=Dcal+360 can be calculated by the following equation.

$$Cor(Dcal+360)=\Delta\varphi\hat{}\#4(t)\times\Delta Cmp\#1(t)+\Delta\varphi\hat{}\#2(t)\times\Delta Cmp\#3(t)+\Delta\varphi\hat{}\#1(t)\times\Delta Cmp\#4(t)+\Delta\varphi\hat{}\#3(t)\times\Delta Cmp\#2(t) \quad (14)$$

(4) In a case where an air-fuel ratio sensing timing of the first cylinder #1 is assumed to be a fourth timing G4=Dcal+540 (timing delayed by 540 CA from the present air-fuel ratio sensing timing Dcal of the first cylinder #1), as shown in FIG. 13(d), an estimated air-fuel ratio φ^#1 of the first cylinder #1 at the present air-fuel ratio sensing timing is calculated as an estimated air-fuel ratio of the third cylinder #3. Further, an estimated air-fuel ratio φ^#3 of the third cylinder #3 at the present air-fuel ratio sensing timing is calculated as an estimated air-fuel ratio of the fourth cylinder #4, and an estimated air-fuel ratio φ^#4 of the fourth cylinder #4 at the present air-fuel ratio sensing timing is calculated as an estimated air-fuel ratio of the second cylinder #2, and an estimated air-fuel ratio φ^#2 of the second cylinder #2 at the present air-fuel ratio sensing timing is calculated as an estimated air-fuel ratio of the first cylinder #1.

Hence, a correlation value Cor (Dcal+360) in a case where the air-fuel ratio sensing timing of the first cylinder #1 is assumed to be the fourth timing G4=Dcal+540 can be calculated by the following equation.

$$Cor(Dcal+540)=\Delta\varphi\hat{}\#2(t)\times\Delta Cmp\#1(t)+\Delta\varphi\hat{}\#1(t)\times\Delta Cmp\#3(t)+\Delta\varphi\#3(t)\times\Delta Cmp\#4(t)+\Delta\varphi\hat{}\#4(t)\times\Delta Cmp\#2(t) \quad (15)$$

In this manner, in respective cases where the air-fuel ratio sensing timing of the first cylinder #1 is assumed to be the respective timings G1 to G4, the correlation value Cor (Global learning index) between a change in the estimated air-fuel ratio of the individual cylinder and a change in the fuel correction amount of the individual cylinder is calculated respectively. Then, the routine proceeds to step 704 shown in FIG. 11. In this step 704, in respective cases where the air-fuel ratio sensing timing of the first cylinder #1 is assumed to be the respective timings G1 to G4, a correlation value Cor of this time is integrated to an integrated value of the correlation value of the last time respectively to thereby update an integrated value of the correlation value Cor respectively. At this time, only plus values of the correlation values Cor may be integrated or only minus values of the correlation values Cor may be integrated.

Then, at a timing when it is determined in the step 702 that the counted value of the Global learning performance counter becomes more than a specified value, it is determined that an integrated value in a specified period of the correlation value Cor is calculated. Then, the routine proceeds to step 705 where a timing when the integrated value in the specified period of the correlation value of the respective timings G1 to G4 becomes maximum is selected as an optimal timing.

Then, the routine proceeds to step 706 where the selected optimal timing (timing when the integrated value in the specified period of the correlation value Cor becomes maximum) is learned as an air-fuel ratio sensing timing of the first cylinder #1 and the air-fuel ratio sensing timings of the other cylinders (the second cylinder #2 to the fourth cylinder #4) are learned with the air-fuel ratio sensing timing of the first cylinder #1 as a standard. These learned values are updated and stored in the learned value storage region of the rewritable nonvolatile memory of the backup RAM or the like of the ECU 39.

Then, the routine proceeds to step 707 where the counted value of the Global learning performance counter is reset to "0" and where the shift determination flag is reset to "0" and where the Local learning completion flag is reset to "0" and where the counted value of the counter after Local learning completion is reset to "0". Then, the present routine is finished.

These routines shown in FIG. 7 to FIG. 12 function as a sensing timing correction part.

In this regard, in a period from the completion of the Local learning to the completion of the Global learning, a F/B gain of the individual cylinder air-fuel ratio control may be increased. In this case, only a gain of a specific cylinder may be increased or different F/B gains may be set for respective cylinders.

Further, every time it is determined that the air-fuel ratio sensing timing is shifted from the proper air-fuel ratio sensing timing after the Local learning is performed (that is, after the air-fuel ratio sensing timing is corrected by the Local learning), the Global learning for correcting the air-fuel ratio sensing timing by a combustion interval of the engine 11 (180 CA in the case of a 4-cylinder engine) or by a plurality of times of the combustion interval may be performed to thereby replace the air-fuel ratio sensing timing of the individual cylinder with the air-fuel ratio sensing timing of the other cylinder. In this way, the air-fuel ratio sensing timing of the individual cylinder may be corrected to a correct air-fuel ratio sensing timing.

In the present first embodiment described above, when it is determined that a misfire is caused in the engine 11, the individual cylinder air-fuel ratio estimation and the individual cylinder air-fuel ratio control are stopped. Hence, it is possible to avoid the individual cylinder air-fuel ratio control from being continuously performed as usual in a state where an air-fuel ratio of the individual cylinder cannot be controlled correctly due to the misfire, which hence can prevent the exhaust emission from being impaired.

Further, in the present first embodiment, when it is determined that a misfire is caused in the engine 11, the individual cylinder air-fuel ratio estimation and the individual cylinder air-fuel ratio control are stopped and the individual cylinder correction value (fuel correction amount) by the individual cylinder air-fuel ratio control is reset. In this way, when the individual cylinder air-fuel ratio control is again started, the individual cylinder air-fuel ratio control can be started in a state where the individual cylinder correction value is reset (that is, in a state where the effect of the misfire is excluded).

In the present first embodiment, when it is determined that a misfire is caused in the engine 11, both of the individual cylinder air-fuel ratio estimation and the individual cylinder air-fuel ratio control are stopped. However, the present disclosure is not limited to this but only one of the individual cylinder air-fuel ratio estimation and the individual cylinder air-fuel ratio control may be stopped.

By stopping the individual cylinder air-fuel ratio estimation (by stopping the calculation of the estimated air-fuel ratio of the individual cylinder), it is possible to stop updating the individual cylinder correction value of the individual cylinder by the individual cylinder air-fuel ratio control. Hence, even if only the individual cylinder air-fuel ratio estimation is stopped, it is possible to get almost the same state as a state where the individual cylinder air-fuel ratio control is stopped (the calculation of the individual cylinder correction value of the individual cylinder is stopped). Hence, even if only one of the individual cylinder air-fuel ratio estimation and the individual cylinder air-fuel ratio control is stopped, it is possible to avoid the individual cylinder air-fuel ratio control from being performed continuously as usual in a state where the air-fuel ratio of the individual cylinder cannot be correctly controlled due to the misfire and hence to inhibit the exhaust emission from being impaired.

Second Embodiment

Next, a second embodiment of the present disclosure will be described by the use of FIG. 14 to FIG. 17. However, descriptions of parts substantially identical to those of the first embodiment will be omitted or simplified, whereas parts different from those of the first embodiment will be mainly described.

When the engine 11 is rapidly accelerated and then rapidly decelerated, in some cases, an exhaust flow rate is greatly decreased and the flow of the exhaust gas can stagnate. When the flow of the exhaust gas near the air-fuel ratio sensor 36 stagnates while the individual cylinder air-fuel ratio control is performed, in some case, the amplitude of the output of the air-fuel ratio sensor 36 can be reduced by the effect, which hence makes it difficult for the output of the air-fuel ratio sensor 36 to be read correctly at each air-fuel ratio sensing timing of the individual cylinder. In this case, there is a possibility that an estimated cylinder is mistaken (a corresponding relationship between an individual cylinder and an estimated air-fuel ratio is mistaken) and that the air-fuel ratio of the individual cylinder cannot be correctly controlled to thereby cause the deterioration of an exhaust emission. When an air-fuel ratio sensing timing correction is made in this state, the estimation accuracy of the air-fuel ratio of the individual cylinder can be further impaired.

As a countermeasure against the impairment of the estimation accuracy of the air-fuel ratio, in the present second embodiment, the ECU 39 performs the respective routines shown in FIG. 14 and FIG. 15, which will be described later. That is, the ECU 39 determines whether or not the stagnation of the flow of the exhaust of the engine 11 (hereinafter referred to as "an exhaust flow stagnation state") is caused. When the ECU 39 determines that the exhaust flow stagnation state is caused, the ECU 39 stops the individual cylinder air-fuel ratio estimation, the individual cylinder air-fuel ratio control, and the air-fuel ratio sensing timing correction.

At this time, in the present second embodiment, when the engine 11 is rapidly accelerated and then rapidly decelerated, it is determined that the exhaust flow stagnation state is caused. When the engine 11 is rapidly accelerated and then rapidly decelerated, the exhaust flow rate is greatly reduced and hence the flow of the exhaust stagnates. Hence, when the engine 11 is rapidly accelerated and then rapidly decelerated, it can be determined that the exhaust flow stagnation state (state where exhaust flow rate is greatly reduced) is caused.

Figure 14:
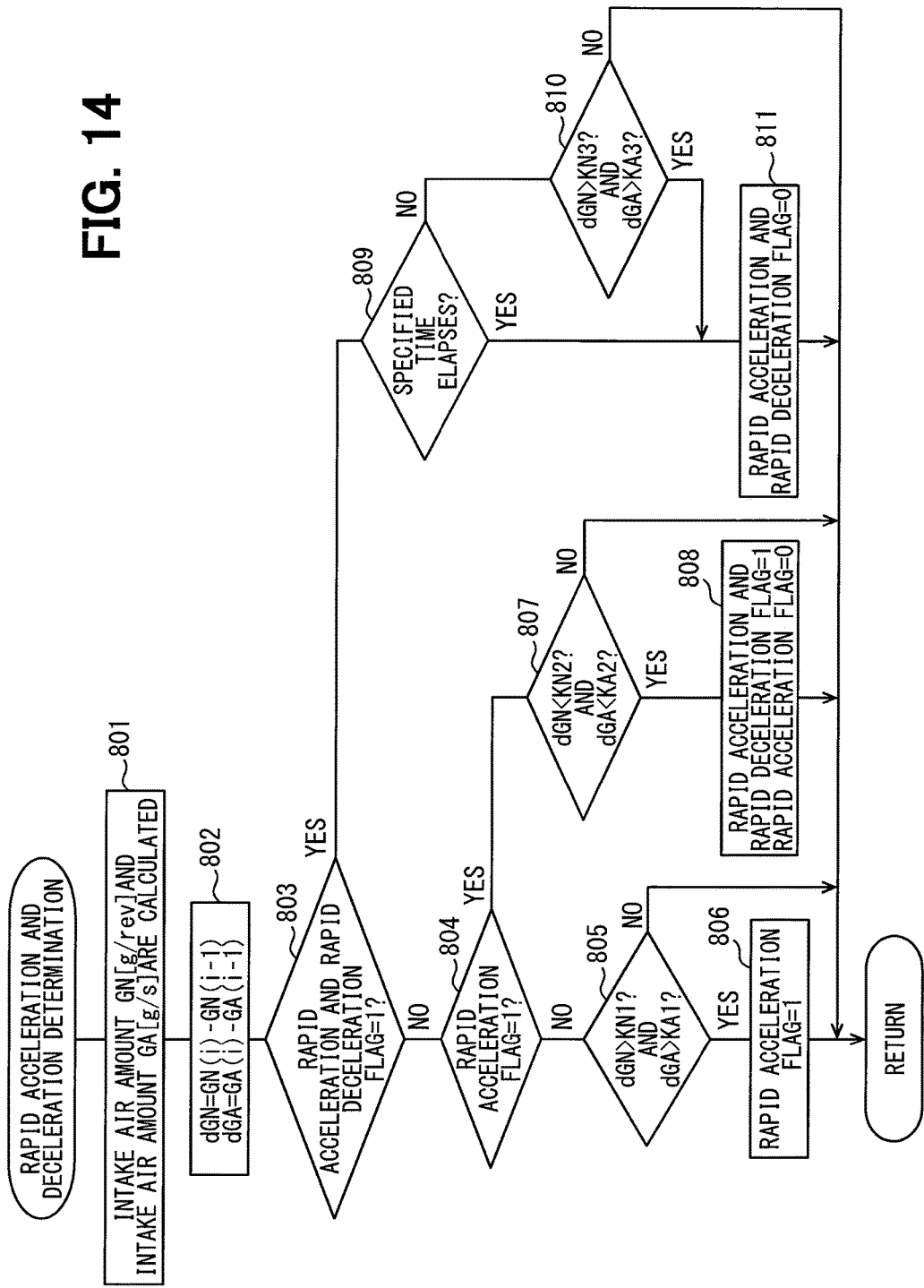
FIG. 14 is a flow chart to show a flow of a processing of a rapid acceleration and deceleration determination routine.
Figure 15:
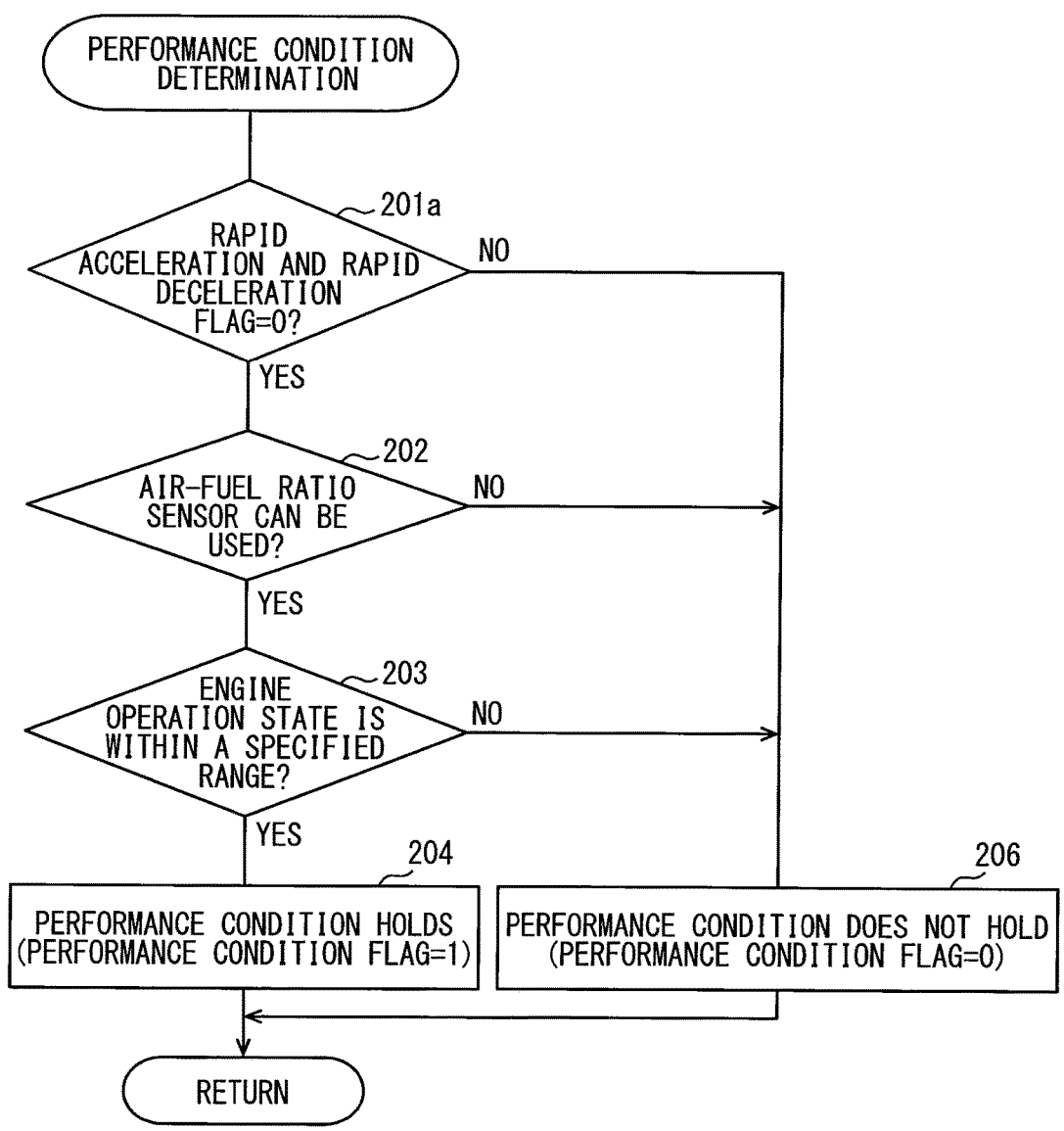
FIG. 15 is a flow chart to show a flow of a processing of a performance condition determination routine of a second embodiment.

Hereinafter, the contents of the pieces of processing of the respective routines, which are performed by the ECU 39 in the present second embodiment and are shown in FIG. 14 and FIG. 15, will be described.

[Rapid Acceleration and Deceleration Determination Routine]

A rapid acceleration and deceleration determination routine shown in FIG. 14 is invoked at intervals of a specified crank angle (for example, 30 CA) in synchronization with the output pulse of the crank angle sensor 33 and functions as an exhaust flow determination part.

When the present routine is invoked, first, in step 801, an intake air amount GN [g/rev] and an intake air amount GA [g/s] are calculated on the basis of the output signals of an air flow meter 14 and an intake pipe pressure sensor 18 at intervals of a specified timing (for example, at each TDC).

Then, the routine proceeds to step 802 where a difference between an intake air amount GN(i) of this time and an intake air amount GN(i−1) of the last time to thereby find a change amount dGN in a specified period (for example, in a period of TDC) of the intake air amount GN, and where a difference between the intake air amount GA(i) of this time and the intake air amount GA(i−1) of the last time to thereby find a change amount dGA in a specified period (for example, in a period of TDC) of the intake air amount GA.

$$dGN = GN(i) - GN(i-1)$$

$$dGA = GA(i) - GA(i-1)$$

Then, the routine proceeds to step 803 where it is determined whether or not a rapid acceleration and rapid deceleration flag is set to "1". This rapid acceleration and rapid deceleration flag is set to "1" when it is determined in step 808, which will be described later, that the engine 11 is rapidly accelerated and then rapidly decelerated.

In a case where it is determined in this step 803 that the rapid acceleration and rapid deceleration flag=0, the routine proceeds to step 804 where it is determined whether or not a rapid acceleration flag is set to "1". This rapid acceleration flag is set to "1" when it is determined in step 806, which will be described later, that the engine 11 is rapidly accelerated.

In a case where it is determined in this step 804 that the rapid acceleration flag=0, the routine proceeds to step 805 where it is determined whether or not the change amount dGN is more than a specified increase determination value KN1 (>0) and the change amount dGA is more than a specified increase determination value KA1 (>0) (that is, whether or not dGN>KN1 and dGA>KA1).

In a case where it is determined in this step 805 that dGN≤KN1 or dGA≤KA1, it is determined that the engine 11 is not rapidly accelerated and the rapid acceleration flag is held set to "0". Then, the present routine is finished.

Then, in a case where it is determined in this step 805 that dGN>KN1 and dGA>KA1, the routine proceeds to step 806 where it is determined that the engine 11 is rapidly accelerated and where the rapid acceleration flag is set to "1". Then, the present routine is finished.

Then, in a case where it is determined in this step 804 that the rapid acceleration flag=1, the routine proceeds to step 807 where it is determined whether or not the change amount dGN is less than a specified decrease determination value KN2 (<0) and the change amount dGA is less than a specified decrease determination value KA2 (<0) (that is, whether or not dGN<KN2 and dGA<KA2).

In a case where it is determined in this step 807 that dGN≥KN2 or dGA≥KA2, it is determined that the engine 11 is not rapidly accelerated and then rapidly decelerated and the rapid acceleration and rapid deceleration flag is held set to "0". Then, the present routine is finished.

Then, in a case where it is determined in the step 807 that dGN<KN2 and dGA<KA2, the routine proceeds to step 808 where it is determined that the engine 11 is rapidly accelerated and then rapidly decelerated (that is, the exhaust flow stagnation state is caused) and where the rapid acceleration and rapid deceleration flag is set to "1" and where the rapid acceleration flag is reset to "0". Then, the present routine is finished.

Then, in a case where it is determined in the step 803 that the rapid acceleration and rapid deceleration flag=1, the routine proceeds to step 809 where it is determined whether or not a specified time elapses after it is determined that the engine 11 is rapidly accelerated and then rapidly decelerated (rapid acceleration and rapid deceleration flag=1).

In a case where it is determined in this step 809 that the specified time does not elapse after it is determined that the engine 11 is rapidly accelerated and then rapidly decelerated (rapid acceleration and rapid deceleration flag=1), the routine proceeds to step 810 where it is determined whether or not the change amount dGN is more than a specified value KN3 (>0) and the change amount dGA is more than a specified value KA3 (>0) (that is, whether or not dGN>KN3 and dGA>KA3). Here, the specified values KN3 and KA3 may be fixed values, which are previously set, but may be set according to a time which elapses after it is determined that the engine 11 is rapidly accelerated and then rapidly decelerated.

In a case where it is determined in this step 810 that dGN≤KN3 or dGA≤KA3, the rapid acceleration and deceleration flag is held set to "1". Then, the present routine is finished.

Then, in a case where it is determined in the step 809 that the specified time elapses after it is determined that the engine 11 is rapidly accelerated and then rapidly decelerated (rapid acceleration and rapid deceleration flag=1) or in a case where it is determined in the step 811 where it is determined that the engine 11 is not rapidly accelerated and then rapidly decelerated (that is, the exhaust flow stagnation state is not caused) and where the rapid acceleration and rapid deceleration flag is reset to "0". Then, the present routine is finished.

In this regard, in the routine shown in FIG. 14, both of the change amount dGN and the change amount dGA are used in the steps 805, 807, and 810. However, the present disclosure is not limited to this but only one of the change amount dGN and the change amount dGA may be used.

Specifically, the following is also recommended: it is determined in step 805 whether or not dGN>KN1; and in a case where it is determined that dGN>KN1, the routine proceeds to step 806. Alternatively, the following is also recommended: it is determined in step 805 whether or not dGA>KA1; and in a case where it is determined that dGA>KA1, the routine proceeds to step 806.

Further, the following is also recommended: it is determined in step 807 whether or not dGN<KN2; and in a case where it is determined that dGN<KN2, the routine proceeds to step 808. Alternatively, the following is also recommended: it is determined in step 807 whether or not dGA<KA2; and in a case where it is determined that dGA<KA2, the routine proceeds to step 808.

Still further, the following is also recommended: it is determined in step 810 whether or not dGN>KN3; and in a case where it is determined that dGN>KN3, the routine proceeds to step 811. Alternatively, the following is also recommended: it is determined in step 810 whether or not dGA>KA3; and in a case where it is determined that dGA>KA3, the routine proceeds to step 811.

[Performance Condition Determination Routine]

A performance condition determination routine shown in FIG. 15, which is performed in the present second embodiment, is a routine in which the processing of step 201 of the routine shown in FIG. 5, which has been described in the first embodiment, is changed to a processing in step 201a and in which the processing of step 205 of the routine shown in FIG. 5 is omitted and in which the pieces of processing of the respective steps other than the step 201 and the step 205 are the same as the pieces of processing shown in FIG. 5.

In a performance condition determination routine shown in FIG. 15, first, in step 201a, it is determined whether or not the rapid acceleration and rapid deceleration flag=0. In a case where it is determined in this step 201a that the rapid acceleration and rapid deceleration flag=0, the routine proceeds to step 202 where it is determined whether or not the air-fuel ratio sensor 36 can be used. In a case where it is determined that the air-fuel ratio sensor 36 can be used, routine proceeds to step 203 where an engine operation state is within a specified range.

In a case where it is determined that all of the steps 201a to 203 are "Yes" (that is, all of the conditions of the steps 201a to 203 are satisfied), the routine proceeds to step 204 where it is determined that the performance conditions of the individual cylinder air-fuel ratio control hold and where a performance condition flag is set to "1". Then, the present routine is finished.

On the other hand, in a case where it is determined in the step 201a that the rapid acceleration and rapid deceleration flag=1 (that is, the engine 11 is rapidly accelerated and then rapidly decelerated), the routine proceeds to step 206 where it is determined that the performance condition of the individual cylinder air-fuel ratio control does not hold and where the performance condition flag is reset to "0". Then, the present routine is finished. By the pieces of processing, when it is determined that the engine 11 is rapidly accelerated and then rapidly decelerated (that is, the exhaust flow stagnation state is caused), the performance condition of the individual cylinder air-fuel ratio control is made not to hold (performance condition flag=0) to thereby stop the individual cylinder air-fuel ratio estimation and the individual cylinder air-fuel ratio control, and since the individual cylinder air-fuel ratio control is stopped, the air-fuel ratio sensing timing correction is stopped. Hence, in the present second embodiment, the routine shown in FIG. 5 functions as a stop part.

Figure 16:
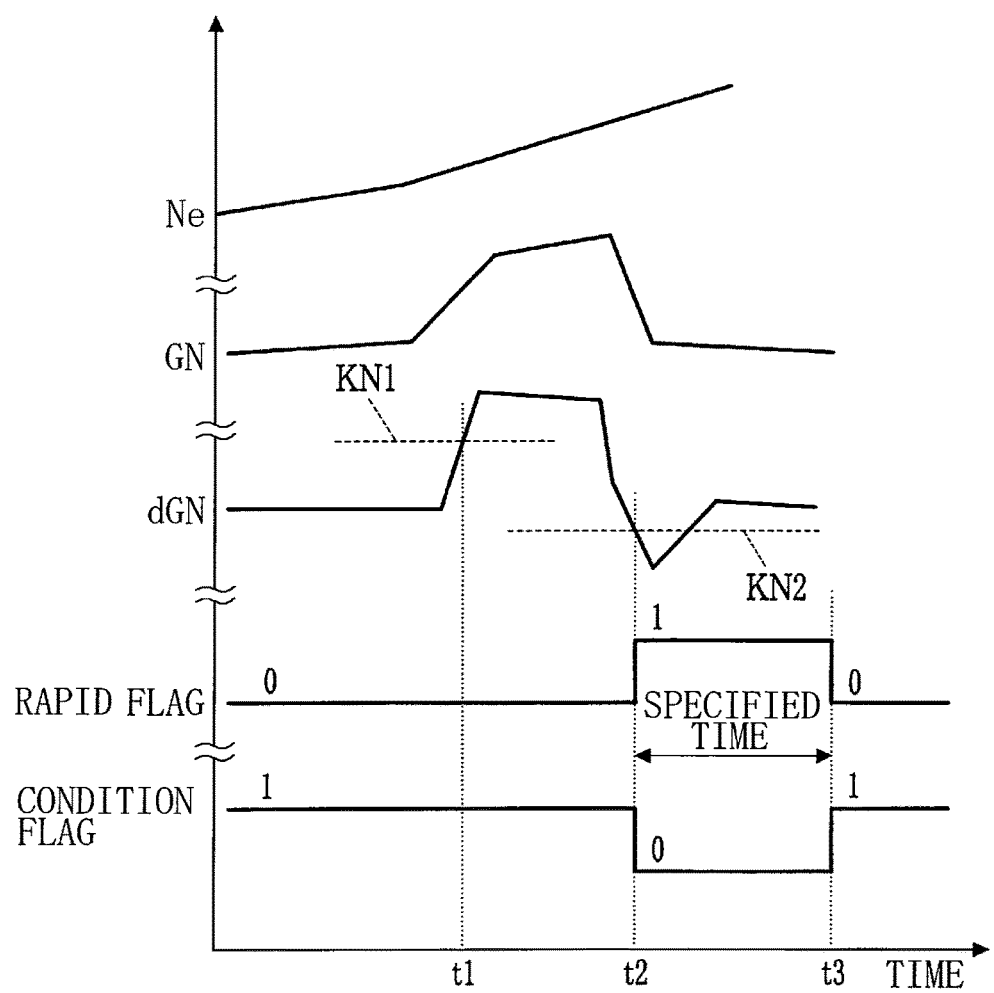
FIG. 16 is a time chart to show an example of performing a control of the second embodiment.
Figure 17:
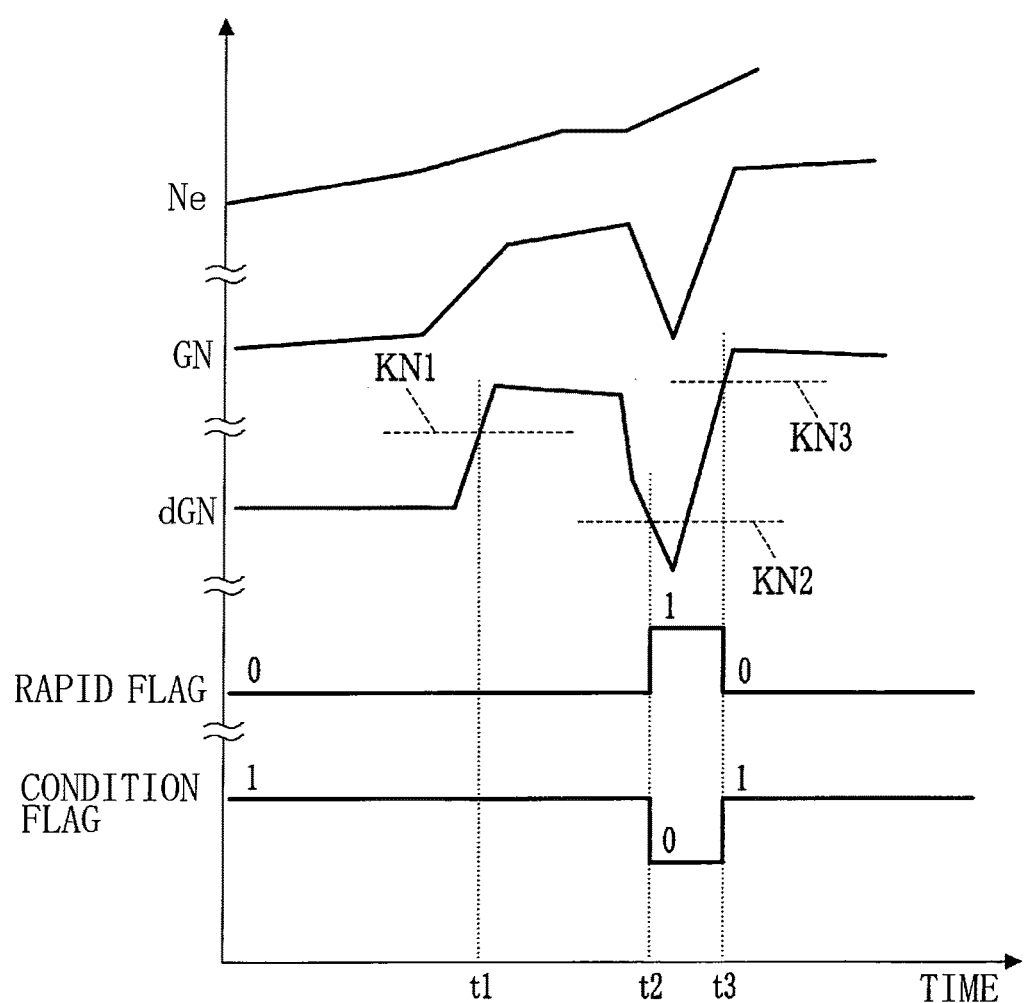
FIG. 17 is a time chart to show an example of performing a control of the second embodiment.

An example of performing the present second embodiment described above will be described by the use of time charts shown in FIG. 16 and FIG. 17. As shown in FIG. 16 and FIG. 17, the change amount dGN of the intake air amount GN and the change amount dGA of the intake air amount GA are calculated at intervals of a specified timing (for example, at each TDC).

Then, at a timing t1 when it is determined that the change amount dGN is more than the increase determination value KN1 and that the change amount dGA is more than the increase determination value KA1 (that is, dGN>KN1 and dGA>KA1), it is determined that the engine 11 is rapidly accelerated and the rapid acceleration flag is set to "1" (not shown in the drawing).

Then, at a timing t2 when it is determined that the change amount dGN is less than the decrease determination value KN2 and that the change amount dGA is less than the decrease determination value KA2 (that is, dGN<KN2 and dGA<KA2), it is determined that the engine 11 is rapidly accelerated and then is rapidly decelerated (that is, the exhaust flow stagnation state is caused) and the rapid acceleration and rapid deceleration flag is set to "1". In this way, it is determined that the performance condition of the individual cylinder air-fuel ratio control does not hold and the performance condition flag is reset to "0", whereby the individual cylinder air-fuel ratio estimation, the individual cylinder air-fuel ratio control, and the air-fuel ratio sensing timing correction are stopped.

Then, as shown in FIG. 16, at a timing t3 when a specified time elapses after it is determined that the engine 11 is rapidly accelerated and then is rapidly decelerated (rapid acceleration and rapid deceleration flag=1), it is determined that the engine 11 is not rapidly accelerated and then is not rapidly decelerated (that is, the exhaust flow stagnation is not caused) and the rapid acceleration and rapid deceleration flag is reset to "0".

Alternatively, as shown in FIG. 17, at a timing t3 when it is determined that the change amount dGN is more than the specified determination value KN3 and that the change amount dGA is more than the specified determination value KA3 (that is, dGN>KN3 and dGA>KA3), it is determined that the engine 11 is not rapidly accelerated and then rapidly decelerated and the rapid acceleration and rapid deceleration flag is reset to "0". In this way, it is determined that the performance condition of the individual cylinder air-fuel ratio control holds and the performance condition flag is set to "1", whereby the individual cylinder air-fuel ratio estimation, the individual cylinder air-fuel ratio control, and the air-fuel ratio sensing timing correction are again started.

In the present second embodiment described above, whether or not the exhaust flow stagnation state is caused is determined by whether or not the engine 11 is rapidly accelerated and then rapidly decelerated, and when it is determined that the engine 11 is rapidly accelerated and then rapidly decelerated (exhaust flow stagnation state is caused), the individual cylinder air-fuel ratio estimation, the individual cylinder air-fuel ratio control, and the air-fuel ratio sensing timing correction are stopped. In this way, it is possible to avoid the individual cylinder air-fuel ratio control from being continuously performed as usual in a state where the air-fuel ratio of the individual cylinder cannot be correctly controlled due to the stagnation of the flow of the exhaust gas and hence to inhibit the exhaust emission from being impaired.

Further, in the present second embodiment, when a state where the change amount of the intake air amount is more than the specified increase determination value is changed to a state where the change amount of the intake air amount is less than the specified decrease determination value, it is determined that the engine 11 is rapidly accelerated and then is rapidly decelerated (the exhaust flow stagnation state is caused). In this way, it can be determined with high accuracy on the basis of the intake air amount, which can be sensed by a sensor, that the engine 11 is rapidly accelerated and then is rapidly decelerated (the exhaust flow stagnation state is caused).

Further, in the present second embodiment, when the specified time elapses after it is determined that the engine 11 is rapidly accelerated and then is rapidly decelerated (the exhaust flow stagnation state is caused) or when the change amount of the intake air amount is more than the specified value, it is determined that the engine 11 is not rapidly accelerated and then rapidly decelerated (the exhaust flow stagnation state is not caused). In this way, when the specified time elapses after it is determined that the engine 11 is rapidly accelerated and then rapidly decelerated (the exhaust flow stagnation state is caused) or the change amount of the intake air amount becomes more than the specified value and hence the stagnation of the flow of the exhaust is eliminated to thereby increase the amplitude of the output of the air-fuel ratio sensor 36 to a certain level, the individual cylinder air-fuel ratio control can be again started.

In this regard, in the present second embodiment described above, when it is determined that the engine 11 is rapidly accelerated and then is rapidly decelerated (the exhaust flow stagnation state is caused), all of the individual cylinder air-fuel ratio estimation, the individual cylinder air-fuel ratio control, and the air-fuel ratio sensing timing correction are stopped. However, the present disclosure is not limited to this but one or two of the individual cylinder air-fuel ratio estimation, the individual cylinder air-fuel ratio control, and the air-fuel ratio sensing timing correction may be stopped.

As described above, by stopping the individual cylinder air-fuel ratio estimation (stopping the calculation of the estimated air-fuel ratio of the individual cylinder), it is possible to stop updating the individual cylinder correction value of the individual cylinder by the individual cylinder air-fuel ratio control. Hence, even if only the individual cylinder air-fuel ratio estimation is stopped, it is possible to get almost the same state as a state where the individual cylinder air-fuel ratio control is stopped (the calculation of the individual cylinder correction value of the individual cylinder is stopped). Further, even if only the air-fuel ratio sensing timing correction is stopped, it is possible to inhibit the estimation accuracy of the air-fuel ratio of the individual cylinder from being impaired and hence to inhibit the control accuracy of the individual cylinder air-fuel ratio control from being impaired.

Further, in the present second embodiment described above, it is determined on the basis of the intake air amount whether or not the engine 11 is rapidly accelerated and then rapidly decelerated (a state where the exhaust flow rate is reduced is caused). However, the present disclosure is not limited to this, but it is also recommended to determine on the basis of, for example, the engine rotation speed, an accelerator opening, a throttle opening, and an intake air pressure whether or not the engine 11 is rapidly accelerated and then rapidly decelerated.

Further, in the present second embodiment described above, in the routine shown in FIG. 14 are performed both of the processing (step 809) for determining whether or not the specified time elapses after it is determined that the engine 11 is rapidly accelerated and then rapidly decelerated and the processing (step 810) for determining whether or not the change amount of the intake air amount is more than the specified value. However, any one of the pieces of processing may be omitted.

Still further, in the present second embodiment described above, when it is determined that the engine 11 is rapidly accelerated and then rapidly decelerated, the individual cylinder air-fuel ratio estimation, the individual cylinder air-fuel ratio control, and the air-fuel ratio sensing timing correction are stopped. The present disclosure is not limited to this. Even in a case other than a case where the engine 11 is rapidly accelerated and then rapidly decelerated, when it is determined that the exhaust flow stagnation is caused, the individual cylinder air-fuel ratio estimation, the individual cylinder air-fuel ratio control, and the air-fuel ratio sensing timing correction may be stopped.

Still further, a method for correcting an air-fuel ratio sensing timing when it is determined that the air-fuel ratio sensing timing is shifted from a proper air-fuel ratio sensing timing is not limited to the methods described in the respective embodiments 1, 2 but may be modified as appropriate.

Still further, in the present embodiments 1, 2 described above, the present disclosure is applied to a 4-cylinder engine. However, an engine to which the present disclosure is applied is not limited to this. The present disclosure may be applied to a 2-cylinder engine, a 3-cylinder engine, or an engine having 5 or more cylinders.

In addition, an engine to which the present disclosure is applied is not limited to an inlet port injection type engine, but the present disclosure may be applied to a direct injection type engine or an engine of a dual injection type having both of a fuel injection valve for an inlet port injection and a fuel injection valve for a direct injection.

Third Embodiment

While the ECU 39 performs the individual cylinder air-fuel ratio control, the ECU 39 makes an air-fuel ratio sensing timing determination for determining whether or not an air-fuel ratio sensing timing is shifted from a proper air-fuel ratio sensing timing on the basis of an estimated air-fuel ratio. Then, when the ECU 39 determines that the air-fuel ratio sensing timing is shifted from the proper air-fuel ratio sensing timing, the ECU 39 corrects the air-fuel ratio sensing timing.

For example, the ECU 39 performs a Local learning for correcting an air-fuel ratio sensing timing in such a way that a variation in the sensed value of the air-fuel ratio sensor 36 becomes maximum within one cycle (720 CA) of the engine 11. After the ECU 39 performs the Local learning, the ECU 39 performs a Global learning for correcting an air-fuel ratio sensing timing on the basis of a relationship between a change in an estimated air-fuel ratio of at least one cylinder and a change in an individual cylinder correction value (for example, fuel correction amount) of the cylinder while performing the individual cylinder air-fuel ratio control. In the Global learning, in respective cases where an individual cylinder number assumed by the estimated air-fuel ratio of the individual cylinder is changed hypothetically in a plurality of ways, the ECU 39 calculates a correlation value between a change in the estimated air-fuel ratio of at least one cylinder and a change in the individual cylinder correction value of the cylinder number after the estimated air-fuel ratio being changed and corrects an air-fuel ratio sensing timing in such a way that the correlation value becomes maximum.

Alternatively, the following is also recommended: after the ECU 39 performs the Local learning (that is, the ECU 39 corrects the air-fuel ratio sensing timing by the Local learning), every time the ECU 39 determines that the air-fuel ratio sensing timing is shifted from a proper air-fuel ratio sensing timing, the ECU 39 performs the Global learning for correcting the air-fuel ratio sensing timing by a combustion interval of the engine 11 (in the case of a 4-cylinder engine, 180 CA) or by a plurality of times of the combustion interval, thereby interchanging the air-fuel ratio sensing timing of the individual cylinder with the air-fuel ratio sensing timing of the other cylinder to thereby correct the air-fuel ratio sensing timing of the individual cylinder to a correct air-fuel ratio sensing timing.

In the meantime, in some cases, an exhaust flow rate can be changed by an operation condition (for example, an ignition timing or the like) other than the load and the rotation speed of the engine 11. When the exhaust flow rate is changed, a response delay of an exhaust system is changed and a phase of an output waveform of the air-fuel ratio sensor 36 is changed, so a proper air-fuel ratio sensing timing of the individual cylinder is also changed.

For this reason, when the ECU 39 performs the individual cylinder air-fuel ratio control, even if the ECU 39 sets the air-fuel ratio sensing timing of the individual cylinder according to the load and the rotation speed of the engine 11, when the exhaust flow rate is changed by the operation condition other than the load and the rotation speed of the engine 11, there is a possibility that the air-fuel ratio sensing timing of the individual cylinder can be shifted from the proper air-fuel ratio sensing timing. When the air-fuel ratio sensing timing of the individual cylinder is shifted from the proper air-fuel ratio sensing timing, the estimation accuracy of the air-fuel ratio of the individual cylinder is reduced, which makes it difficult for the ECU 39 to correctly control the air-fuel ratio of the individual cylinder (to control the air-fuel ratio of the individual cylinder in such a way that a variation in the air-fuel ratio between the cylinders are reduced).

As a countermeasure against this, in the present embodiment, the ECU 39 performs an air-fuel ratio sensing timing routine shown in FIG. 19, which will be described later, to thereby correct the air-fuel ratio sensing timing according to the operation condition (hereinafter referred to as "an exhaust flow rate change factor") which causes the exhaust flow rate of the engine 11 to change.

In this way, in response to a fact that according to the exhaust flow rate change factor, the exhaust flow rate is changed to thereby change the phase of the output waveform of the air-fuel ratio sensor 36 (that is, the proper air-fuel ratio sensing timing of the individual cylinder is changed), it is possible to correct the air-fuel ratio sensing timing. Hence, it is possible to inhibit the air-fuel ratio sensing timing of the individual cylinder from being shifted from the proper air-fuel ratio sensing timing.

In the present embodiment, an ignition timing, a fuel injection timing, and a change amount of the load of the engine 11 are used as the exhaust flow rate change factor, and the air-fuel ratio sensing timing is corrected according to the ignition timing, the fuel injection timing, and the change amount of the load of the engine 11.

When the ignition timing (for example, a delay amount from a base ignition timing) is changed, an exhaust pressure is changed by a change in the combustion timing to thereby change the exhaust flow rate, so the ignition timing becomes the exhaust flow rate change factor.

Further, when the fuel injection timing is changed (for example, is changed between an intake stroke injection and a compression stroke injection), a combustion state is changed and hence the exhaust flow rate is changed, so the fuel injection timing becomes the exhaust flow rate change factor.

Still further, when the change amount of the load of the engine 11 (for example, a change amount in a specified period of the intake air amount) is changed, a change amount in a specified period of an exhaust gas amount is changed and hence the exhaust flow rate is changed, so the change amount of the load becomes the exhaust flow rate change factor.

Hereinafter, the contents of the pieces of processing of the respective routines shown in FIG. 18 and FIG. 19, which are performed by the ECU 39 in the present embodiment, will be described.

[Individual Cylinder Air-Fuel Ratio Control Routine]

Figure 18:
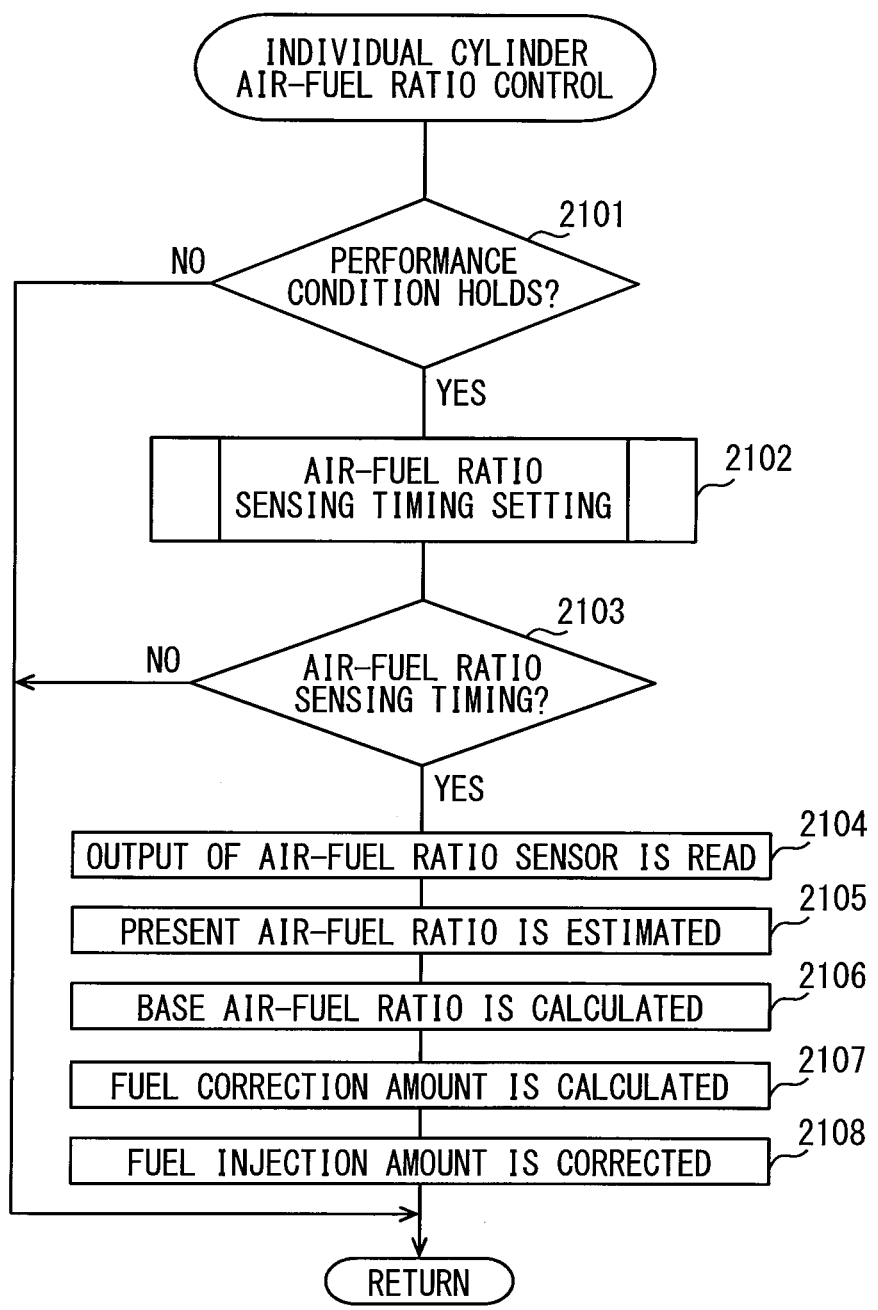
FIG. 18 is a flow chart to show a flow of a processing of an individual cylinder air-fuel ratio control routine.

An individual cylinder air-fuel ratio control routine shown in FIG. 18 is invoked at intervals of a specified crank angle (for example, 30 CA) in synchronization with the output pulse of the crank angle sensor 33 and functions as an individual cylinder air-fuel ratio control part.

When the present routine is invoked, first, in step 2101, it is determined whether or not the performance condition of the individual cylinder air-fuel ratio control holds. The performance condition of the individual cylinder air-fuel ratio control includes, for example, the following conditions (1) to (3).

(1) The air-fuel ratio sensor 36 is in an active state.

(2) It is not determined that the air-fuel ratio sensor 36 is abnormal (fails).

(3) An engine operation range (for example, engine rotation speed and intake pipe pressure) is within an operation range in which the estimation accuracy of the air-fuel ratio can be secured).

When all of these three conditions (1) to (3) are satisfied, the performance condition of the individual cylinder air-fuel ratio control holds, whereas when at least any one of the conditions is not satisfied, the performance condition does not hold. In a case where the performance condition does not hold, the present routine is finished without performing the pieces of processing in step 2102 and subsequent steps.

On the other hand, in a case where the performance condition holds, the routine proceeds to step 2102 where an air-fuel ratio sensing timing setting routine shown in FIG. 19, which will be described later, is performed to thereby set the air-fuel ratio sensing timing of the individual cylinder (the sampling timing of the output of the air-fuel ratio sensor 36).

Then, the routine proceeds to step 2103 where it is determined whether or not the present crank angle is the air-fuel ratio sensing timing set in the step 2102. If the present crank angle is not the air-fuel ratio sensing timing set in the step 2102, the present routine is finished without performing the pieces of processing in subsequent steps.

On the other hand, if the present crank angle is the air-fuel ratio sensing timing set in the step 2102, the routine proceeds to step 2104 where the output of the air-fuel ratio sensor 36 (the sensed value of the air-fuel ratio) is read.

Then, the routine proceeds to step 2105 where an air-fuel ratio of a cylinder, whose air-fuel ratio is estimated this time, is estimated on the basis of the sensed value of the air-fuel ratio sensor 36 by the use of the individual cylinder air-fuel ratio estimation model. The processing of this step 2105 functions as an individual cylinder air-fuel ratio estimation part.

Then, the routine proceeds to step 2106 where a mean value of the estimated air-fuel ratios of all cylinders is calculated and where the mean value is set for a base air-fuel ratio (a target air-fuel ratio of all cylinders).

Then, the routine proceeds to step 2107 where a deviation between the estimated air-fuel ratio of the individual cylinder and the base air-fuel ratio is calculated and where a fuel correction amount is calculated as an individual cylinder correction value of the individual cylinder in such a way that the deviation becomes small.

Then, the routine proceeds to step 2108 where the fuel injection amount of the individual cylinder is corrected on the basis of the fuel correction amount of the individual cylinder to thereby correct the air-fuel ratio of an air-fuel mixture to be supplied to the individual cylinder, thereby controlling the air-fuel ratio of the individual cylinder in such a way that a variation in the air-fuel ratio between the cylinders becomes small.

[Air-Fuel Ratio Sensing Timing Setting Routine]

Figure 19:
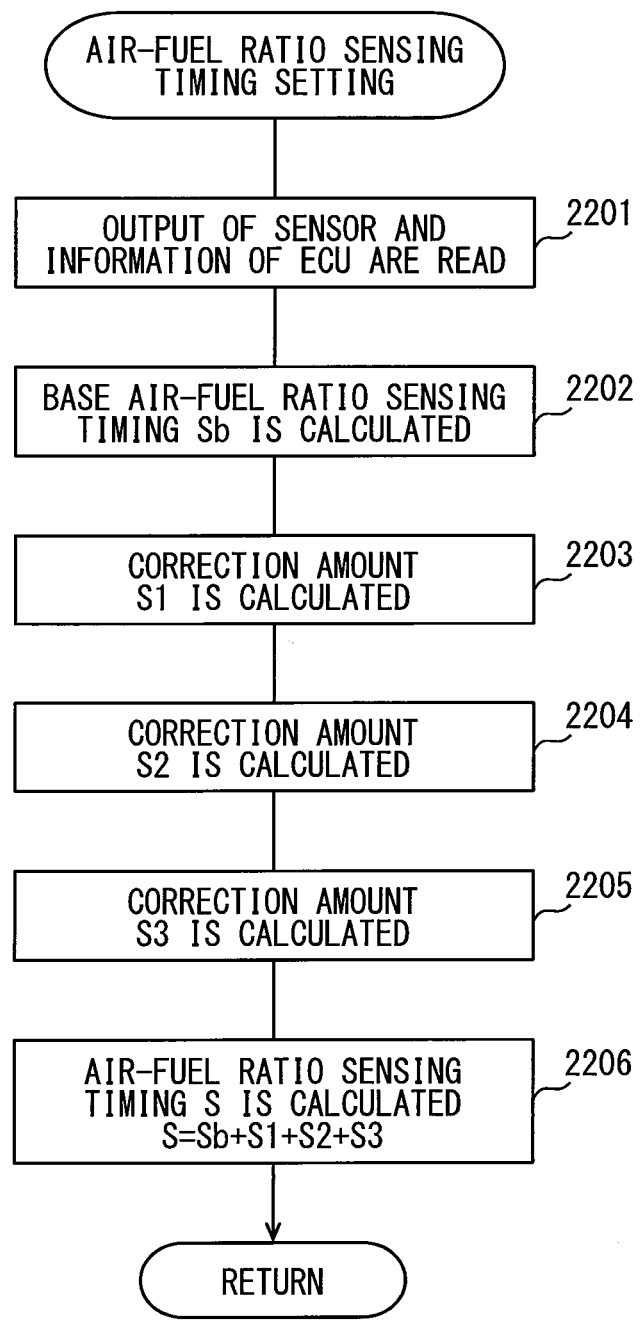
FIG. 19 is a flow chart to show a flow of a processing of an air-fuel ratio sensing timing setting routine.

An air-fuel ratio sensing timing setting routine shown in FIG. 19 is a subroutine performed in step 2102 of the individual cylinder air-fuel ratio control routine shown in FIG. 18 and functions as an air-fuel ratio sensing timing setting part.

When the present routine is invoked, first, in step 2201, the outputs of various kinds of sensors and the calculation information of the ECU 39 (for example, an ignition timing, a fuel injection timing, and the like) are read.

Figure 20:
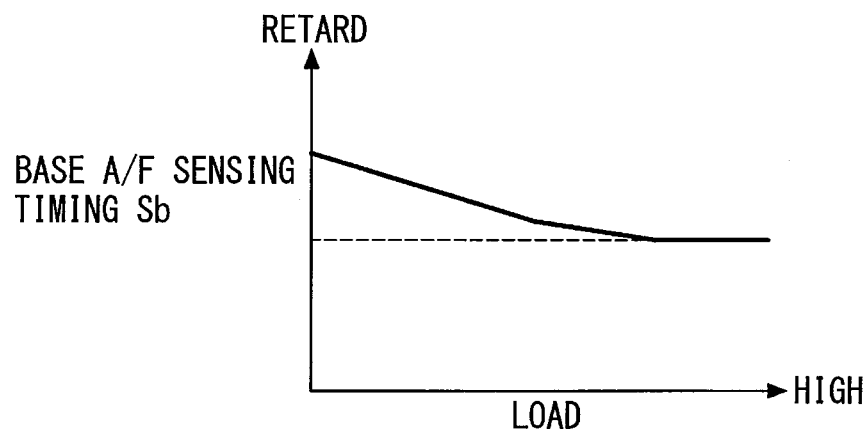
FIG. 20 is a chart to conceptually show an example of a map of a base air-fuel ratio sensing timing Sb.

Then, the routine proceeds to step 2202 where a base air-fuel ratio sensing timing Sb of the individual cylinder is calculated by the use of a map (see FIG. 20) according to the present load (for example, an intake pipe pressure) of the engine 11. In this regard, the base air-fuel ratio sensing timing Sb of the individual cylinder may be calculated by the use of a map according to the rotation speed and the load of the engine 11. The map used for calculating the base air-fuel ratio sensing timing Sb is learned and corrected by a routine (for example, a Local learning performance routine or a Global learning performance routine) for learning and correcting an air-fuel ratio sensing timing shift (not shown in the drawing).

Figure 21:
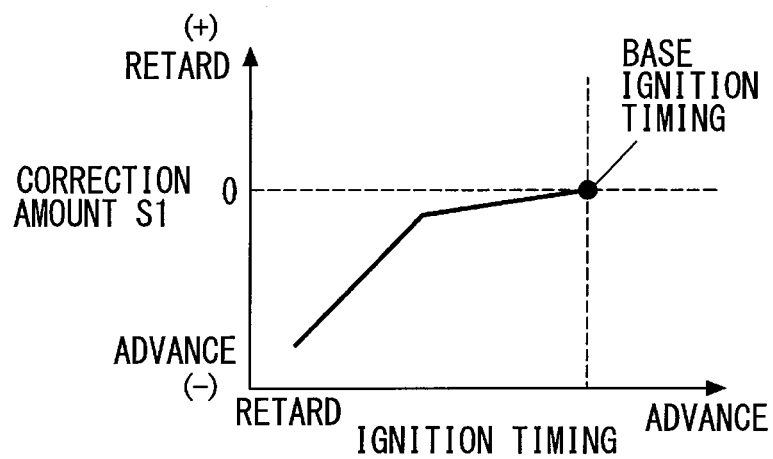
FIG. 21 is a chart to conceptually show an example of a map of a correction amount S1 according to an ignition timing.

Then, the routine proceeds to step 2203 where a correction amount S1 corresponding to a present ignition timing (for example, a delay amount from a base ignition timing) is calculated with reference to a map of the correction amount S1 corresponding to an ignition timing, the map being shown in FIG. 21. The map of the correction amount S1 shown in FIG. 21 is set in such a way that as an ignition timing is nearer to a delay side (that is, a delay amount from the base ignition timing becomes larger), the correction amount S1 becomes smaller (an advance amount of the air-fuel ratio sensing timing becomes larger). The map of the correction S1 is made previously on the basis of a test, design data, and the like and is stored in a ROM of the ECU 39.

Figure 22:
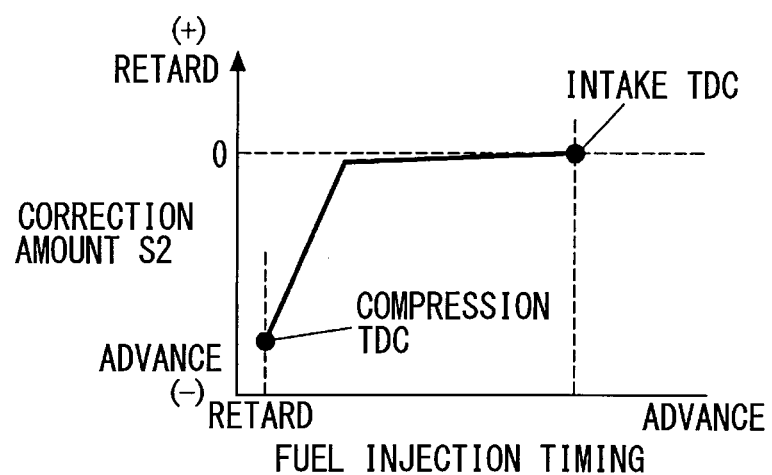
FIG. 22 is a chart to conceptually show an example of a map of a correction amount S2 according to a fuel injection timing.

Then, the routine proceeds to step 2204 where a correction amount S2 corresponding to the present fuel injection timing is calculated with reference to a map of the correction amount S2 corresponding to a fuel injection timing, the map being shown in FIG. 22. The map of the correction amount S2, which is shown in FIG. 22, is set in such a way that the correction amount S2 becomes smaller (an advance amount of the air-fuel ratio sensing timing becomes larger) in a case where the fuel injection timing is a compression stroke than in a case where the fuel injection timing is an intake stroke. The map of the correction amount S2 is made previously on the basis of a test, design data, and the like and is stored in the ROM of the ECU 39.

Figure 23:
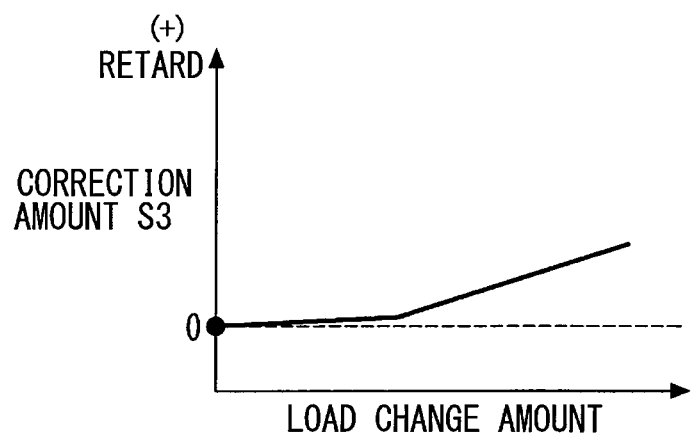
FIG. 23 is a chart to conceptually show an example of a map of a correction amount S3 according to a load change amount.

Then, the routine proceeds to step 2205 where a correction amount S3 corresponding to a present load change amount is calculated with reference to a map of the correction amount S3 corresponding to a load change amount, the map being shown in FIG. 23. Here, the load change amount is a change amount dGN in a specified period (for example, TDC period) of the intake air amount GN. The map of the correction amount S3, which is shown in FIG. 23, is set in such a way that as the load change amount becomes larger, the correction amount S3 becomes larger (a delay amount of the air-fuel ratio sensing timing becomes larger). The map of the correction S3 is made previously on the basis of a test, design data, and the like and is stored in the ROM of the ECU 39.

Then, the routine proceeds to step 2206 where the base air-fuel ratio sensing timing Sb is corrected by the use of the respective correction amounts S1 to S3 to thereby find a final air-fuel ratio sensing timing S. In this way, the air-fuel ratio sensing timing is corrected according to the ignition timing, the fuel injection timing, and the load change amount.

$$S=Sb+S1+S2+S3$$

In the present embodiment described above, the air-fuel ratio sensing timing is corrected according to the exhaust flow rate change factor (the ignition timing, the fuel injection timing, and the load change amount) of the operation condition, which causes the exhaust flow rate of the engine 11 to change. In this way, the air-fuel ratio sensing timing can be corrected in response to the fact that the exhaust flow rate is changed according to the exhaust flow rate change factor to thereby change the phase of an output waveform of the air-fuel ratio sensor 36 (that is, to thereby change a proper air-fuel ratio sensing timing of the individual cylinder). Hence, it is possible to inhibit the air-fuel ratio sensing timing of the individual cylinder from being shifted from a proper air-fuel ratio sensing timing. In this way, even if the exhaust flow rate is changed by the operation condition (the ignition timing, the fuel injection timing, and the load change amount) other than the load and the rotation speed of the engine 11, it is possible to inhibit the air-fuel ratio sensing timing from being shifted from the proper air-fuel ratio sensing timing by a change in the exhaust flow rate. Hence, it is possible to inhibit the estimation accuracy of the air-fuel ratio of the individual cylinder from being reduced and hence to correctly control the air-fuel ratio of the individual cylinder (to control the air-fuel ratio of the individual cylinder in such a way that a variation in the air-fuel ratio between the cylinders become smaller).

Figure 24:
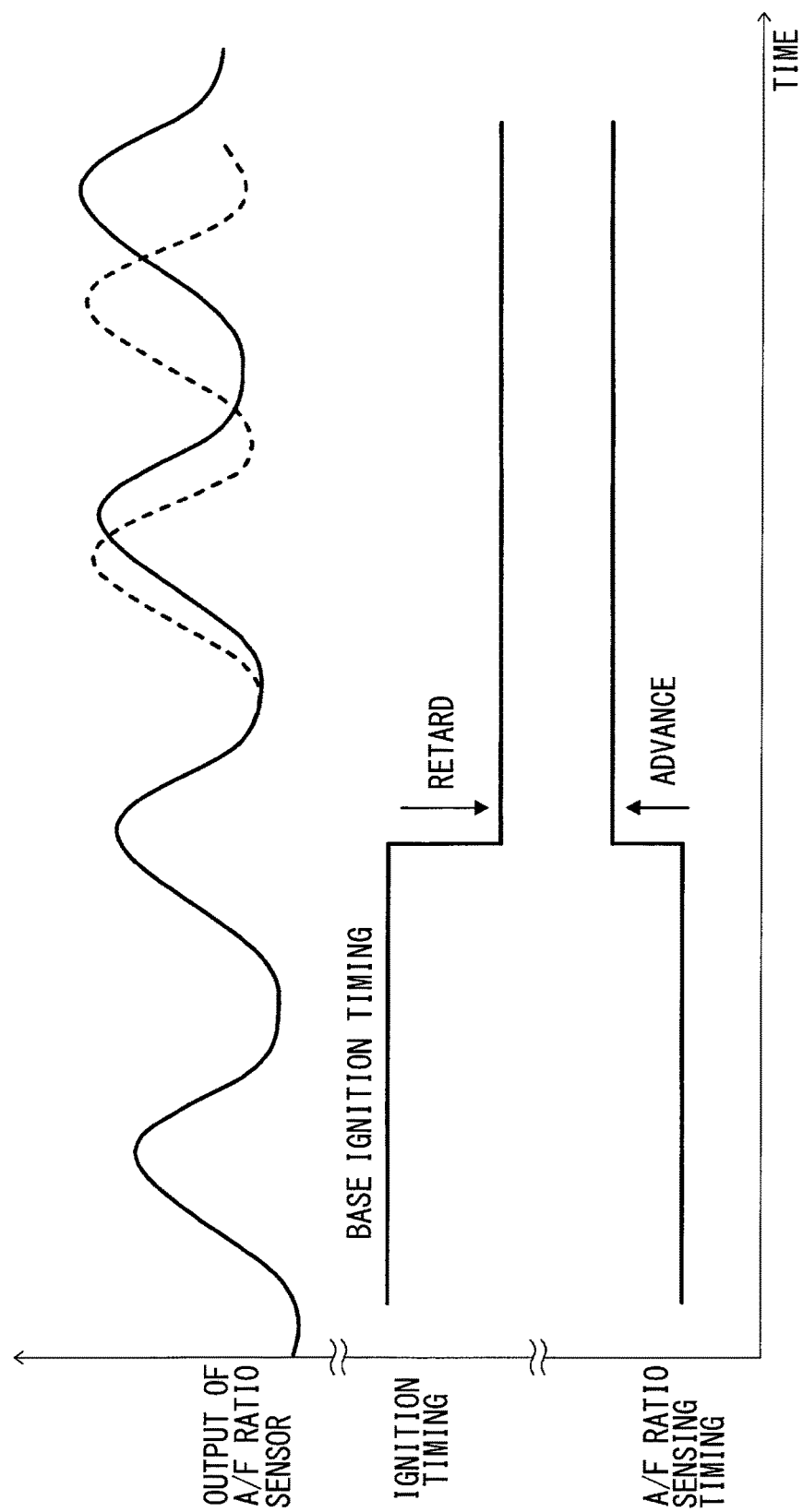
FIG. 24 is a time chart to show an example of making an air-fuel ratio sensing timing correction according to an ignition timing.

Specifically, when the ignition timing is changed, an exhaust pressure is changed by a change in a combustion timing and hence the exhaust flow rate is changed, so the phase of the output waveform of the air-fuel ratio sensor 36 is changed. For example, as shown in FIG. 24, when the ignition timing is delayed, the exhaust flow rate is increased to thereby change the phase of the output waveform of the air-fuel ratio sensor 36 in an advance direction (see a broken line in FIG. 24).

Hence, in the present embodiment, the correction amount S1 is calculated according to the ignition timing (for example, a delay amount from the base ignition timing) and the base air-fuel ratio sensing timing is corrected by the use of the correction amount S1 to thereby find a final air-fuel ratio sensing timing. In this way, the air-fuel ratio sensing timing is corrected according to the ignition timing. Hence, this makes it possible to correct the air-fuel ratio sensing timing in response to the fact that the exhaust flow rate is changed by a change in the ignition timing (for example, an ignition timing delay at the time of controlling a catalyst warming) to thereby change the phase of the output waveform of the air-fuel ratio sensor 36. Hence, it is possible to inhibit the air-fuel ratio sensing timing from being shifted from the proper air-fuel ratio sensing timing.

Figure 25:
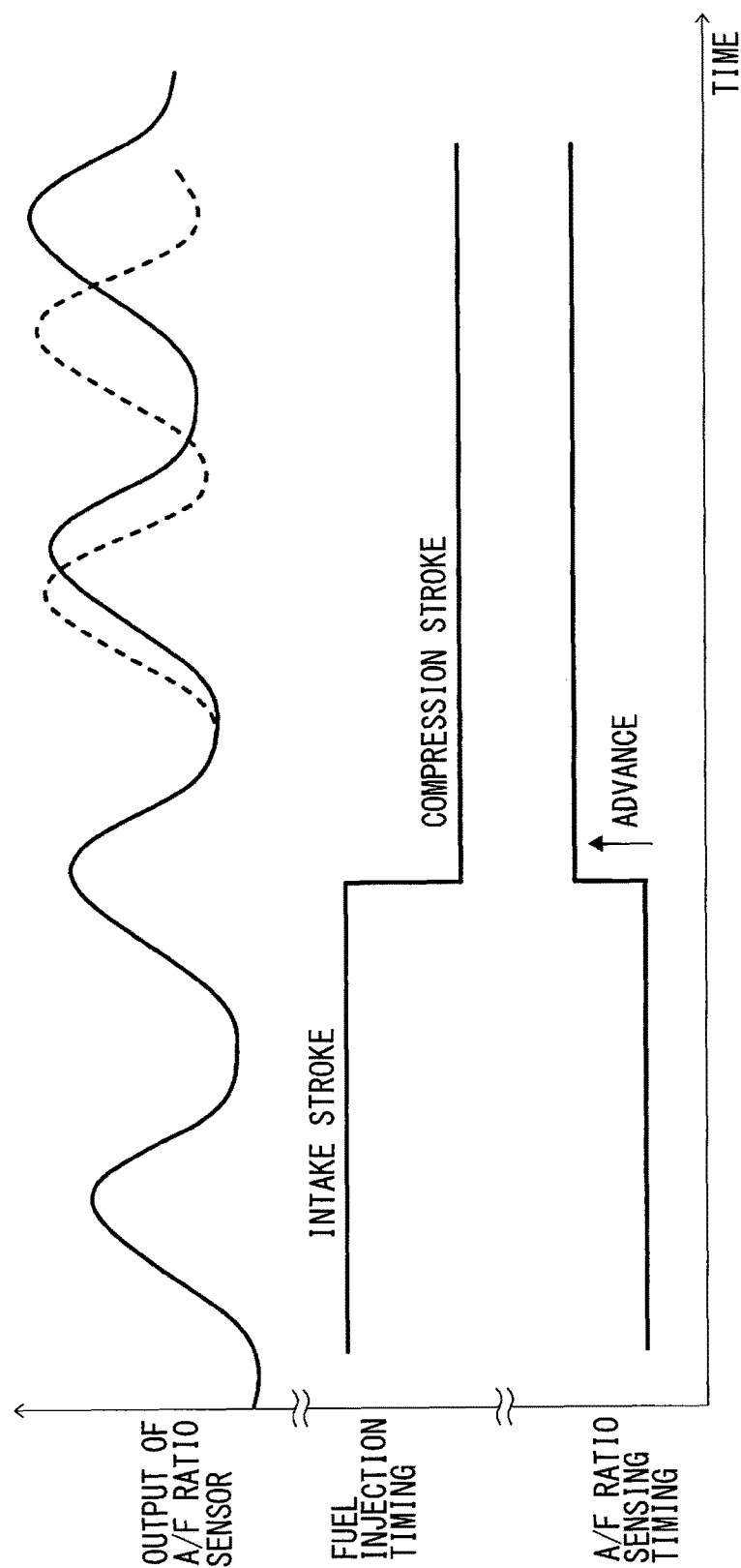
FIG. 25 is a time chart to show an example of making an air-fuel ratio sensing timing correction according to a fuel injection timing.

Further, when the fuel injection timing is changed, a combustion state is changed and hence the exhaust flow rate is changed, so the phase of the output waveform of the air-fuel ratio sensor 36 is changed. For example, as shown in FIG. 25, when the fuel injection timing is changed from an intake stroke to a compression stroke (that is, an intake stroke injection is switched to a compression stroke injection), the exhaust flow rate is increased and hence the phase of the output waveform of the air-fuel ratio sensor 36 is changed in an advance direction (see a broken line in FIG. 25).

Hence, in the present embodiment, the correction amount S2 is calculated according to the fuel injection timing and the base air-fuel ratio sensing timing is corrected by the use of the correction amount S2 to thereby find a final air-fuel ratio sensing timing. In this way, the air-fuel ratio sensing timing is corrected according to the fuel injection timing. Hence, this makes it possible to correct the air-fuel ratio sensing timing in response to the fact that the exhaust flow rate is changed by a change in the fuel injection timing (for example, by switching the intake stroke injection to the compression stroke injection) to thereby change the phase of the output waveform of the air-fuel ratio sensor 36. Hence, it is possible to inhibit the air-fuel ratio sensing timing of the individual cylinder from being shifted from the proper air-fuel ratio sensing timing.

Further, when a load change amount is changed, a change amount in a specified period of an exhaust gas amount is changed and hence the exhaust flow rate is changed, so the phase of the output waveform of the air-fuel ratio sensor 36 is changed. Hence, in the present embodiment, the correction amount S3 is calculated according to the load change amount (for example, a change amount of the intake air amount) and the base air-fuel ratio sensing timing is corrected by the use of the correction amount S3 to thereby find the final air-fuel ratio sensing timing. In this way, the air-fuel ratio sensing timing is corrected according to the load change amount. Hence, this makes it possible to correct the air-fuel ratio sensing timing in response to the fact that when the engine 11 is transient, the exhaust flow rate is changed according to the load change amount to thereby change the phase of the output waveform of the air-fuel ratio sensor 36. Hence, it is possible to inhibit the air-fuel ratio sensing timing of the individual cylinder from being shifted from the proper air-fuel ratio sensing timing.

In this regard, in the present embodiment, the ignition timing, the fuel injection timing, and the load change amount are used as the exhaust flow rate change factor, and the air-fuel ratio sensing timing is corrected according to three factors of the ignition timing, the fuel injection timing, and the load change amount. However, the present disclosure is not limited to this but, for example, the air-fuel ratio sensing timing may be corrected according to two or one of the ignition timing, the fuel injection timing, and the load change amount.

Further, a method for correcting the air-fuel ratio sensing timing when it is determined that the air-fuel ratio sensing timing is shifted from the proper air-fuel ratio sensing timing is not limited to the method described in the embodiment but may be modified as appropriate.

Still further, in the embodiment, the present disclosure is applied to the 4-cylinder engine. However, an engine to which the present disclosure is applied is not limited to this but the present disclosure may be applied to a 2-cylinder engine, a 3-cylinder engine, or an engine having 5 or more cylinders.

Fourth Embodiment

A fourth embodiment of the present disclosure will be described on the basis of FIG. 26 to FIG. 33.

At that time, an ECU 39 performs a main F/B control routine shown in FIG. 27, which will be described later. That is, when a specified air-fuel ratio F/B control performance condition holds, the ECU 39 calculates a main F/B correction value on the basis of an output of an air-fuel ratio sensor 36 in such a way that an air-fuel ratio of an exhaust gas matches a target air-fuel ratio and performs a main F/B control for evenly correcting an air-fuel ratio of an individual cylinder (for example, a fuel injection amount).

Figure 26:
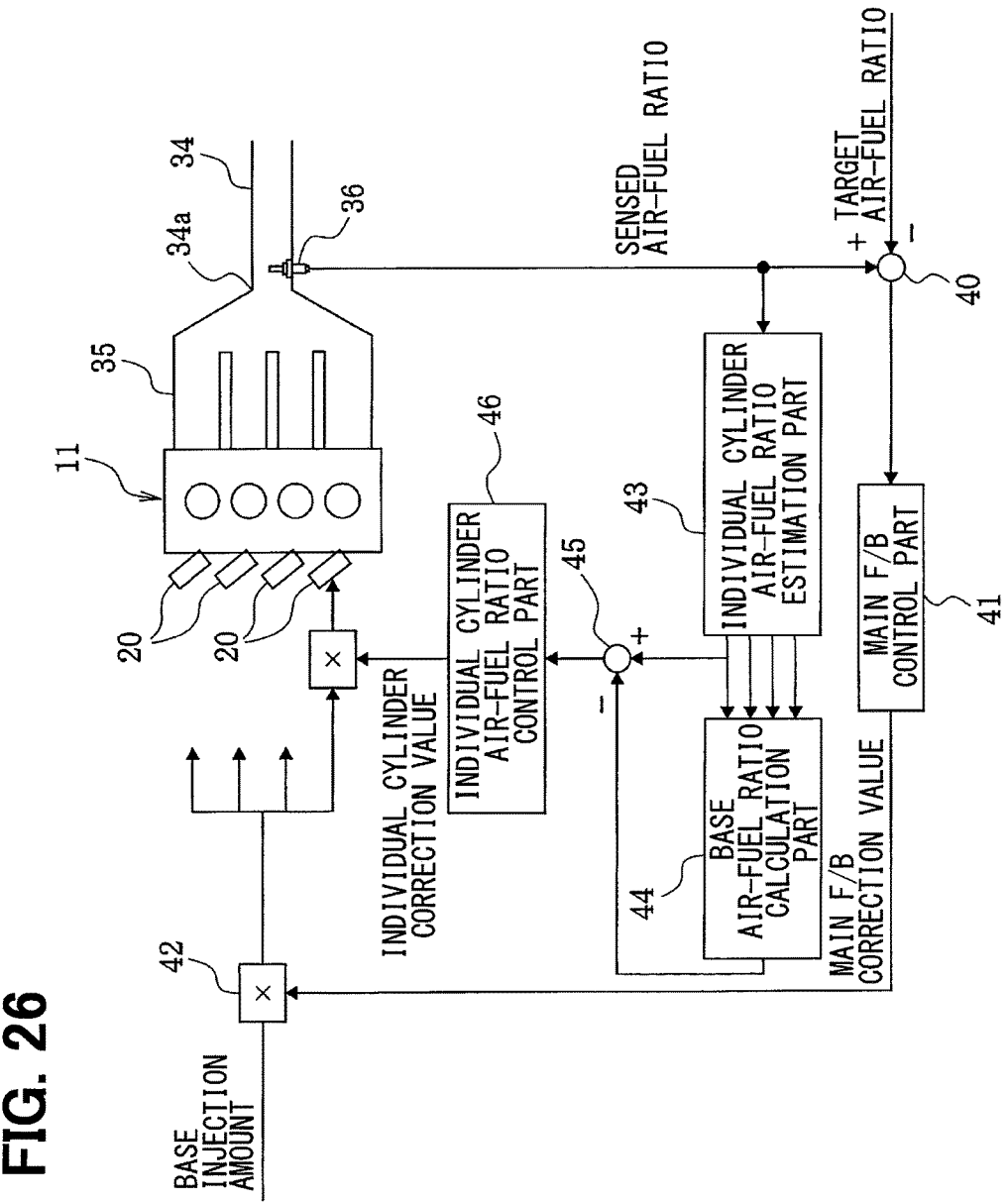
FIG. 26 is a block diagram to illustrate an air-fuel ratio control function.

Specifically, as shown in FIG. 26, first, an air-fuel ratio deviation calculation part 40 calculates a deviation between a sensed air-fuel ratio (an air-fuel ratio of the exhaust gas sensed by the air-fuel ratio sensor 36) and a target air-fuel ratio, and a main F/B control part 141 calculates a main F/B correction amount in such a way that the deviation between the sensed air-fuel ratio and the target air-fuel ratio becomes small. Then, an injection amount calculation part 42 calculates a fuel injection amount on the basis of a base injection amount, which is calculated on the basis of an engine rotation speed and an engine load (an intake pipe pressure and an intake air amount), and the main F/B correction amount and controls a fuel injection valve 20 of the individual cylinder on the basis of the calculated fuel injection amount.

Further, the ECU 39 performs respective routines shown in FIG. 28 to FIG. 30, which will be described later. In this way, the ECU 39 performs an individual cylinder air-fuel ratio estimation for estimating the air-fuel ratio of the individual cylinder for each cylinder on the basis of a sensed value of the air-fuel ratio sensor 36, which is sensed at each air-fuel ratio sensing timing of the individual cylinder, thereby estimating an estimated air-fuel ratio of the individual cylinder. Then, the ECU 39 performs an individual cylinder air-fuel ratio control for controlling the air-fuel ratio of the individual cylinder for each cylinder on the basis of the estimated air-fuel ratio of the individual cylinder.

Specifically, as shown in FIG. 26, first, an individual cylinder air-fuel ratio estimation part 43 estimates the air-fuel ratio of the individual cylinder for each cylinder on the basis of the sensed value of the air-fuel ratio sensor 36 (an actual air-fuel ratio of the exhaust gas flowing through an exhaust gas collection part 34a) by the use of an individual cylinder air-fuel ratio estimation model, which will be described later, and a base air-fuel ratio calculation part 44 calculates a mean value of the estimated air-fuel ratios of all cylinders and sets the mean value for a base air-fuel ratio. Then, an individual cylinder air-fuel ratio deviation calculation part 45 calculates a deviation between the estimated air-fuel ratio of the individual cylinder and the base air-fuel ratio for each cylinder, and an individual cylinder air-fuel ratio control part 46 calculates, for example, a fuel correction amount (a correction amount of the fuel injection amount) as an individual cylinder correction value for each cylinder in such a way that a deviation between the estimated air-fuel ratio of the individual cylinder and the base air-fuel ratio becomes small. By correcting the fuel injection amount of the individual cylinder for each cylinder on the basis of the result of the calculation, the air-fuel ratio of an air-fuel mixture, which is supplied to the individual cylinder, is corrected for each cylinder, whereby a variation in the air-fuel ratio between the cylinders is reduced.

Here will be described a specific example of a model for estimating an air-fuel ratio of an individual cylinder (hereinafter referred to as "an individual cylinder air-fuel ratio estimation model") on the basis of the sensed value (an actual air-fuel ratio of the exhaust gas flowing through the exhaust gas collection part 34a) of the air-fuel ratio sensor 36.

By focusing attention on a gas exchange in the exhaust gas collection part 34a, the sensed value of the air-fuel ratio sensor 36 is expressed by a model that is the sum of a value, which is obtained by multiplying a history of the estimated air-fuel ratio of the individual cylinder in the exhaust gas collection part 34a by a specified weight, and a value, which is obtained by multiplying a history of the sensed value of the air-fuel ratio sensor 36 by another specified weight, and the air-fuel ratio of the individual cylinder is estimated by the use of the model. At this time, a Kalman filter is used as an observer.

More specifically, a model of the gas exchange in the exhaust gas collection part 34a is approximated by the following equation (16).

$$ys(t)=k1 \times u(t-1)+k2 \times u(t-2)-k3 \times ys(t-1)-k4 \times ys(t-2) \quad (16)$$

where "ys" is the sensed value of the air-fuel ratio sensor 36, "u" is an air-fuel ratio of gas flowing into the exhaust gas collection part 34a, and "k1" to "k4" are constants.

An exhaust gas system has a first order delay element of a gas inflow and a gas mixture in the exhaust gas collection part 34a and a first order delay element by a response delay of the air-fuel ratio sensor 36. Then, in the equation (16) described above, the histories of last two times are referred to in consideration of these first order delay elements.

When the equation (16) described above is transformed into a state space model, the following equations (17a), (17b) can be derived.

$$X(t+1)=A \times X(t)+B \times u(t)+W(t) \quad (17a)$$

$$Y(t)=C \times X(t)+D \times u(t) \quad (17b)$$

where A, B, C, and D are parameters of the model, Y is the sensed value of the air-fuel ratio sensor 36, X is the estimated air-fuel ratio of an individual cylinder as a state variable, and W is noise.

Further, when a Kalman filter is designed by the use of the equations (17a) and (17b), the following equation (18) can be obtained.

$$X\hat{}(k+1|k)=A \times X\hat{}(k|k-1)+K\{Y(k)-C \times A \times X\hat{}(k|k-1)\} \quad (18)$$

where X^ (x hat) is the estimated air-fuel ratio of the individual cylinder and K is a Kalman gain. The X^ (k+1|k) means that an estimated value at the next time (k+1) is found from an estimated value at a time (k).

When the individual cylinder air-fuel ratio estimation model is constructed of a Kalman filter type observer in the manner described above, the air-fuel ratio of the individual cylinder can be estimated in sequence along with the progression of a combustion cycle.

Next, a method for setting an air-fuel ratio sensing timing (a sampling timing of the output of the air-fuel ratio sensor 36) of an individual cylinder will be described. A time lag from the time when the exhaust gas exhausted from the individual cylinder reaches near the air-fuel ratio sensor 36 to the time when the air-fuel ratio of the exhaust gas is sensed by the air-fuel ratio sensor 36 (hereinafter referred to as "a response delay of an exhaust system") will be varied according to an engine operation state. In consideration of this, in the present embodiment, the air-fuel ratio sensing timing of the individual cylinder is set by a map according to the engine operation state (for example, the engine rotation speed, the engine load, and the like) and the output of the air-fuel ratio sensor 36 is taken in the ECU 39. In general, as the load of an engine 11 is smaller, the response delay of the exhaust system becomes larger, so the air-fuel ratio sensing timing of the individual cylinder is set in such a way that as the load of the engine 11 is smaller, the air-fuel ratio sensing timing of the individual cylinder is shifted to a delay side.

However, the length of an exhaust manifold 35 from an exhaust port of the individual cylinder to the air-fuel ratio sensor 36 is different for each cylinder and the flow of the exhaust gas of the individual cylinder is complicatedly varied according to the engine operation state (the engine rotation speed, an air amount filled in the cylinder, and the like). In addition, the response delay of the exhaust system is varied also by a variation in the manufacture of the engine 11 and by a secular change, so it is difficult to map a relationship between the response delay of the exhaust system of the individual cylinder (the air-fuel ratio sensing timing of the individual cylinder) and the engine load with high accuracy in the process of designing and manufacturing the engine. For this reason, there is a possibility that the air-fuel ratio sensing timing of the individual cylinder will be shifted from a proper air-fuel ratio sensing timing.

If the air-fuel ratio of the individual cylinder is shifted from the proper air-fuel ratio sensing timing, an estimation accuracy of the air-fuel ratio of the individual cylinder is worsened, which will bring about a state where even if the individual cylinder air-fuel ratio control is continuously performed, the estimated air-fuel ratio of the individual cylinder does not converge (a variation in the estimated air-fuel ratio between the cylinders is not reduced).

Then, the ECU 39 makes an air-fuel ratio sensing timing determination for determining whether or not the air-fuel ratio sensing timing is shifted from the proper air-fuel ratio sensing timing on the basis of the estimated air-fuel ratio while performing an individual cylinder air-fuel ratio control. When the ECU 39 determines that the air-fuel ratio sensing timing is shifted from the proper air-fuel ratio sensing timing, the ECU 39 makes an air-fuel ratio sensing timing correction.

For example, the ECU 39 performs a Local learning for correcting the air-fuel ratio sensing timing in such a way that a variation in the sensed value of the air-fuel ratio sensor 36 becomes maximum within one cycle (720 CA) of the engine 11. After the ECU 39 performs the Local learning, while the ECU 39 performs the individual cylinder air-fuel ratio control, the ECU 39 performs a Global learning for correcting the air-fuel ratio sensing timing on the basis of a relationship between a change in the estimated air-fuel ratio of at least one cylinder and a change in an individual cylinder correction value (for example, a fuel correction amount) of the cylinder. In the Global learning, in respective cases where an individual cylinder number assumed by the estimated air-fuel ratio of the individual cylinder is changed hypothetically in a plurality of ways, the ECU 39 calculates a correlation value between a change in the estimated air-fuel ratio of at least one cylinder and a change in the individual cylinder correction value of a cylinder number after the estimated air-fuel ratio being changed and corrects the air-fuel ratio sensing timing in such a way that the correlation value becomes maximum.

Alternatively, the following method may be employed: that is, after the ECU 39 performs the Local learning (that is, the ECU 39 corrects the air-fuel ratio sensing timing by the Local learning), every time the ECU 39 determines that the air-fuel ratio sensing timing is shifted from the proper air-fuel ratio sensing timing, the ECU 39 performs the Global learning for correcting the air-fuel ratio sensing timing by a combustion interval of the engine 11 (180 CA in the case of a 4-cylinder engine) or by an integer multiple of the combustion interval of the engine 11. In this way, the ECU 39 replaces the air-fuel ratio sensing timing of the individual cylinder with the air-fuel ratio sensing timing of the other cylinder, thereby correcting the air-fuel ratio sensing timing of the individual cylinder to a correct air-fuel ratio sensing timing.

Figure 33:
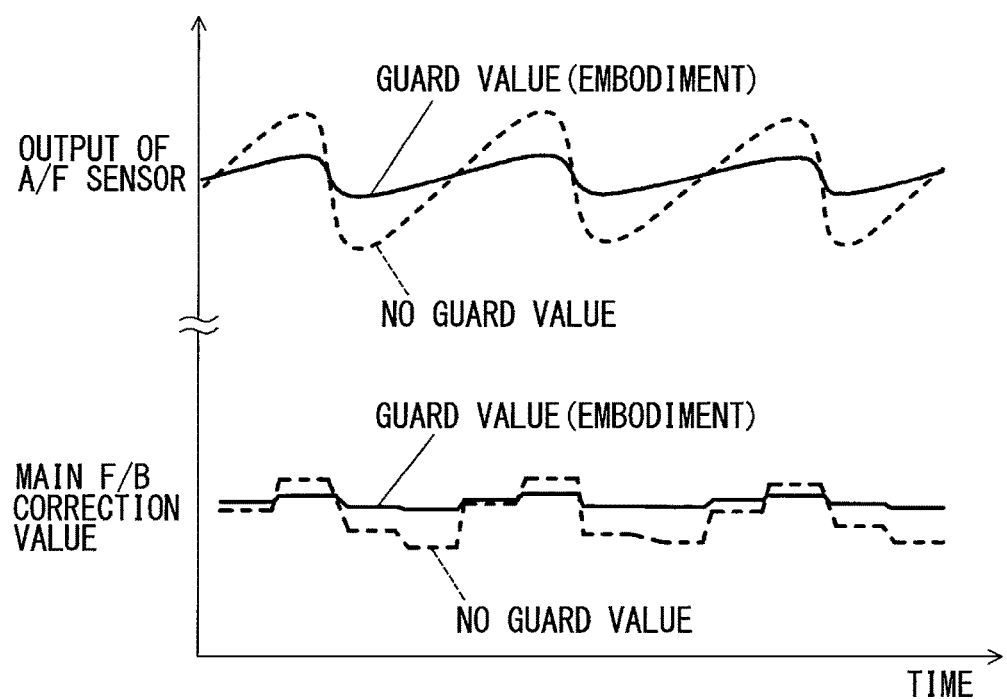
FIG. 33 is a time chart to show an effect of the fourth embodiment.

In the meantime, when a variation in the air-fuel ratio between the cylinders of the engine 11 is comparatively large, if the load of the engine 11 is large (that is, an exhaust flow rate is large), as shown by a broken line in FIG. 33, an amplitude of the output of the air-fuel ratio sensor 36 is large and hence the output of the air-fuel ratio sensor 36 is varied greatly. In this case, if the main F/B control is performed as usual, the main F/B correction value is greatly varied, whereby the variation in the air-fuel ratio between the cylinders can be increased in some case. For this reason, it is difficult to reduce the variation in the air-fuel ratio between the cylinders (that is, to make the estimated air-fuel ratio of the individual cylinder converge) by the individual cylinder air-fuel ratio control. Hence, this can cause the deterioration of the exhaust emission.

As a countermeasure against the deterioration of the exhaust emission, the ECU 39 performs the respective routines shown in FIG. 27 and FIG. 31, which will be described later. That is, the ECU 39 determines whether or not an imbalance failure between the cylinders of the engine 11 can be caused. When the ECU 39 determines that the imbalance failure between the cylinders of the engine 11 can be caused and the load of the engine 11 is not less than a specified value, the ECU 39 limits a change amount of the main F/B correction value by a specified guard value.

Here, the imbalance failure between the cylinders means a state where a variation in the air-fuel ratio between the cylinders becomes more than an allowable level. Further, that the imbalance failure between the cylinders can be caused means a state where the imbalance failure between the cylinders can be caused, for example, a state where the variation in the air-fuel ratio between the cylinders is comparatively large (a state where the variation in the air-fuel ratio between the cylinders is as large as a level not more than the allowable level).

When it is determined that the imbalance failure between the cylinders can be caused (that is, the variation in the air-fuel ratio between the cylinders is comparatively large) and the load of the engine 11 is not less than a specified value (that is, the exhaust flow rate is comparatively high), the amplitude of the output of the air-fuel ratio sensor 36 can be large and the main F/B correction value can be greatly varied.

Hence, when it is determined that the imbalance failure between the cylinders can be caused and the load of the engine 11 is not less than the specified value, by limiting the change amount of the main F/B correction value by a specified guard value, as shown by a solid line in FIG. 33, it is possible to moderately inhibit a variation in the main F/B correction value and hence to inhibit an increase in the variation in the air-fuel ratio between the cylinders, which is caused by the variation in the main F/B correction value.

Further, in the present fourth embodiment, whether or not the imbalance failure between the cylinders can be caused is determined on the basis of the magnitude of an initial air-fuel ratio by the individual cylinder air-fuel ratio estimation (for example, a maximum value of an absolute value of the initial air-fuel ratio of the individual cylinder).

When the variation in the air-fuel ratio between the cylinders is small, the estimated air-fuel ratio of the individual cylinder falls within a specified range even before or just after the individual cylinder air-fuel ratio control is started. However, when the variation in the air-fuel ratio between the cylinders is large, the estimated air-fuel ratio of the individual cylinder does not fall within the specified range (that is, the estimated air-fuel ratio of at least one cylinder is beyond the specified range) before or just after the individual cylinder air-fuel ratio control is started. Hence, when the magnitude of the initial estimated air-fuel ratio (the estimated air-fuel ratio before or just after the individual cylinder air-fuel ratio control being started) is monitored, it is possible to determine with high accuracy whether or not the imbalance failure between the cylinders can be caused (the variation in the air-fuel ratio between the cylinders is comparatively large).

Hereinafter, the processing contents of the respective routines shown in FIG. 27 to FIG. 31, which the ECU 39 performs in the present fourth embodiment, will be described.

[Main F/B Control Routine]

Figure 27:
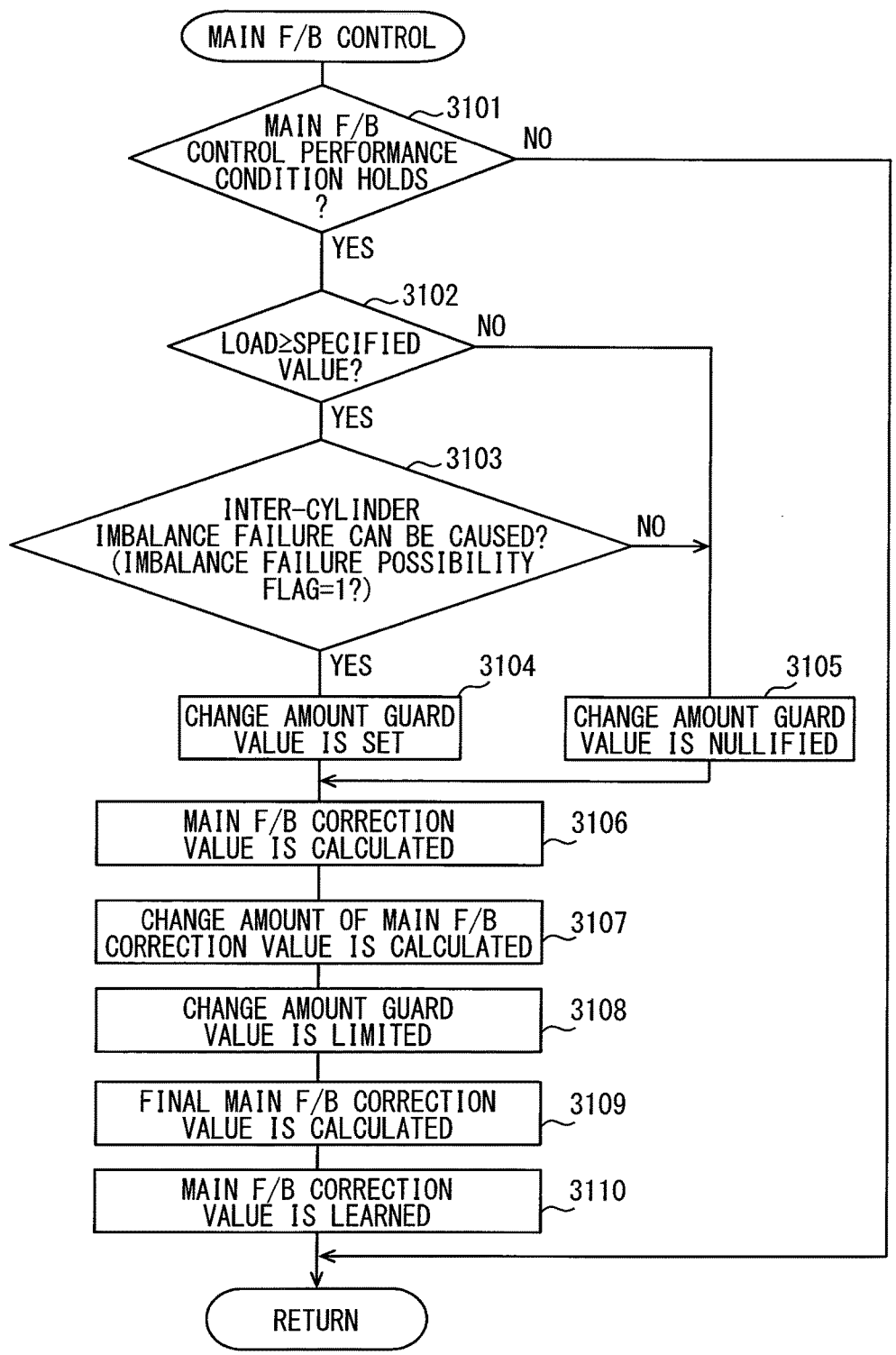
FIG. 27 is a flow chart to show a flow of a processing of a main F/B control routine.

A main F/B control routine shown in FIG. 27 is invoked at intervals of a specified crank angle (for example, 30 CA) in synchronization with the output pulse of a crank angle sensor 33 and functions as the main feedback control part and the limit part.

When the present routine is invoked, first, in step 3101, it is determined whether or not a performance condition of the main F/B control holds. The performance condition of the main F/B control includes, for example, the following conditions (1) and (2).

(1) The air-fuel ratio sensor 36 is in an active state.
(2) It is not determined that the air-fuel ratio sensor 36 is not abnormal (fails).

When both of these two conditions (1) and (2) are satisfied, the performance condition of the main F/B control holds. When any one of the two conditions (1) and (2) is not satisfied, the performance condition of the main F/B control does not hold. In a case where the performance condition of the main F/B control does not hold, the present routine is finished without performing the pieces of processing of step 3102 and subsequent steps.

On the other hand, in a case where the performance condition holds, the routine proceeds to step 3102 where it is determined whether or not the load of the engine 11 (for example, the intake air amount or the intake pipe pressure) is not less than a specified value. For example, in a case where the imbalance failure between the cylinders can be caused, the specified value is a value that makes the amplitude of the output of the air-fuel ratio sensor 36 comparatively large.

In a case where it is determined in this step 3102 that the load of the engine 11 is not less than the specified value, the routine proceeds to step 3103 where whether or not the imbalance failure between the cylinders can be caused is determined by whether or not an imbalance failure possibility flag, which will be described later, is "1".

In a case where it is determined in the step 3102 that the load of the engine 11 is not less than the specified value and where it is determined in the step 3103 that the imbalance failure between the cylinders can be caused (the imbalance failure possibility flag="1"), the routine proceeds to step 3104 where a change amount guard value for limiting a change amount of the main F/B correction value is set to a specified value.

On the other hand, in a case where it is determined in the step 3102 that the load of the engine 11 is less than the specified value or where it is determined in the step 3103 that the imbalance failure between the cylinders cannot be caused (the imbalance failure possibility flag="0"), the routine proceeds to step 3105 where the change amount guard value is nullified (not set).

Then, the routine proceeds to step 3106 where the main F/B correction value is calculated in such a way that a deviation between the sensed air-fuel ratio (the air-fuel ratio of the exhaust gas sensed by the air-fuel ratio sensor 36) and a target air-fuel ratio becomes small.

Then, the routine proceeds to step 3107 where a difference between the main F/B correction value of this time and the main F/B correction value of a specified period before (for example, one combustion before or one TDC before) is calculated as a change amount of the main F/B correction value.

Then, the routine proceeds to step 3108 where in a case where the change amount guard value is set in the step 3104, the change amount of the main F/B correction value is limited by the change amount guard value. Specifically, in a case where the change amount of the main F/B correction value is larger than the change amount guard value, the change amount of the main F/B correction value is guarded by the change amount guard value, that is, the change amount of the main F/B correction value is set to the change amount guard value (the change amount of the main F/B correction value=the change amount guard value). On the other hand, in a case where the change amount of the main F/B correction value is not more than the change amount guard value, the change amount of the main F/B correction value is employed as it is. In this regard, in a case where the change amount guard value is nullified in the step 3105, the change amount of the main F/B correction value is employed as it is.

Then, the routine proceeds to step 3109 where the change amount of the main F/B correction value is added to the main F/B correction value of the specified period before to thereby find a final main F/B correction value. In this regard, in a case where the change amount guard value is nullified in the step 3105, the main F/B correction value calculated in the step 3106 may be employed as the final main F/B correction value as it is.

Then, the routine proceeds to step 3110 where a learned value of the main F/B correction value is calculated on the basis of the final main F/B correction value. Specifically, the main F/B correction value is subjected to a filtering processing (for example, a smoothing processing, an average processing, or a first order delay processing) to thereby find a learned value of the main F/B correction value. The learned value of the main F/B correction value is stored in a rewritable nonvolatile memory (a rewritable memory for holding stored data even if a power source is turned off) such as a backup RAM (not shown in the drawing) of the ECU 39, whereby the main F/B correction value is learned. At this time, while the change amount of the main F/B correction value is limited (that is, the change amount guard value is set in the step 3104), an updating speed of learning the main F/B correction value is reduced (an interval at which the learned value of the main F/B correction value is updated is made longer than usual) or the learning of the main F/B correction value is stopped (the calculation of the learned value of the main F/B correction value is stopped).

[Individual Cylinder Air-Fuel Ratio Estimation Routine]

Figure 28:
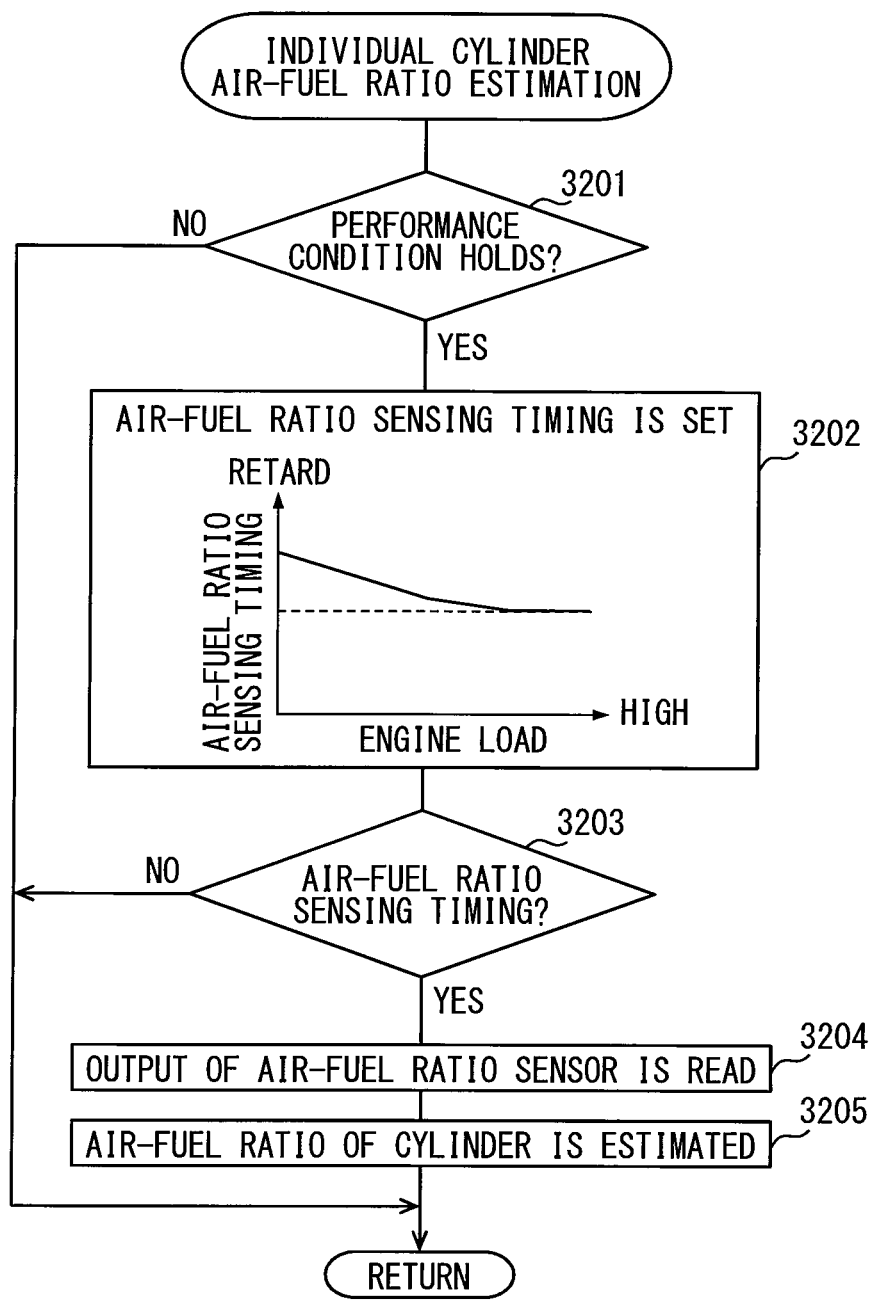
FIG. 28 is a flow chart to show a flow of a processing of an individual cylinder air-fuel ratio estimation routine.

An individual cylinder air-fuel ratio estimation routine shown in FIG. 28 is invoked at intervals of a specified crank angle (for example, 30 CA) in synchronization with the output pulse of the crank angle sensor 33 and functions as the individual cylinder air-fuel ratio estimation part.

When the present routine is invoked, first, in step 3201, it is determined whether or not the performance condition of the individual cylinder air-fuel ratio control holds. The performance condition of the individual cylinder air-fuel ratio control includes, for example, the following conditions (1) to (3).

(1) The air-fuel ratio sensor 36 is in an active state.

(2) It is not determined that the air-fuel ratio sensor 36 is abnormal (fails).

(3) An engine operation range (for example, engine rotation speed and intake pipe pressure) is within an operation range in which the estimation accuracy of the air-fuel ratio can be secured).

When all of these three conditions (1) to (3) are satisfied, the performance condition of the individual cylinder air-fuel ratio control holds, whereas when at least any one of the conditions is not satisfied, the performance condition does not hold. In a case where the performance condition does not hold, the present routine is finished without performing the pieces of processing in step 3202 and subsequent steps.

On the other hand, in a case where the performance condition holds, the routine proceeds to step 3202 where the air-fuel ratio sensing timing (the sampling timing of the output of the air-fuel ratio sensor 36) of the individual cylinder is set by a map according to the load of the engine 11 (for example, the intake pipe pressure) at that time. In this regard, the air-fuel ratio sensing timing of the individual cylinder may be set by a map according to the load of the engine 11 and the engine rotation speed. The map used for setting the air-fuel ratio sensing timing is learned and corrected by a routine for correcting an air-fuel ratio sensing timing (not shown in the drawing (for example, a Local learning performance routine or a Global learning performance routine).

Then, the routine proceeds to step 3203 where it is determined whether or not the present crank angle is the air-fuel ratio sensing timing set in the step 3202. If the present crank angle is not the air-fuel ratio sensing timing set in the step 3202, the present routine is finished without performing the pieces of processing in subsequent steps.

On the other hand, if the present crank angle is the air-fuel ratio sensing timing set in the step 3202, the routine proceeds to step 3204 where the output of the air-fuel ratio sensor 36 (the sensed value of the air-fuel ratio) is read. Then, the routine proceeds to step 3205 where an air-fuel ratio of a cylinder, whose air-fuel ratio is estimated this time, is estimated by the use of the individual cylinder air-fuel ratio estimation model on the basis of the sensed value of the air-fuel ratio sensor 36.

[Individual Cylinder Air-Fuel Ratio Control and Convergence Determination Routine]

Figure 29:
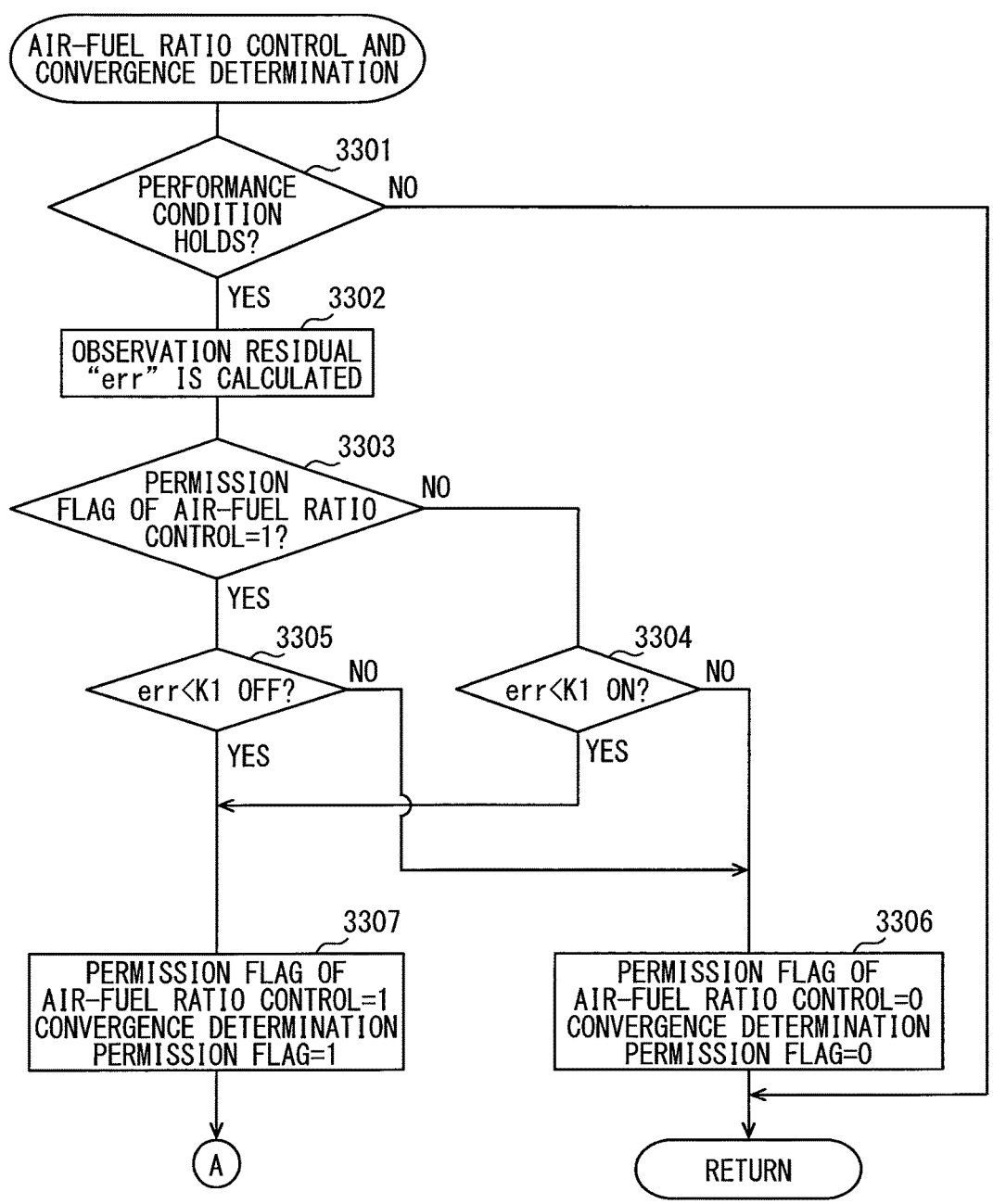
FIG. 29 is a flow chart to show a flow of a processing of an individual cylinder air-fuel ratio control and convergence determination routine.
Figure 30:
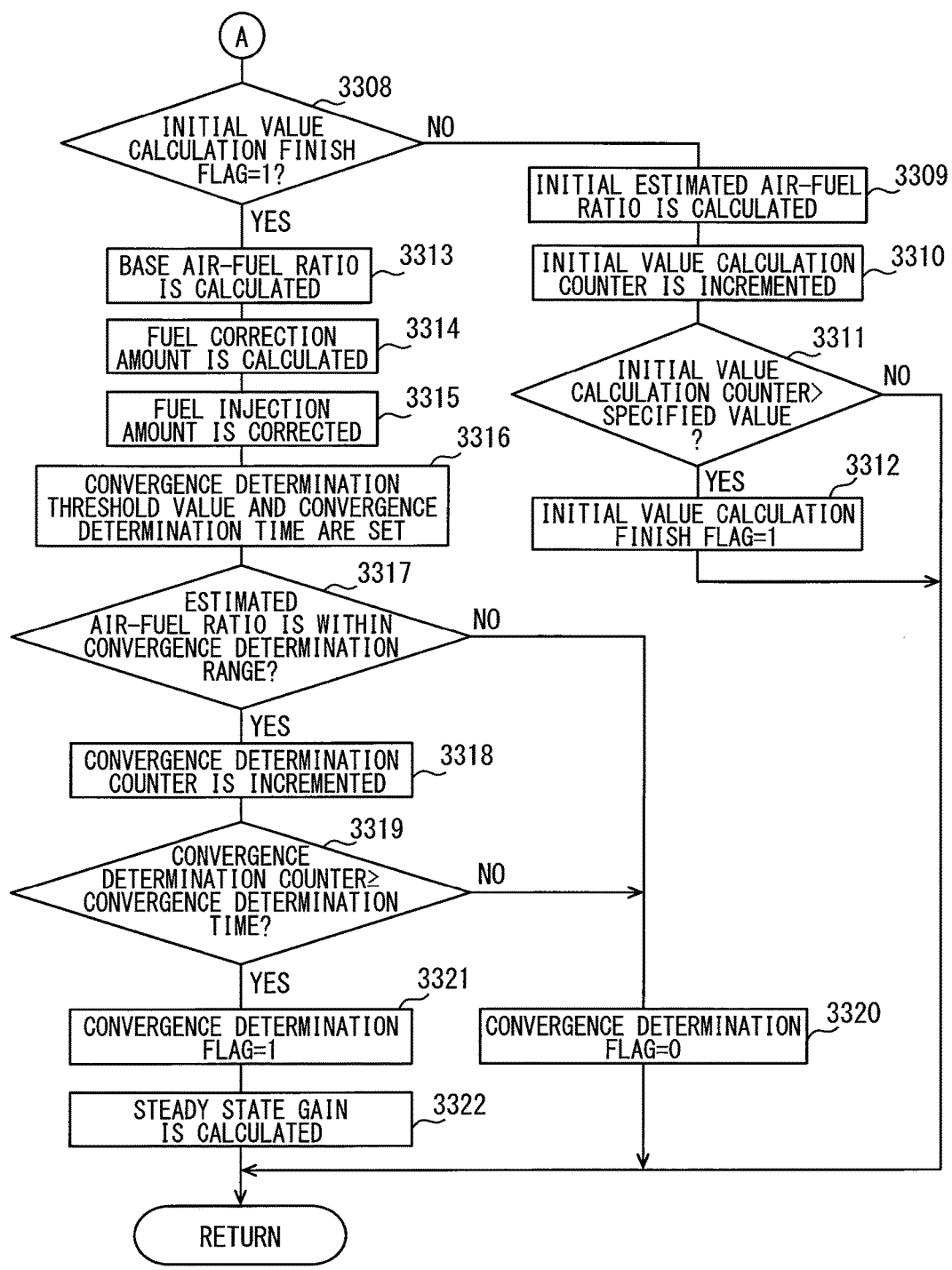
FIG. 30 is a flow chart to show a flow of the processing of the individual cylinder air-fuel ratio control and convergence determination routine.

An individual cylinder air-fuel ratio control and convergence determination routine shown in FIG. 29 and FIG. 30 is invoked at intervals of a specified crank angle (for example, 30 CA) in synchronization with the output pulse of the crank angle sensor 33 and functions as the individual cylinder air-fuel ratio control part. In step 3301, it is determined whether or not the performance condition of the individual cylinder air-fuel ratio control (the same as the condition in step 3201 of FIG. 28) holds. In a case where the performance condition does not hold, the present routine is finished, without performing the pieces of processing in step 3302 and subsequent steps.

On the other hand, in a case where the performance condition holds, the routine proceeds to step 3302 where an observation residual err is calculated by the use of the following equation (19) on the basis of a sensed value φ (an actual air-fuel ratio of the exhaust gas flowing through the exhaust gas collection part 34a) and an estimated air-fuel ratio φ^. At that time, the observation residual "err" is normalized by the use of the amplitude of the sensed value φ of the air-fuel ratio sensor 36 (a difference between the sensed value φ and a target air-fuel ratio tφ). In this regard, each of the sensed value φ of the air-fuel ratio sensor 36, the estimated air-fuel ratio φ^, and the target air-fuel ratio tφ is calculated by an equivalence ratio (a reciprocal of an excess air-fuel ratio).

$$err = \frac{1}{\tau \times s + 1} \times \sqrt{\frac{(\phi - t\phi - \phi^{\wedge})^2}{(\phi - t\phi)^2}} \quad (19)$$

where "τ" is a time constant and "s" is a Laplacian operator.

Then, the routine proceeds to step 3303 where it is determined whether or not a permission flag of the individual cylinder air-fuel ratio control is "1" (the individual cylinder air-fuel ratio control is permitted). In a case where it is determined in this step 3303 that the permission flag of the individual cylinder air-fuel ratio control is "0" (the individual cylinder air-fuel ratio control is inhibited), the routine proceeds to step 3304 where the observation residual err is less than a permission threshold value K1on of the individual cylinder air-fuel ratio control.

In a case where it is determined in this step 3304 that the observation residual "err" is not less than the permission threshold value K1on, the routine proceeds to step 3306 where the permission flag of the individual cylinder air-fuel ratio control is held at "0" and where a convergence determination permission flag is held at "0". Then, in a case where it is determined in the step 3304 that the observation residual err is less than the permission threshold value K1on, the routine proceeds to step 3307 where the permission flag of the individual cylinder air-fuel ratio control is set to "1" and where the convergence determination permission flag is set to "1".

On the other hand, in a case where it is determined in the step 3303 that the permission flag of the individual cylinder air-fuel ratio control is "1" (the individual cylinder air-fuel ratio control is permitted), the routine proceeds to step 3305 where it is determined whether or not the observation residual err is less than a prohibition threshold value K1off of the individual cylinder air-fuel ratio control. The prohibition threshold value K1off is set to a value more than the permission threshold value K1on.

In a case where it is determined in the step 3305 that the observation residual err is less than the prohibition threshold value K1off, the routine proceeds to step 3307 where the permission flag of the individual cylinder air-fuel ratio control is held at "1" and where the convergence determination permission flag is held at "1". Then, in a case where it is determined in the step 3305 that the observation residual "err" is not less than the prohibition threshold value K1off, the routine proceeds to step 3306 where the permission flag of the individual cylinder air-fuel ratio control is reset to "0" and where the convergence determination permission flag is reset to "0".

While the permission flag of the individual cylinder air-fuel ratio control is held at "1" (that is, while the convergence determination permission flag is held at "1"), the routine proceeds to step 3308 shown in FIG. 30 where it is determined whether or not an initial value calculation finish flag is "1" (the calculation of an initial estimated air-fuel ratio is finished). In a case where it is determined in the step 3308 that the initial value calculation finish flag is "0" (the calculation of the initial estimated air-fuel ratio is not finished), the routine proceeds to step 3309 where an initial estimated air-fuel ratio init $\varphi\hat{}$ #i of an individual cylinder is calculated by the use of the following equation (20).

$$\text{init}\varphi\hat{}\#i=\{1/(\tau\times 2\times s+1)\}\times\varphi\hat{}\#i \quad (20)$$

where $\varphi\hat{}$ #i is an estimated air-fuel ratio of an i-th cylinder #i and init$\varphi\hat{}$ #i is an initial estimated air-fuel ratio of the i-th cylinder #i.

Then, the routine proceeds to step 3310 where a counted value of an initial value calculation counter is incremented. Then, the routine proceeds to step 3311 where it is determined whether or not the counted value of the initial value calculation counter is more than a specified value. In a case where it is determined in the step 3311 that the counted value of the initial value calculation counter is not more than the specified value, the present routine is finished with the initial value calculation finish flag held at "0".

Then, in a case where it is determined in the step 3311 that the counted value of the initial value calculation counter is more than the specified value, the routine proceeds to step 3312 where the initial value calculation finish flag is set to "1". Then, the present routine is finished.

By the pieces of processing of these steps 3308 to 3312, the initial estimated air-fuel ratio of the individual cylinder init$\varphi\hat{}$ #i is calculated for each cylinder on the basis of the estimated air-fuel ratio $\varphi\hat{}$ #i of the individual cylinder in a specified period before starting the individual cylinder air-fuel ratio control, and the individual cylinder air-fuel ratio control is inhibited until the calculation of the initial estimated air-fuel ratio init$\varphi\hat{}$ #i is finished.

On the other hand, in a case where it is determined in the step 3308 that the initial value calculation finish flag is "1" (the calculation of the initial estimated air-fuel ratio is finished), the pieces of processing of the steps 3313 to 3315, which relate to the individual cylinder air-fuel ratio control, are performed and the pieces of processing of the steps 3316 to 3322, which relate to the convergence determination of the estimated air-fuel ratio, are performed. First, in step 3313, a mean value of the estimated air-fuel ratios of all cylinders is calculated and the mean value is set for a base air-fuel ratio base $\varphi$.

Then, the routine proceeds to step 3314 where a deviation (base $\varphi-\varphi\hat{}$ #i) between the estimated air-fuel ratio $\varphi\hat{}$ #i of the individual cylinder and the base air-fuel ratio base $\varphi$ is calculated and where a fuel correction amount Cmp #i is calculated as an individual cylinder correction value of the individual cylinder in such a way that the deviation (base $\varphi-\varphi\hat{}$ #i) becomes small.

$$Cmp\#i=\int(\text{base }\varphi-\varphi\hat{}\#i)dt \quad (21)$$

where Cmp #i is a fuel correction amount of the i-th cylinder #i.

Then, the routine proceeds to step 3315 where a fuel injection amount of the individual cylinder is corrected on the basis of the fuel correction amount Cmp #i of the individual cylinder to thereby correct an air-fuel ratio of an air-fuel mixture to be supplied to the individual cylinder for each cylinder, whereby the individual cylinder air-fuel ratio is controlled in such a way that a variation in the air-fuel ratio between the cylinders becomes small.

Then, the routine proceeds to step 3316 where a convergence determination threshold value of the individual cylinder is set for each cylinder by a map or a mathematical formula according to the initial estimated air-fuel ratio init$\varphi\hat{}$ #i of the individual cylinder (a convergence determination threshold value of the i-th cylinder #i is set according to the initial estimated air-fuel ratio init$\varphi\hat{}$ #i of the i-th cylinder #i). The map or the mathematical formula used for setting the convergence determination threshold value is set, for example, in such a way that as a deviation between the initial estimated air-fuel ratio and the base air-fuel ratio becomes larger, a deviation between the convergence determination threshold value and the base air-fuel ratio becomes larger.

Further, a convergence determination time common to all cylinders is set by a map or a mathematical formula according to the initial estimated air-fuel ratio init$\varphi\hat{}$ #i (for example, a maximum value of the initial estimated air-fuel ratio init$\varphi\hat{}$ #i of the individual cylinder). The map or the mathematical formula used for setting the convergence determination time is set, for example, in such a way that as a deviation between a maximum value of the initial estimated air-fuel ratio and the base air-fuel ratio becomes smaller, the convergence determination time becomes longer.

Then, the routine proceeds to step 3317 where whether or not the estimated air-fuel ratio $\varphi\hat{}$ #i of the individual cylinder is within a convergence determination range is determined by whether or not the estimated air-fuel ratio $\varphi\hat{}$ #i of the individual cylinder is on the side closer to a target value (for example, the base air-fuel ratio) than the convergence determination threshold value.

In a case where it is determined in the step 3317 that the estimated air-fuel ratio $\varphi\hat{}$ #i of at least one cylinder is beyond the convergence determination range, the routine proceeds to step 3320 where it is determined that an estimated air-fuel ratio convergence state (a state where the estimated air-fuel ratio of the individual cylinder converges) is not caused and where a convergence determination flag is held at "0". Then, the present routine is finished.

Then, in a case where it is determined in the step 3317 that the estimated air-fuel ratio $\varphi\hat{}$ #i of the individual cylinder is within the convergence determination range (the estimated air-fuel ratios $\varphi\hat{}$ #i of all cylinders are on the side closer to the target value than the convergence determination threshold value), the routine proceeds to step 3318 where the counted value of a convergence determination counter is incremented.

Then, the routine proceeds to step 3319 where it is determined whether or not the counted value of the convergence determination counter is not less than a convergence determination time. In a case where it is determined in the step 3319 that the counted value of the convergence determination counter is less than the convergence determination time, the convergence determination flag is held at "0". Then, the present routine is finished.

Then, in a case where it is determined in the step 3319 that the counted value of the convergence determination counter is not less than the convergence determination time, it is determined that a state where the estimated air-fuel ratio $\varphi\hat{}$ #i of the individual cylinder is on the side closer to the target value than the convergence determination threshold value continues for a time not less than the convergence determination time. Then, the routine proceeds to step 3321 where it is determined that the estimated air-fuel ratio convergence state is caused and where the convergence determination flag is set to "1".

Then, the routine proceeds to step 3322 where when it is determined that the estimated air-fuel ratio convergence state is caused, a steady state gain Kdc is calculated on the basis of a ratio of a change amount of the estimated air-fuel ratio $\varphi\hat{}$ #i (for example, a mean value of the change amount of the estimated air-fuel ratio $\varphi\hat{}$ #i of the individual cylinder) to a change amount of the fuel correction amount Cmp #i (for example, a mean value of the change amount of the fuel correction amount Cmp #i of the individual cylinder) and where the steady state gain Kdc is reflected on the individual cylinder air-fuel ratio estimation model. Specifically, the parameter B in the equation (17a) described above is multiplied by the steady state gain Kdc.

In a case where after it is determined that the estimated air-fuel ratio convergence state is caused, it is determined in the step 3317 that the estimated air-fuel ratio φ^ #i of at least one cylinder is beyond the convergence determination range, that is, in a case where after it is determined that the estimated air-fuel ratio convergence state is caused, the estimated air-fuel ratio φ^ #i diverges, the routine proceeds to step 3320 where the estimated air-fuel ratio convergence determination is reset. That is, it is determined that the estimated air-fuel ratio convergence state is not caused and the determination flag is reset to "0".

[Imbalance Failure Possibility Determination Routine]

Figure 31:
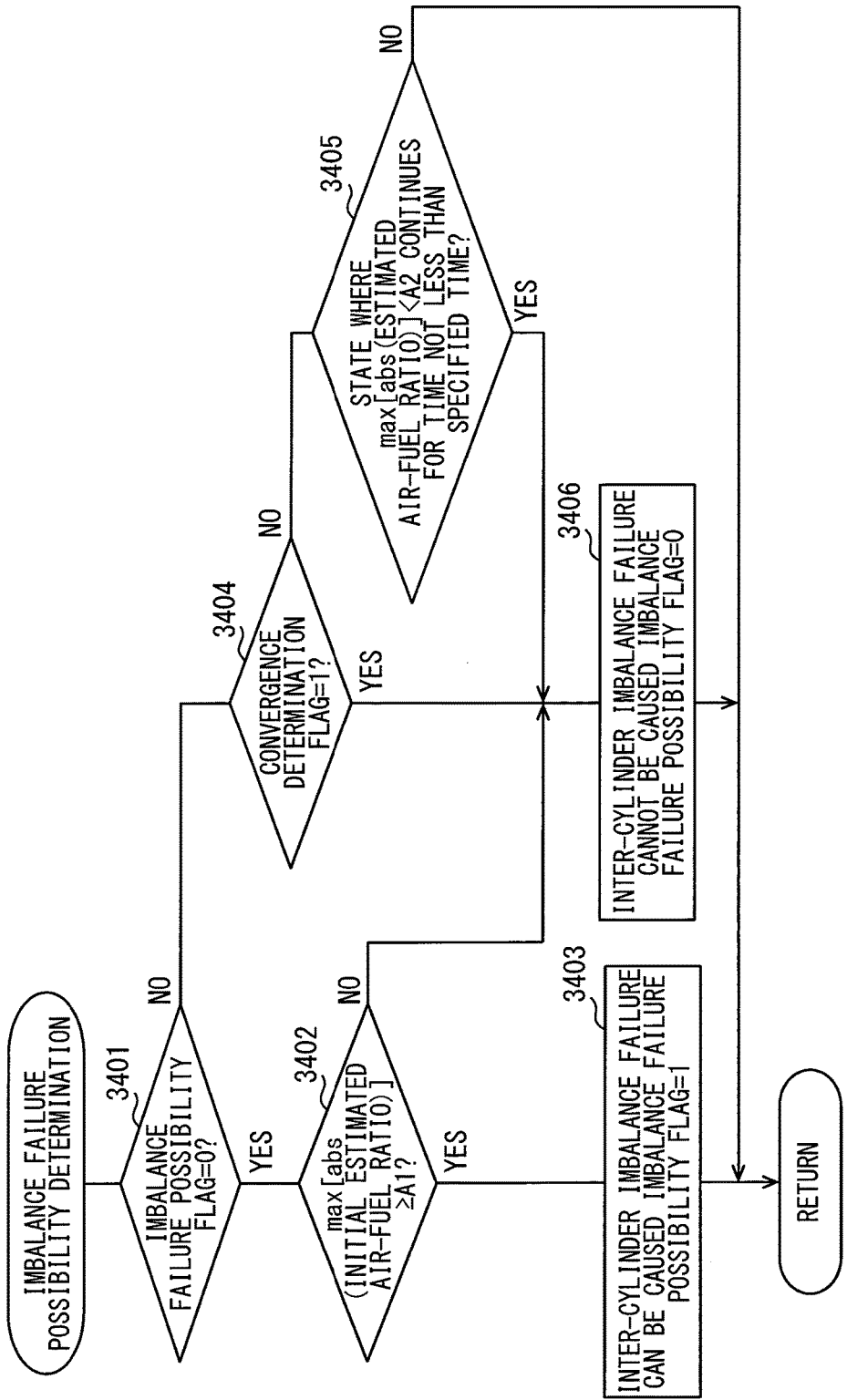
FIG. 31 is a flow chart to show a flow of a processing of an imbalance failure possibility determination routine of a fourth embodiment.
Figure 32:
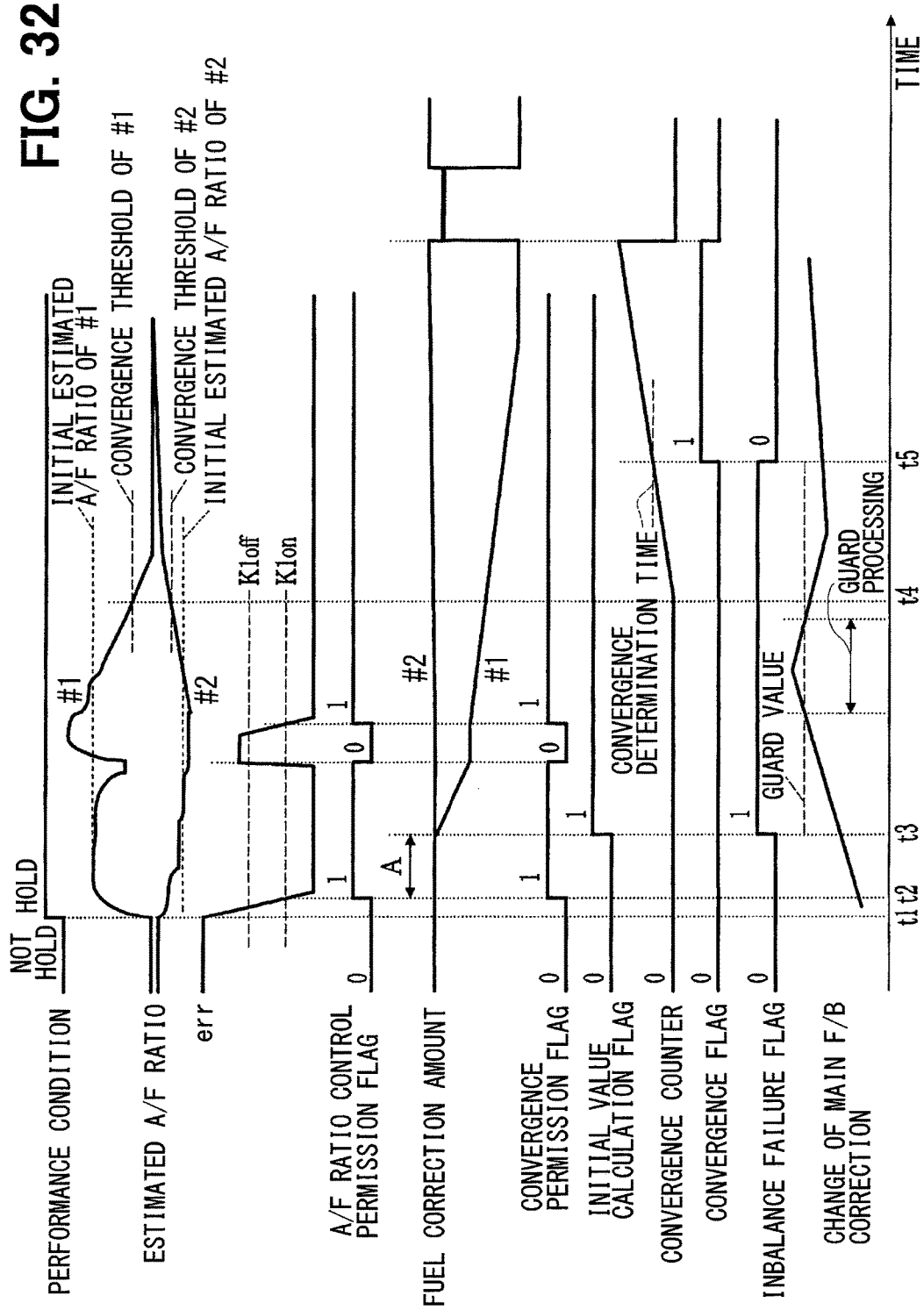
FIG. 32 is a time chart to show an example of performing a control of the fourth embodiment.

An imbalance failure possibility determination routine shown in FIG. 31 is invoked at intervals of a specified crank angle (for example, 30 CA) in synchronization with the output pulse of the crank angle sensor 33 and functions as a determination part.

When the present routine is invoked, first, in step 3401, it is determined whether or not the imbalance failure possibility flag, which will be described later, is "0". In a case where it is determined in the step 3401 that the imbalance failure possibility flag is "0", the routine proceeds to step 3402 where it is determined whether or not a maximum value max [abs (initial estimated air-fuel ratio)] of the absolute value of the initial estimated air-fuel ratio of the individual cylinder initφ#i is not less than a specified value A1.

In a case where it is determined in the step 3402 that the maximum value max [abs (initial estimated air-fuel ratio)] is less than the specified value A1, the routine proceeds to step 3406 where it is determined that an inter-cylinder imbalance failure cannot be caused and where the imbalance failure possibility flag is held at "0". Then, the present routine is finished.

On the other hand, in a case where it is determined in the step 3402 that the maximum value max [abs (initial estimated air-fuel ratio)] is not less than the specified value A1, the routine proceeds to step 3403 where it is determined that the inter-cylinder imbalance failure can be caused (a variation in the air-fuel ratio between the cylinders is comparatively large) and where the imbalance failure possibility flag is set to "1". Then, the present routine is finished.

Then, in a case where it is determined in the step 3401 that the imbalance failure possibility flag is "1", the routine proceeds to step 3404 where whether or not the estimated air-fuel ratio of the individual cylinder converges is determined by whether or not the convergence determination flag is "1".

In a case where it is determined in the step 3404 that the estimated air-fuel ratio of the individual cylinder does not converge (convergence determination flag=0), the routine proceeds to step 3405. It is determined in the step 3405 whether or not a state where the maximum value max [abs (initial estimated air-fuel ratio)] of the estimated air-fuel ratio of the individual cylinder φ^ #i is less than a specified value A2 continues for a time not less than a specified time (that is, a state where the estimated air-fuel of the individual cylinder is on the side closer to a target value than the specified value A2 continues for a time not less than the specified time). Here, the specified value A2 is set at a value equal to or a value smaller than the specified value A1.

In a case where it is determined in the step 3405 that the state where the maximum value max [abs (initial estimated air-fuel ratio)] is less than the specified value A2 does not continue for the time not less than the specified time, the imbalance failure possibility flag is held at "1". Then, the present routine is finished.

Then, in a case where it is determined in the step 3404 that the estimated air-fuel ratio of the individual cylinder converges (convergence determination flag=1), or in a case where it is determined in the step 3405 that the state where the maximum value max [abs (initial estimated air-fuel ratio)] is less than the specified value A2 continues for the time not less than the specified time, the routine proceeds to step 3406. In the step 3406, the determination that the inter-cylinder imbalance failure can be caused is reset, that is, it is determined that the inter-cylinder imbalance failure cannot be caused and the imbalance failure possibility flag is reset to "0". Then, the present routine is finished.

The control of the present fourth embodiment described above will be described by the use of FIG. 32.

At a timing t1 when the performance condition of the individual cylinder air-fuel ratio control holds is started the individual cylinder air-fuel ratio estimation for estimating the air-fuel ratio of the individual cylinder on the basis of the sensed value of the air-fuel ratio sensor 36 which is sensed at each air-fuel ratio sensing timing of the individual cylinder. Further, there is started a processing for calculating the observation residual err on the basis of the sensed value of the air-fuel ratio sensor 36 and the estimated air-fuel ratio.

When the observation residual err is not less than the permission threshold value K1on of the individual cylinder air-fuel ratio control, the permission flag of the individual cylinder air-fuel ratio control is held at "0" and the individual cylinder air-fuel ratio control is inhibited, and the convergence determination permission flag is held at "0" and the convergence determination of the estimated air-fuel ratio is inhibited.

Then, at a timing t2 when the observation residual err becomes less than the permission threshold value K1on of the individual cylinder air-fuel ratio control, the permission flag of the individual cylinder air-fuel ratio control is set to "1" and the individual cylinder air-fuel ratio control is permitted, and the convergence determination permission flag is set to "1" and the convergence determination of the estimated air-fuel ratio is permitted.

When the individual cylinder air-fuel ratio control is permitted, the initial estimated air-fuel ratio of the individual cylinder is calculated for each cylinder on the basis of the estimated air-fuel ratio of the individual cylinder in the specified period A before starting the individual cylinder air-fuel ratio control. Further, the convergence determination threshold value of the individual cylinder is set for each cylinder according to the initial estimated air-fuel ratio of the individual cylinder and the convergence determination time is set according to the initial estimated air-fuel ratio (for example, the maximum value of the initial estimated air-fuel ratio of the individual cylinder).

At a time t3 when the calculation of the initial estimated air-fuel ratio is finished, the individual cylinder air-fuel ratio control is started. Further, in a case where it is determined that the maximum value max [abs (initial estimated air-fuel ratio)] of the absolute value of the initial estimated air-fuel ratio of the individual cylinder is not less than the specified value A1, it is determined that the inter-cylinder imbalance failure can be caused (a variation in the air-fuel ratio between the cylinders is comparatively large) and the imbalance failure possibility flag is set to "1".

Further, when it is determined that the inter-cylinder imbalance failure can be caused (the imbalance failure possibility flag=1) and the load of the engine 11 is not less than the specified value, the change amount guard value is set and the change amount of the main F/B correction value is limited by the change amount guard value. In this way, in a case where the change amount of the main F/B correction value is more than the change amount guard value, the change amount of the main F/B correction value is guarded by the change amount guard value, whereby the change amount of the main F/B correction value is set to the change amount guard value (the change amount of the main F/B correction value=the change amount guard value). On the other hand, in a case where the change amount of the main F/B correction value is not more than the change amount guard value, the change amount of the main F/B correction value is employed as it is.

Then, at a timing t4 when the estimated air-fuel ratio of the individual cylinder is on the side closer to the target value than the convergence determination threshold value, a processing of incrementing the counted value of the convergence determination counter is started. Until the counted value of the convergence determination counter reaches a convergence determination time, it is determined that the estimated air-fuel ratio convergence state is not caused and hence the convergence determination flag is held at "0".

Then, at a timing t5 when the counted value of the convergence determination counter becomes not less than the convergence determination time, it is determined that the estimated air-fuel ratio convergence state is caused and the convergence determination flag is set to "1" and the determination that the inter-cylinder imbalance failure can be caused is reset, that is, it is determined that the inter-cylinder imbalance failure cannot be caused and the imbalance failure possibility flag is reset to "0". In this way, the limitation of the change amount of the main F/B correction amount is finished (the limitation of the change amount of the main F/B correction amount by the change amount guard value is released).

In the present fourth embodiment described above, it is determined whether or not the inter-cylinder imbalance failure of the engine 11 can be caused, and when it is determined that the inter-cylinder imbalance failure of the engine 11 can be caused and the load of the engine 11 is not less than the specified value, the change amount of the main F/B correction amount is limited by the change amount guard value. In this way, as shown by a solid line in FIG. 33, a variation in the main F/B correction amount is moderately inhibited and hence an increase in the variation in the air-fuel ratio between the cylinders, which is caused by the variation in the main F/B correction amount, can be inhibited. In this way, even in a case where it is determined that the inter-cylinder imbalance failure can be caused (the variation in the air-fuel ratio between the cylinders is comparatively large), the variation in the air-fuel ratio between the cylinders can be reduced quickly by the individual cylinder air-fuel ratio control (the estimated air-fuel ratio of the individual cylinder can be made to converge), which hence can inhibit the exhaust emission from deteriorating.

Further, in the present fourth embodiment, when it is determined that the inter-cylinder imbalance failure can be caused and then it is determined that the estimated air-fuel ratio of the individual cylinder converges or the state where the estimated air-fuel ratio of the individual cylinder is on the side closer to the target value than the specified value continues for the time not less than the specified time, the determination that the inter-cylinder imbalance failure can be caused is reset, that is, it is determined that the inter-cylinder imbalance failure cannot be caused. In this way, at an earlier timing of the timing when it is determined that the estimated air-fuel ratio of the individual cylinder converges and the timing when the state where the estimated air-fuel ratio of the individual cylinder is on the side closer to the target value than the specified value continues for the time not less than the specified time, the limitation of the change amount of the main F/B correction value is finished (the limitation of the change amount of the main F/B correction value by the change amount guard value is released), whereby the main F/B control can be returned to the usual main F/B control.

Still further, in the present fourth embodiment, while the change amount of the main F/B correction value is limited (that is, in a case where the change amount guard value is set), the updating speed of learning the main F/B correction value is reduced or the learning of the main F/B correction value is stopped. In this way, while the change amount of the main F/B correction value is limited, the updating speed of learning the main F/B correction value is reduced or the learning of the main F/B correction value is stopped in response to a decrease in the variation in the main F/B correction value. Hence, this can reduce the operation load of the ECU 39.

Fifth Embodiment

Next, a fifth embodiment of the present disclosure will be described by the use of FIG. 34. However, the descriptions of parts substantially identical to parts in the fourth embodiment will be omitted or simplified and parts different from parts in the fourth embodiment will be mainly described.

In the present fifth embodiment, an ECU 39 performs an imbalance failure possibility determination routine shown in FIG. 34, which will be described later, thereby determining whether or not an inter-cylinder imbalance failure can be caused on the basis of the magnitude of an individual cylinder correction value by an individual cylinder air-fuel ratio control (for example, a maximum value of an absolute value of an individual cylinder correction value of an individual cylinder).

If a variation in an air-fuel ratio between the cylinders is small, an individual cylinder correction value of the individual cylinder (fuel correction value Cmp falls within a specified range. However, if the variation in the air-fuel ratio between the cylinders is large, the individual cylinder correction value of the individual cylinder does not fall within the specified range (the individual cylinder correction value of at least one cylinder is beyond the specified range). Hence, if the magnitude of the individual cylinder correction value is monitored, it can be determined with high accuracy whether or not the inter-cylinder imbalance failure can be caused (the variation in the air-fuel ratio between the cylinders is comparatively large).

Figure 34:
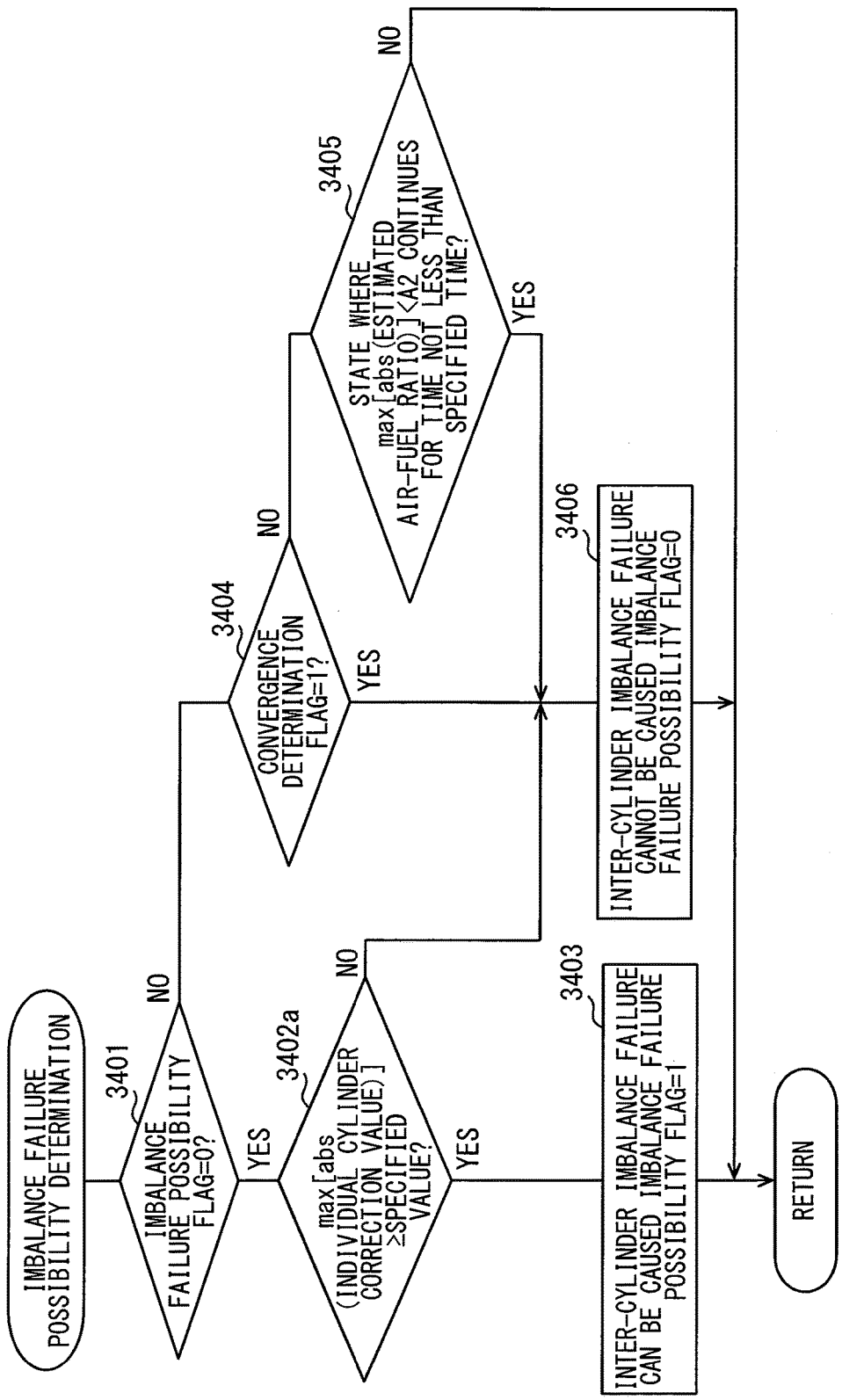
FIG. 34 is a flow chart to show a flow of a processing of an imbalance failure possibility determination routine of an embodiment 5.

In the imbalance failure possibility determination routine shown in FIG. 34, which is performed in the present fifth embodiment, the processing of step 3402 of the imbalance failure possibility determination routine shown in FIG. 31, which has been described in the fourth embodiment, is changed to the processing of step 3402a, and the pieces of processing of the steps other than the processing of the step 3402a are the same as those in FIG. 31.

In the imbalance failure possibility determination routine shown in FIG. 34, in a case where it is determined in step 3401 that an imbalance failure possibility flag is "0", the routine proceeds to step 3402a where it is determined whether or not a maximum value max [abs (individual cylinder correction value)] of an absolute value of an individual cylinder correction value (fuel correction amount Cmp #i) of an individual cylinder is not less than a specified value.

In a case where it is determined in the step 3402a that the maximum value max [abs (individual cylinder correction value)] is less than the specified value, the routine proceeds to step 3406 where it is determined that the inter-cylinder imbalance failure cannot be caused and where the imbalance failure possibility flag is held at "0".

On the other hand, in a case where it is determined in the step 3402a that the maximum value max [abs (individual cylinder correction value)] is not less than the specified value, the routine proceeds to step 3403 where it is determined that the inter-cylinder imbalance failure can be caused (a variation in the air-fuel ratio between the cylinders is comparatively large) and where the imbalance failure possibility flag is set to "1".

Then, in a case where it is determined in step 3401 that the imbalance failure possibility flag is "1", it is determined in step 3404 whether or not an estimated air-fuel ratio of the individual cylinder converges (convergence determination flag=1). Then, it is determined in step 3405 whether or not a state where the maximum value max [abs (estimated air-fuel ratio)] is less than a specified value A2 continues for a time not less than a specified time.

In a case where it is determined that the step 3404 is "Yes" or that the step 3405 is "Yes", the routine proceeds to step 3406 where a determination that the inter-cylinder imbalance failure can be caused is reset, that is, where it is determined that the inter-cylinder imbalance failure cannot be caused and where the imbalance failure possibility flag is reset to "0".

Also the present fifth embodiment described above can produce almost the same effect as the fourth embodiment.

Sixth Embodiment

Next, a sixth embodiment of the present disclosure will be described by the use of FIG. 35. However, the descriptions of parts substantially identical to parts in the fourth embodiment will be omitted or simplified and parts different from parts in the fourth embodiment will be mainly described.

In the present sixth embodiment, an ECU 39 performs an imbalance failure possibility determination routine shown in FIG. 35, which will be described later, thereby determining whether or not an inter-cylinder imbalance failure can be caused on the basis of an amplitude value in one cycle of an output of an air-fuel ratio sensor 36.

If a variation in an air-fuel ratio between the cylinders is small, the amplitude value in one cycle period of the output of the air-fuel ratio sensor 36 becomes small, whereas if the variation in the air-fuel ratio between the cylinders is large, the amplitude value in one cycle period of the output of the air-fuel ratio sensor 36 becomes large. Hence, if the amplitude value in one cycle period of the output of the air-fuel ratio sensor 36 is monitored, it can be determined with high accuracy whether or not the inter-cylinder imbalance failure can be caused (the variation in the air-fuel ratio between the cylinders is comparatively large).

Figure 35:
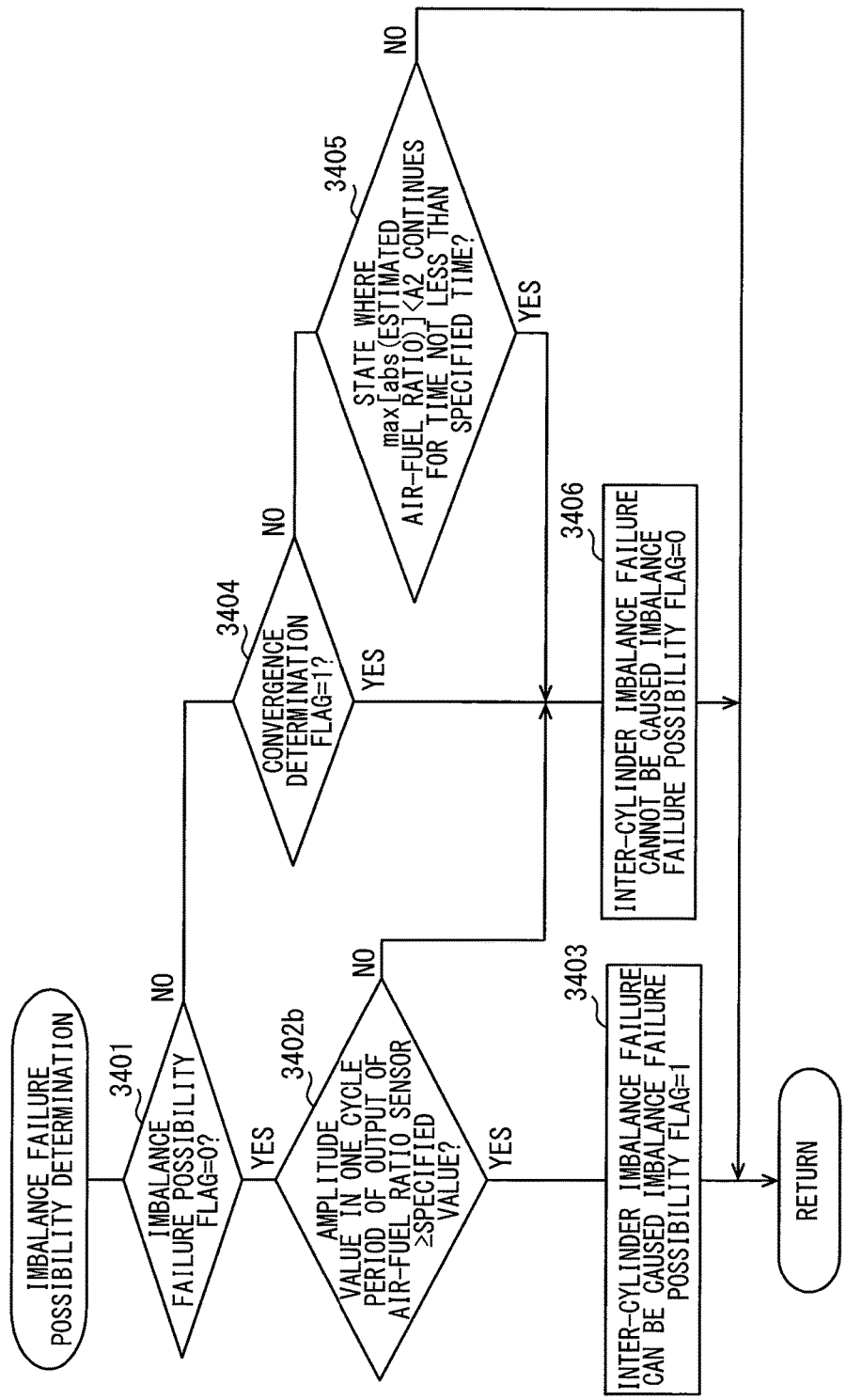
FIG. 35 is a flow chart to show a flow of a processing of an imbalance failure possibility determination routine of a sixth embodiment.

In the imbalance failure possibility determination routine shown in FIG. 35, which is performed in the present sixth embodiment, the processing of step 3402 of the imbalance failure possibility determination routine shown in FIG. 31, which has been described in the fourth embodiment, is changed to a processing of step 3402b and the pieces of processing of the steps other than the processing of step 3402b are the same as those in FIG. 31.

In the imbalance failure possibility determination routine shown in FIG. 35, in a case where it is determined in step 3401 that an imbalance failure possibility flag is "0", the routine proceeds to step 3402b where it is determined whether or not the amplitude value in one cycle period of the output of the air-fuel ratio sensor 36 is not less than a specified value. Here, the amplitude value in one cycle period of the output of the air-fuel ratio sensor 36 is, for example, a difference between a maximum value and a minimum value in one cycle period of the output of the air-fuel ratio sensor 36 or a difference between the maximum value and a target air-fuel ratio.

In a case where it is determined in the step 3402b that the amplitude value is less than the specified value, the routine proceeds to step 3406 where it is determined that the inter-cylinder imbalance failure cannot be caused and where the imbalance failure possibility flag is held at "0".

On the other hand, in a case where it is determined in the step 3402b that the amplitude value is not less than the specified value, the routine proceeds to step 3403 where it is determined that the inter-cylinder imbalance failure can be caused (the variation in the air-fuel ratio between the cylinders is comparatively large) and where the imbalance failure possibility flag is set to "1".

Then, in a case where it is determined in the step 3401 that the imbalance failure possibility flag is "1", it is determined in step 3404 whether or not an estimated air-fuel ratio of the individual cylinder converges (convergence determination flag=1) and it is determined in step 3405 whether or not a state where the maximum value max [abs (estimated air-fuel ratio)] is less than a specified value A2 continues for a time not less than a specified time.

In a case where it is determined that the step 3404 is "Yes" or that the step 3405 is "Yes", the routine proceeds to step 3406 where a determination that the inter-cylinder imbalance failure can be caused is reset, that is, where it is determined that the inter-cylinder imbalance failure cannot be caused and where the imbalance failure possibility flag is reset to "0".

Also the present sixth embodiment described above can produce almost the same effect as the fourth embodiment.

Here, two or three of the imbalance failure possibility determination routines (shown in FIG. 31, FIG. 34, and FIG. 35) of the respective embodiments 4 to 6 may be performed in combination. Specifically, two or three of the pieces of processing of the steps 3402, 3402a, and 3402b are performed. Then, in a case where it is determined that two or three of the steps 3402, 3402a, 3402b are "Yes", the routine proceeds to step 3403 where it is determined that the inter-cylinder imbalance failure can be caused and where the imbalance failure possibility flag is set to "1".

Further, in the imbalance failure possibility determination routines (shown in FIG. 31, FIG. 34, and FIG. 35) of the respective embodiments 4 to 6, the pieces of processing of the steps 3404, 3405 are performed. However, the present disclosure is not limited to this but only one of the steps 3404 and 3405 may be performed (that is, one of the steps 3404 and 3405 may be omitted).

Still further, in the respective embodiments 4 to 6, the initial estimated air-fuel ratio is calculated on the basis of the estimated air-fuel ratio before starting the individual cylinder air-fuel ratio control. However, the present disclosure is not limited to this but the initial estimated air-fuel ratio may be calculated on the basis of the estimated air-fuel ratio just after starting the individual cylinder air-fuel ratio control.

Still further, a method for correcting an air-fuel ratio sensing timing when it is determined that an air-fuel ratio sensing timing is shifted from a proper air-fuel ratio sensing timing is not limited to the method described in the embodiments but may be changed as appropriate.

Still further, in the respective embodiments 4 to 6, the present disclosure is applied to the 4-cylinder engine. However, an engine to which the present disclosure is applied is not limited to the 4-cylinder engine but may be applied to a 2-cylinder engine, a 3-cylinder engine, or an engine provided with 5 or more engines.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An individual cylinder air-fuel ratio control device of an internal combustion engine including: an air-fuel ratio sensor that is provided in an exhaust gas collection part, through which an exhaust gas of an individual cylinder of the internal combustion engine flows together, and that senses an air-fuel ratio of the exhaust gas; a main feedback control part performing a main feedback control which is common to all of the individual cylinders for calculating a main feedback correction amount in such a way that a deviation between the air-fuel ratio of the exhaust gas and a target air-fuel ratio becomes small; an individual cylinder air-fuel ratio estimation part performing an individual cylinder air-fuel ratio estimation of estimating an air-fuel ratio of the individual cylinder on the basis of a sensed value of the air-fuel ratio sensor, which is sensed at each air-fuel ratio sensing timing of the individual cylinder; and an individual cylinder air-fuel ratio control part performing an individual cylinder air-fuel ratio control of controlling the air-fuel ratio of the individual cylinder on the basis of an estimated air-fuel ratio of the individual cylinder, the individual cylinder air-fuel ratio control device of the internal combustion engine comprising:
   a misfire determination part determining whether or not a misfire is caused in the internal combustion engine; and
   a stop part stopping at least one of the individual cylinder air-fuel ratio estimation and the individual cylinder air-fuel ratio control when it is determined by the misfire determination part that the misfire is caused in the internal combustion engine, wherein
   when the stop part stops at least one of the individual cylinder air-fuel ratio estimation and the individual cylinder air-fuel ratio control, the main feedback control part continues to perform the main feedback control.

2. An individual cylinder air-fuel ratio control device of an internal combustion engine as claimed in claim 1,
   wherein when the misfire determination part determines that the misfire is caused in the internal combustion engine, the stop part resets an individual cylinder correction value by the individual cylinder air-fuel ratio control.

* * * * *